(12) United States Patent
Zauderer

(10) Patent No.: US 11,156,187 B2
(45) Date of Patent: Oct. 26, 2021

(54) NUCLEAR ENERGY, METAL FUEL, H$_2$ / O$_2$ FROM H$_2$O, WITH MHD POWER AND PROPULSION FOR ONE MONTH ASTRONAUT ROCKET VOYAGES TO MARS

(76) Inventor: Bert Zauderer, Merion Station, PA (US)

( * ) Notice: Subject to any disclaimer, the term of this patent is extended or adjusted under 35 U.S.C. 154(b) by 1953 days.

(21) Appl. No.: 13/584,574

(22) Filed: Aug. 13, 2012

(65) Prior Publication Data

US 2013/0259186 A1 Oct. 3, 2013

Related U.S. Application Data

(60) Provisional application No. 61/523,601, filed on Aug. 15, 2011.

(51) Int. Cl.
*F02K 9/42* (2006.01)
*H02K 44/08* (2006.01)
(Continued)

(52) U.S. Cl.
CPC ............... *F02K 9/42* (2013.01); *G21C 1/07* (2013.01); *G21D 5/02* (2013.01); *G21D 7/02* (2013.01);
(Continued)

(58) Field of Classification Search
CPC .... G21D 5/00–5/16; G21D 7/00; G21D 7/02; G21D 9/00; G21D 5/02; F02K 9/24;
(Continued)

(56) References Cited

U.S. PATENT DOCUMENTS 2,504,357 A 4/1950 Swallen
2,801,901 A 8/1957 Dingman et al.
(Continued)

FOREIGN PATENT DOCUMENTS

WO WO-03078540 A2 9/2003

OTHER PUBLICATIONS

Chen, Francis F., "Introduction to plasma physics", chapter 6, pp. 199-224, published 1974.*
(Continued)

*Primary Examiner* — Darlene M Ritchie
(74) *Attorney, Agent, or Firm* — Andrew M. Calderon; Roberts Calderon Safran & Cole, P.C.

(57) ABSTRACT

Disclosed is an interplanetary rocket propulsion to Mars and the Moons of the nearer outer Planets by means of 6000° K temperature, 100 atmosphere pressure, power generation and propulsion systems that utilize a gas cooled nuclear reactor and metal powder combustion, in combination with water wherein dissociation into oxygen to react with certain metals to form on board retained metal oxides, and to heat the hydrogen from dissociated water as well as on-board liquid hydrogen that is seeded with an alkali metal for use in a linear, Faraday magnetohydrodynamic (MHD) generator that is coaxial with a MHD accelerator for propulsion, wherein water and probable metal sources on planetary bodies would provide rocket fueling by metal oxide reprocessing to metal and for manned permanent life support bases, and for search of high value minerals, gold, silver, aluminum, rare minerals, diamonds, for transport with their lesser gravity back to Earth.

10 Claims, 5 Drawing Sheets

(51) Int. Cl.

| | | |
|---|---|---|
| *G21D 7/02* | (2006.01) | |
| *G21D 5/02* | (2006.01) | |
| *H02K 44/12* | (2006.01) | |
| *G21C 1/07* | (2006.01) | |
| *F02K 9/68* | (2006.01) | |
| *F02K 9/62* | (2006.01) | |
| *F02K 9/70* | (2006.01) | |
| *F02K 9/24* | (2006.01) | |

(52) U.S. Cl.
CPC ........... *H02K 44/08* (2013.01); *H02K 44/085* (2013.01); *H02K 44/12* (2013.01); *F02K 9/24* (2013.01); *F02K 9/62* (2013.01); *F02K 9/68* (2013.01); *F02K 9/70* (2013.01)

(58) Field of Classification Search
CPC .. F02K 9/42; F02K 9/70; H02K 44/08; H02K 44/085; H02K 44/12; G21C 1/07; Y02E 30/30
USPC .................................. 376/317, 318, 322, 909
See application file for complete search history.

(56) References Cited

U.S. PATENT DOCUMENTS

| | | | | |
|---|---|---|---|---|
| 3,308,622 | A * | 3/1967 | Caplinger | ............. F03H 1/0018 310/111 |
| 3,359,436 | A | 12/1967 | Kohaut et al. | |
| 3,480,806 | A | 11/1969 | Berberich | |
| 3,507,719 | A * | 4/1970 | Hodgson | ................. C06B 45/32 149/6 |
| 3,778,344 | A * | 12/1973 | Walsh | ....................... G21D 5/02 376/210 |
| 3,986,925 | A * | 10/1976 | Radebold | ................. G21D 9/00 310/11 |
| 4,045,285 | A * | 8/1977 | Baumgaertner | ......... G21D 9/00 376/323 |
| 4,200,815 | A | 4/1980 | Petrick et al. | |
| 4,345,173 | A * | 8/1982 | Marchant | ............... H02K 44/08 310/11 |
| 4,624,191 | A | 11/1986 | Zauderer et al. | |
| 4,694,729 | A | 9/1987 | Hall | |
| 4,765,258 | A | 8/1988 | Zauderer | |
| 4,847,525 | A | 7/1989 | Sukoriansky et al. | |
| 4,851,722 | A * | 7/1989 | Zauderer | ................ H02K 44/08 310/11 |
| 5,211,006 | A * | 5/1993 | Sohnly | ................... B64G 1/405 60/202 |
| 5,289,512 | A * | 2/1994 | Pettus | ....................... G21D 5/02 376/318 |
| 5,428,653 | A * | 6/1995 | El-Genk | .................. G21C 1/07 376/318 |
| 6,048,510 | A | 4/2000 | Zauderer | |
| 6,440,193 | B1 | 8/2002 | Johansen et al. | |
| 6,453,830 | B1 | 9/2002 | Zauderer | |
| 6,722,295 | B2 | 4/2004 | Zauderer | |
| 7,047,748 | B2 | 5/2006 | Zauderer | |
| 7,282,189 | B2 | 6/2007 | Zauderer | |
| 7,247,285 | B2 | 7/2007 | Zauderer | |
| 7,435,400 | B2 | 10/2008 | Zauderer | |
| 7,553,463 | B2 | 6/2009 | Zauderer | |
| 8,277,543 | B2 * | 10/2012 | Zauderer | ............ B01D 53/1475 110/245 |
| 2007/0089423 | A1 | 4/2007 | Norman et al. | |
| 2009/0021010 | A1 | 1/2009 | Walker | |
| 2012/0137877 | A1 | 6/2012 | Zauderer | |

OTHER PUBLICATIONS

David Braaten, 'Ridiculously' easy test yields claim of energy triumph, The Washington Times, p. A5.*
Malcolm W. Browne, 'Fusion' Claim is Greeted With Scorn by Physicists, The New York Times, p. A1 and A22.*
Kreysa et al., A critical analysis of electrochemical nuclear fusion experiments, Journal of Electroanalytical Chemistry, vol. 266, p. 437-450.*
Ohashi et al., Decoding of Thermal Data in Fleischmann & Pons Paper, Journal of Nuclear Science and Technology, vol. 26, No. 7, p. 729-732.*
Miskelly et al., Analysis of the Published Calorimetric Evidence for Electrochemical Fusion of Deuterium in Palladium, Science, vol. 246, No. 4931, p. 793-796.*
Lewis et al., Searches for low-temperature nuclear fusion of deuterium in palladium, Nature, vol. 340, p. 525-530.*
George Chapline, Cold Confusion, UCRL-101583, p. 1-9.*
David Stipp, Georgis Group Outlines Errors That Led To Withdraw!! of 'Cold Fusion' Claims, The Wall Street Journal, p. B4.*
Philip J. Hilts, Significant Errors Reported in Utah Fusion Experiments, The Washington Post, p. A1 and A7.*
Associated Press, Panel Opposes Cold Fusion Efforts, The Washington Post, p. A14.*
Alber et al., Search for Neutrons from 'Cold Nuclear Fusion', Zetischrift fur Physik A Atomic Nuclei.*
J. F. Cooke, REport of Foreign Travel of J.F. Cooke, Head, Solid State Theory Section, Solid State Division, ORNL/FTR-3341, p. 2-15.*
G. Horanyi, Some Basic Electrochemistry and the Cold Nuclear Fusion of Deuterium, Journal of Radioanalytical Nuclear Chemistry, Letters, vol. 137, No. 1, p. 23-28.*
Faller et al., Investigation of Cold Fusion in Heavy Water, Journal of Radioanalytical Nuclear Chemistry, Letters, vol. 137, No. 1, p. 9-16.*
Hajdas et al., Search for Cold Fusion Events, Solid State Communications, vol. 72, No. 4, p. 309-313.*
Ziegler et al., Electrochemical Experiments in Cold Nuclear Fusion, Physical Review Letters, vol. 62, No. 25, p. 2929-2932.*
Scrieder et al., Search for ocold nuclear fusion in paladlium-deuteride, Zeitschrift fur Physik B—Condensed Matter, vol. 76, No. 2, p. 141-142.*
Price et al., Search for Energetic Charged Particle Emission from Deuterated Ti and Pd Foils, Physical Review Letters, vol. 63, No. 18, p. 1926-1929.*
Cribier et al., Conventional Sources of Fast Neutrons in "Cold Fusion" Experiments, Physics Letters B, vol. 228, No. 1, p. 163-166.*
Shani et al., Evidence for a Background Neutron Enhanced Fusion In Deuterium Absorbed Palladium, Solid State Communications, vol. 72, NO> 1, p. 53-57.*
Associated Press, Physicist:Utah Cold-Fusion Gear Doesn't Work, The Washington Post, p. A3.*
Salamon et al., Limits on the emission of neutrons, gamma rays, electrons and protons from ONPs/Fleischmann electrolytic cells, Nature, Vo. 344, p. 401-405.*
Nola Redd, "How long does it take to get to Mars", Space.com, Feb. 13, 2014.*
New Horizons, The First Mission to Pluto and the Kuiper Belt: Exploring Frontier Worlds, Launch Press Kit, Jan. 2006, pp. 1-38.*
Andrew Tarantola, "Why the Human Body Can't Handle Heavy Acceleration", gizmodo.com, Oct. 1, 2014.*
In re Dash, No. 04-1145, 2004 WL 2829039 (Fed. Cir. Dec. 10, 2004.*
Tereza Pultarova, https://www.space.com/38444-mars-thruster-design-breaks-records.html, Oct. 2017 (Year: 2017).*
Meghan Bartels, https://www.space.com/41447-parker-solar-probe-fastest-spacecraft-ever.html, Aug. 2018 (Year: 2018).*
Saturn V, https://en.wikipedia.org/wiki/Saturn_V, retrived Feb. 5, 2019 (Year: 2019).*
Space Launch System, https://en.wikipedia.org/wiki/Space_Launch_System, retrieved Feb. 5, 2019 (Year: 2019).*
International Search Report of International Searching Authority for Application No. PCT/US2012/050617, dated Dec. 4, 2012.
Written Opinion of International Searching Authority for Application No. PCT/US2012/050617, dated Dec. 4, 2012.
Office Action for related U.S. Appl. No. 13/584,467 dated Mar. 14, 2013.
Melting point, http://en.wikipedia.org/wiki/Melting_point, Mar. 2013.

(56) References Cited

OTHER PUBLICATIONS

"Which Material has the Highest Melting Point?" http://www.wisegeek.org/which-material-has-the-highest-melting-point.htm, Feb. 2013.
Craggs et al. "Collisions of Electrons with Molecules", Handbuch der Physik, vol. 31/1, 1959, 6 pages.
Zauderer "Fossil Fuel Fired Closed Cycle MHD Power Generating Experiments", Analysis and Evaluation of the US/Netehrlands 5-MW (thermal) . . . , the Netherlands, 1983, 3 pages.
Petrick et al. "Open Cycle Magnetohydrodynamic Electrical Power Generations", Argonne National Laboratory, 1988, 3 pages.
Nottingham "Thermionic Emission-Cs on W, Coated electrodes" Handbuch der Physik, vol. XXI, Berlin 1956, 6 pages.
Dellinger et al. Proceedings of the Eighth International Closed-Cycle Specialists' Meeting "Effects of Molecular Contaminants on MHD Generator Performance", 1978, 4 pages.
Final Office Action for related U.S. Appl. No. 13/584,467 dated Jul. 1, 2013.

\* cited by examiner

NUCLEAR & METAL & WATER & MHD PROPULSION

LITHIUM HYDRIDE NUCLEAR SPACE POWER PLANT

NUCLEAR ENERGY, METAL FUEL, $H_2$ / $O_2$ FROM $H_2O$, WITH MHD POWER AND PROPULSION FOR ONE MONTH ASTRONAUT ROCKET VOYAGES TO MARS

CROSS REFERENCE TO RELATED APPLICATIONS

The present application is a non-provisional application of U.S. Application Ser. No. 61/523,601, filed on Aug. 15, 2011, the contents of which are incorporated by reference herein in their entirety.

BACKGROUND OF THE INVENTION

1. Field of the Invention

The present invention relates to one-month long rocket missions by Astronauts from Earth orbit to a Mars landing that is powered by a gas-cooled nuclear reactor followed by beryllium fuel that reacts with oxygen from dissociated water to form BeO droplets that heat hydrogen from dissociated water in a cyclone combustor to 6000° K, followed by alkali seeding to render the gas electrically conduction as it flows though an MHD generator-accelerator to propel the rocket to speeds much beyond attainable by gas dynamic thrust thus enabling 1 one month voyages.

This invention is the third of three Applicant inventions that are based on MHD power. The first one, Published Application No. US 2012/0137877, dated Jun. 7, 2012, uses a Brayton MHD gas power cycle in parallel with a Rankine steam cycle to yield zero $CO_2$ emissions from coal power plants with only a 5% efficiency loss and with co-benefits such as high-value cementitious slag that can double electricity revenue. The second and third inventions are disclosed in the above Provisional Application No. 61/523,601, wherein the second one uses of metal fuels to achieve 100 knots in large monohull ocean liners, while the $3^{rd}$ one is the present Mars mission.

The MHD and metal fuel combustion background of the present invention are based on decades long R&D in these fields that were conducted by the inventor. Elements presented in the first two cited applications are not repeated herein, specifically material on terrestrial power and propulsion presented in the $2^{nd}$ invention.

The core common feature of the $2^{nd}$ and $3^{rd}$ Patent Applications is that the heat source for both power and propulsion of the gas are metal particles of aluminum, or magnesium, or zirconium for terrestrial use, or beryllium for outer space use, in a range from 3000° K to 6000° K, and/or a pebble bed, gas cooled, nuclear reactor heat source in a 2000° K to 3000° K temperature range.

For interplanetary space rocket thrust, the beryllium metal particles are oxidized with liquid oxygen to form metal oxide droplets, which heat liquid hydrogen to propel the rocket, while 90% to 95% of the BeO droplets are retained in the combustor for future reprocessing.

The preferred alternative is using water, which is over 10 times denser than liquid oxygen and hydrogen. It would be loaded in the rocket and compressed and heated in the nuclear reactor to 3000° K followed by further heating of the steam by beryllium particles reactions to release the $O_2$ and $H_2$ by non-equilibrium dissociation of the water in a pre-combustion chamber, as per LeChatelier's principles, with further reaction with Be to form BeO that is retained and removed from the cyclone combustor, followed by the heated $H_2$ exhaust that propels the rocket, or seeding the $H_2$ with cesium for added thrust from an MHD powered, MHD accelerator followed by exhausts into space. The metal oxide is either ejected into space or quenched in water, and collected for reduction back to the metal at the rocket's destination. The MHD generator would also be used for power onboard, in space stations, and planetary colonies.

The objective of this invention is to achieve a manned landing on Mars with 8 astronauts, within one decade, which was the goal of the NASA's 1960s NERVA 3000° K nuclear, multi-stage hydrogen rocket program. It was terminated in the early 1970s. Its shortcomings were: A thrust that limited the specific impulse to 800 seconds, which is still the SI limit due to major thrust limits. This dictates a semi-elliptical path with a near Venus flyby that took 6 months to one year, a massive 430 feet high, multi-stage, million plus pound behemoth, with all the $1^{st}$ stage $H_2$ emptied on Earth orbit takeoff.

The present invention's added thrust from 6000° K Be combustion and a 10 times smaller rocket by replacing the huge $H_2$ "thermos bottle" with water will increase the specific impulse to 1600 seconds. This enables a direct, 75 million kilometer path to Mars in 1 month. The manned landing, followed by dozen unmanned trip could be implemented in one decade.

2. Background

Closed cycle MHD power utilizes the induced Faraday Law electromagnetic field in the MHD generator to yield non-equilibrium ionization in noble gases, preferably argon or helium, which is seeded with cesium in order to generate electric power. The gases are heated either indirectly with fossil fuels in refractory ceramic regenerative heat exchangers from which all molecular gases have been evacuated prior to heating the noble gases to temperatures of about 2000° K (3140° F.).

The original objective of Closed Cycle non-equilibrium conductivity MHD in the 1960s was to be powered by a NERVA gas cooled, nuclear reactor. NERVA began in the late 1950s-early 1960s to serve as the upper stage of a Moon landing rocket. When that use was solved with Atlas chemical rockets, the goal shifted to Mars. Considerable multi-minute tests were conducted in the 1960s hydrogen propulsion up to 5000° R (2777° K). Hydrogen attack on the reactors graphite core was limited because the firing times were measured in minutes. This was not an issue for MHD that used argon as the preferred MHD gas. The NERVA testing achieved its very difficult objective of multi-minute 5000 MW (thermal)-250,000 lbs. thrust needed for a Mars mission. One major concern was there was no control by the astronauts, such as needed to avoid destructive impact with a rock in space. The entire program was cancelled in the early 1970s after the expenditure of nearly $200 million due to the success of the Apollo Moon landings interest in costly manned space travel ceased. Also, it was and remains to this day questionable whether the astronauts could survive several years of cosmic radiation, as well as sanity as suggested in Stanley Rubrick's 1968 movie—"Space Odyssey—2001". Also, oil and gas was cheap and there was no interest in stationary MHD power.

Instead NASA engaged in the sensible and successful missions of sending unmanned rockets on one-way trips to land tiny vehicles on Mars, and explore the solar system. Even this limited mission was extremely expensive. After the success with two landings of tiny trucks of about 100 lbs., the current mission of landing a small 2000 lb. movable truck, called Curiosity, is estimated to cost $2.3 billion.

Curiosity was scheduled for a Mars landing on Aug. 5, 2012, and it did land in the middle of the night of August 5-6. Its success was announced all over the World. The next question with tight budgets is what is next? One answer is this proposed Mars mission, and the cost will be low.

The question arises with all these potential uses from these technologies, especially Closed Cycle MHD why was there not even tiny funds invested by the DOE.

Congress approved $400 million from 1974 to 1981 after the 1973 oil embargo loosened a torrent of funds for alternate energy to make the USA "energy independent". Immediately the entrenched leaders in each technology saw a once in a lifetime opportunity for "fast commercialization", which would threaten them if newer smaller project would leap frog them.

That is exactly what happened to this Inventor's Closed Cycle MHD technology, whose ultimate energy source was aimed at gas nuclear reactors. Toward that goal, the MHD generator was to be indirectly heated with natural gas firing in cored brick ceramic heat exchangers at temperatures of 3000° F. for non-equilibrium ionization in cesium seeded argon, neon, or helium. This Inventor's Group at GE was engaged in non-equilibrium MHD power R&D during the entire 1960s beginning with a 2×2 inch, shock tube heating of xenon to temperatures up to 8000° K, where the equilibrium conductivity is high enough in the 100's Mhos/m range for MHD power to establish a power feasibility baseline by gradual lowering of temperatures to the range where magnetically induced, non-equilibrium ionization was effective, namely the 2000° K to 3000° K stagnation gas temperature range. Near the end of 1960s, this lower temperature goal was achieved in a specially constructed multi-millisecond, 12 inch diameter, 10 MW thermal shock tunnel using neon or argon seeded with cesium to stagnation gas temperatures down to 2000° K where only non-equilibrium conductivity would result in MHD power. About 2 MW of electric output were measured, which equaled 20% of the thermal power in the gas, the minimum output necessary for an efficient Brayton gas power cycle.

To extend this work to longer duration, in the early 1970s this GE Group implemented tests of one-minute duration blowdown to heat argon to 3000° F. in a cored brick heat exchanger that was pre-heated by natural gas combustion. The molecular combustion gas contaminants, which quench the non-equilibrium ionization effect in noble gases, were evacuated prior to introducing argon.

The next step in 1973 was to be a one-minute 50 MW (thermal) MHD blowdown test to produce 15 MW of power, equal to 30% enthalpy extraction. This would be followed by an efficient small 10 MW Closed Cycle MHD power plant. However, the blowdown test was never implemented despite the huge river of funds appropriated by Congress for energy development after the 1973 oil crisis.

The relevance of these 30-year old MHD events to the present invention is that it demonstrates the adverse consequences when non-scientific and non-engineering decisions control science and engineering. Not only were two decades of excellent progress in Closed Cycle MHD destroyed, when GE Managers shut down the MHD Group in King of Prussia, Pa., and laid off the entire staff of 30 including this Inventor who ran the non-equilibrium MHD test effort for 20 years and scattered the key members of his group and scrapped the key equipment. On top of all this, Dr. Zauderer had secured all the funds from ONR and DOE in those 20 years of several million dollars and the only GE investment was $300,000 from Corporate that he also secured.

Ironically, in the end, 1981, Open Cycle MHD was also destroyed.

The most incredible event related to this history of Closed Cycle MHD was this Inventor's recent chance discovery about one month prior to filing the Provisional application that a GE designed and fabricated 5 MW thermal, non-equilibrium, MHD generator, one minute blowdown channel was successfully tested at the Eindhoven University, The Netherlands, without crediting GE or its MHD Group that not only provided the first channel but all the design of the 50 MW blowdown as a template for their 5 MW thermal facility. As described later in this application this discovery came about when Dr. Zauderer found in a DOE website an abstract of his evaluation of the early Eindhoven MHD tests in 1983 that he located in his office. It stated that the MHD channel was supplied by the GE MHD Group. They withheld this information in all their technical papers in MHD Symposia Proceedings, and in the MHD Community as evidenced in an MHD Power book by R. Rosa in 1987, which mentioned the Netherlands non-equilibrium MHD results but no GE results.

SUMMARY OF THE INVENTION

The present invention applies to nuclear reactor and metal fuel combustion to interplanetary rocket propulsion. The technology is similar to ship propulsion and is an extension of the US NASA NERVA nuclear rocket program of the 1960s. The details from NERVA are discussed in the DETAILED DESCRIPTION.

This invention discloses methods and processes by which energy is transferred directly in one step from the outlet of a high temperature metal fuel or nuclear heat source to its end use for propulsion or electric power generation. An example of direct energy transfer from a heat source to propulsion is a jet-propelled aircraft. In contrast, a car or a propeller-driven ship transfers energy from the heat source through intermediate steps, such as from the engine to gears and to tires in automobiles, or from the diesel engine to gears to motors to propellers in ships. However, the higher the temperature of the heat source, the more intermediate steps with more energy losses are required when using said state of the art propulsion systems. In contrast, the present invention discloses energy transfer from a high temperature source directly to the propulsion system by use of the heat source exhaust. Similarly, in the case of electric power generation the energy from the high temperature sources is transferred directly to the high temperature MHD electric generator without intermediate steps. Specifically, this invention discloses very high propulsion thrust ($>10^6$ hp), that is attainable by combustion of the metal beryllium in oxygen mixed with hydrogen combined with pre-heat with a nuclear reactor with hydrogen for outer space power generation or propulsion applications in high temperature cycles.

Carnot's Second Law of Thermodynamics controls all power cycles. In the present case, it consists of compression of a gas or liquid, heating the gas to a peak temperature, expanding the gas in a power production step, or propulsion step, and rejecting the remaining heat into Outer space. The ideal Carnot cycle is the most efficient cycle because its power output is totally reversible. However, reversibility is unattainable in actual cycles due to irreversible losses in all steps of the cycle.

In summary, the following lists the advantages of this invention whose goal is to extract the maximum power from gas cooled high temperature nuclear reactors and very high temperature combustion of metals, as stated at the beginning of this summary.

One advantage of the present Invention is using metal oxides that are produced by combustion of certain metals to directly heat gases to high temperatures whose exhaust enables them to propel space vehicles at much higher speeds than currently available.

A second advantage is to modify the first process by adding a low ionization alkali metal to seed said gas to enable electric power production in a Magnetohydrodynamic (MHD) generator for electricity generation to drive an attached co-axial MHD accelerator for direct propulsion.

A third advantage is to utilize the gas-cooled nuclear reactor to heat to 3000° K either hydrogen only, or to heat liquid oxygen and hydrogen followed by reaction of the oxygen with beryllium to heat the hydrogen to 6000° K, or much preferably to use water with non-equilibrium dissociation by LeChatelier's principle to yield oxygen for metal combustion while the hydrogen is heated to high temperature to be followed by seeding the $H_2$ with cesium and expanding the gas through a subsonic MHD generator that drives a co-axial supersonic MHD accelerator in an interplanetary rocket.

To briefly elaborate:

The first two advantages are implemented in a slagging, cyclone combustor into which a fine metal powder, beryllium is injected to react with the oxygen to form the metal oxide, BeO droplets that the tangentially injected gases drive to impact the liquid metal oxide coated combustor wall, from which said liquid slag drains into a quench tank located beneath the downstream end of the combustor, where the solid metal oxide particles are removed for reprocessing to the original metal at the rockets destination.

To meet the first propulsion advantage, the heat released during the metal particle oxidation heats the hydrogen to 6000° K.

However, the preferred source of oxygen and hydrogen is on-board water, which when dissociated will reduce the needed rocket volume by up to a factor of 10.

For the second MHD power advantage, the hydrogen for outer space use is seeded with an alkali metal powder, preferably cesium, to temperatures of at least 2000° K but preferably 4000° K or even higher, in order to thermally ionize the cesium as well as to additionally ionize the cesium by non-equilibrium electron heating by the induced electric field by Faraday's Law inside a Magnetohydrodynamic (MHD) generator and MHD accelerator, which results in an electric conductivity that is high enough when combined with the applied magnetic field to power outer space transport systems.

The processes and method disclosed in the present applications incorporate methods and processes that are based in part from U.S. Pat. Nos. 7,553,463, 7,435,400, 7,232,189, 7,247,285, 7,047,748, 6,722,295, 6,453,830, 6,048,510, 4,765,258, and 4,624,191, and by this inventor's three Provisional Applications filed in 2010, which by reference are incorporated herein in their entirety by reference as needed in order to implement the present invention's advantages.

For interplanetary rocket with metal fuels, the oxide reprocessing to the metal and storage could be implemented remotely at the destination, be it the Moon, Mars, an asteroid, or even a planetary orbit space station.

This invention also teaches that this metal fueled MHD system would also be used to provide the technology base for designing and erecting nuclear reactors with thousands of ceramic or graphite spherical pebbles of several inches in diameter that contain tens of thousands of fissionable uranium particles that heat either hydrogen, or helium or argon to 2000° K to 3000° K and are seeded with cesium or potassium at the outlet of the reactor as the gas enters a closed cycle MHD generator to produce rocket power, or power for Space Stations, the Moon, Mars, and Beyond. Alternatively, an HTR nuclear reactor using thorium and uranium 233 could also be used.

U.S. Pat. No. 4,851,722, which is incorporated herein by reference in its entirety, reports the adiabatic flame temperature of the metals in $O_2$. At 100 atm. it is about 6250° K (10,790° F.) for Zirconium and Beryllium. The increased pressure with increasing temperature is necessary to assure that the metal oxides do not dissociate or vaporize. The extremely high gas temperature is further augmented by the direct heat transfer from the metal oxide droplets in MHD alkali metal seeded gas to hydrogen for rocket transport in space. The high gas temperature results in very high equilibrium electrical conductivity. This enables high power extraction in a linear Faraday MHD generator whose output in an MHD accelerator provides propulsion that substantially augments gas dynamic propulsion.

Alternatively, for some propulsion applications in space, the entire MHD system is eliminated, and the pressurized gas exiting the metal oxide combustor is thermally expanded in a subsonic-supersonic nozzle that exhausts into space at exit pressures somewhat higher than the vehicle environment. Even this application does not preclude installing an MHD generator to processes part of the heated gas for on-board electric power production.

A critical factor is selecting metal fuels is their cost. The metal oxide reprocessing cost with nuclear oxide reduction cost is not prohibitive. However, when used for direct propulsion it is important that at least 90% of the metal oxide is recovered and not blown out with the exit nozzle. As disclosed herein, this is accomplished by dividing the combustor into two sections with opposing swirl direction, which eliminates gas rotation at the combustor exit and recovers at least 90% of the metal oxide to prevent it from blowing out.

As disclosed in the present invention, heat from oxidizing metal fuel particles goes directly to the gas that provides the thrust to the transportation vehicle, be it a ship or a train, or a truck, or car, or airplane, or rocket. This is preferred to indirect thrust provided from a gas-cooled nuclear reactor through a solid heat transfer barrier to heat the propulsion gas. This preference depends on the mission in that nuclear would be preferred if the on board metal fuel needed for the mission exceeds the weight of the nuclear reactor system. However, that is not the case for the missions to the outer planets. As demonstrated in the massive NASA NERVA studies, the nuclear-hydrogen rocket to Mars would take 6 months to get there. As shown herein this was due to lack of thrust. It is disclosed herein with a MHD generator-accelerator it is possible to accomplish this in 39 days with nuclear only. However, the nuclear-beryllium propulsion system disclosed herein is much preferred.

As for the other major nuclear power propulsion application, interplanetary space travel, the much higher gas temperature attainable with metal fuels as well as the capability of converting almost all the stagnation enthalpy into thrust offers metal fuels a substantial advantage even for interplanetary travel. This is especially the case if in the future nuclear reactors are installed on planets, asteroids, and even interplanetary large space station that could reprocess the metal oxide, which would certainly be beryllium oxide, and reload the space ship with reprocessed beryllium from spent beryllium oxide. Reprocessing will recover the oxygen for reuse. Since the Moon, Mars, some asteroids, and some moons of the outer planets have water, its dissociation into oxygen and hydrogen could be obtained for propulsion and life support. Also the water would be used for dissociation into oxygen and hydrogen, In addition to inadequate thrust for high-speed missions, another problem with nuclear power for space propulsion along the NERVA model where hydrogen was heated by graphite core nuclear fuel in order to reach 2775° K (4535° F.) is that hydrogen attacks graphite. This temperature is far less than that attainable at peak combustion temperatures with other metals. The graphite attack problem may be resolved by spray coating the graphite pebbles with a metal oxide, such as thorium oxide, which is useful to 3000° K. However, since non-equilibrium conductivity MHD is very effective at even 2000° K gas temperature in hydrogen seeded with cesium, it should also be effective in generating power and acceleration with a pebble bed nuclear reactor heat source for rocket propulsion, at higher pressure up to 100 atm and with a 6 Tesla super conducting magnet. The implication is that high speed up to several tenth of one percent of the speed of light might be attempted. This is not possible with the tiny size ion engines that are in use for deep space exploration.

In conclusion, the primary innovation disclosed in this invention is propulsion of compact interplanetary rockets from Earth orbit to Mars in 39 days.

DETAILED DESCRIPTION

Figure 1:
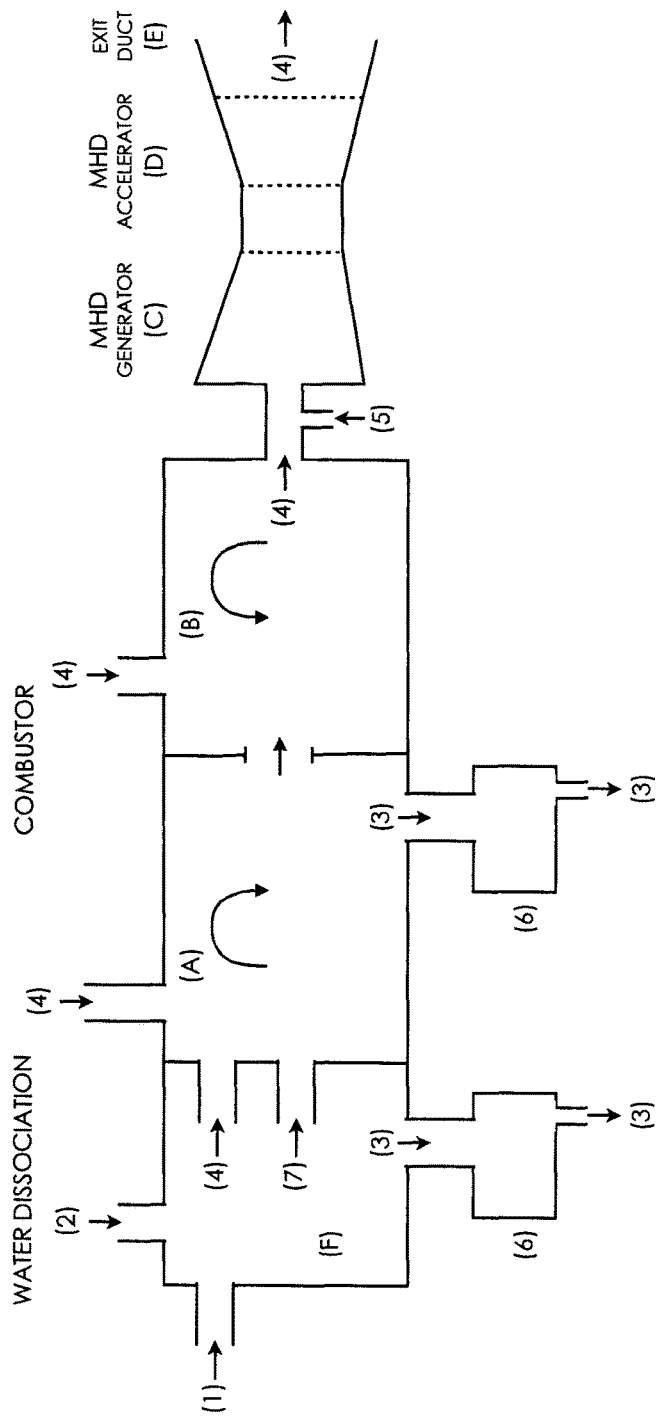
FIG. 1 is a schematic drawing of a space based rocket propulsion system in which water is injected into a pre-combustion cylindrical chamber in which the water is dissociated into hydrogen and oxygen by LeChatelier's principle in this water dissociation chamber, aided by beryllium reaction with oxygen from water, that flows into the first of two co-axial, counter gas swirling, slagging metal fuel combustor that is fired with beryllium and oxygen to form metal oxide that heats the dissociated hydrogen and stored hydrogen to 6000° K and flows axially into the second chamber, where more on board $H_2$ is injected tangentially in the $2^{nd}$ chamber to counter the swirl from the $1^{st}$ stage swirl, followed by all the hydrogen flowing into a sub-sonic nozzle into which 0.1% to 1% cesium is injected to render it electrically conducting, followed by flow into a MHD generator for powering a coaxial supersonic MHD accelerator before exhausting into space, while at least 90% of the liquid metal oxide is recovered in the $1^{st}$ combustor stage and quenched and stored in a vessel for removal at the rocket's destination.

The following details the specific applications of MHD power and propulsion using metal fuels and pebble bed nuclear reactors that are disclosed in this application.

Application of Metal Combustion to Pulsed MHD Power Devices:

The metal combustion applications disclosed herein are partly based on the slagging coal combustor, initially disclosed by Zauderer in U.S. Pat. No. 4,624,191. Pulsed power is one of the many applications of MHD that can be derived from MHD's basic function of power generation, as disclosed by Zauderer in U.S. Pat. No. 4,851,722, both of which by reference are incorporated herein in their entirety. The second patent disclosed the production of hundreds of MW of pulsed MHD power from a non-equilibrium conductivity alkali metal seeded noble gas that is heated by the oxidation of metal particles, such as aluminum, or beryllium, or zirconium), to gas temperatures from 3000° K to 6250° K at pressures from 10 to 100 atmospheres. The combustion temperature and pressure were selected to maintain the metal oxides in their solid or liquid state so as not to reduce the non-equilibrium electrical conductivity of the seeded noble gases. The application considered in said second Patent was as a power source for nominal 100 MW electromagnetic, several second duration electric pulses, with up to 100 times repetitions to power lasers or electric projectiles, for use in outer space. The metals were to be fired with oxygen, which would heat helium, hydrogen or argon that was seeded with the alkali metal cesium to produce non-equilibrium electric conductivity MHD power.

The present disclosed application uses the features in said Patent but applies them to a totally unanticipated use at that prior time, namely continuous operation, and with the oxygen as the oxidizer and the alkali metal seeded hydrogen as the MHD working gas. Neither use was even thought of at the time due to misunderstanding of elevated non-equilibrium, electron quenching by diatomic molecules. Also, $CO_2$ removal from fossil fuel combustion was not an issue at the time. Therefore, no one would have considered metal fuels could be used as a renewable, net zero $CO_2$ emission fuel, nor how to implement this. Also, since nuclear power was considered banned permanently, no one considered metal fuels could be a means to prepare for subsequent nuclear powered MHD.

While the present invention retains the use of this pulsed metallic function as a co-MHD power source, its primary and totally new function is to use the metal as the primary heat source for continuous MHD power generation, or to apply metal fuel combustion directly to continuous, direct propulsion for space rocket uses. The product of combustion would be the metal oxide, which would be recovered and reprocessed into their original metal state by using either a pebble bed nuclear gas cooled reactor MHD generator, or fossil fuel fired power plants with zero emission and $CO_2$ sequestration as the heat sources.

In summary the new application differs completely from the original MHD pulsed power application. Previously, the objective was to provide electric power for the Strategic Defense Initiative (SDI) for defense in outer space, given then the name "Star Wars". The present application, in addition to its primary mission of transport power, will use the pulsed MHD power for defense from space based missile attack.

Totally new is the disclosure in the present invention, that the same MHD power plant that propels the rocket can also be used to intercept missiles in seconds per pulse. On Aug. 2, 2011 a news release stated that the US Navy had developed a power electromagnet rail gun technology that can project a "bullet" at 33 MJ of energy. Assuming the "barrel" takes 3 seconds to propel the "bullet", the power rate required would be about 40,000 MW per hour of DC. A central station power plant only puts out 1000 MW per hour. However, the power rate attainable with the MHD generator disclosed in this Invention can achieve even greater power.

Practicing this Invention with a Metal Fuel Combustor:

This invention would be practiced by combustion of metal powders in air in a slagging combustor (FIG. 1) whose mode of operation would be similar to that disclosed in U.S. Pat. No. 4,851,722. Metal combustion would occur with oxygen but with no $H_2O$ molecules that would quench non-equilibrium ionization. Pressures from about 10 to 100 atmospheres, depending on the application at a stoichiometric ratio of oxygen that is about 1% less than unity in order to react all the oxygen and form liquid metal oxide droplets in the combustor. The liquid metal oxide particles would heat by conduction, convection and radiation the $H_2$ to about 6,000° K if the reaction were to occur with beryllium at 10 atm to 100 atm. in the combustor.

The cyclonic action of the gas, $H_2$, that is heated by the nuclear reactor followed by oxidation of the metal particles into metal oxide droplets would drive the droplets into the liquid oxide covered wall inside the cylindrical slagging combustor, which is continuously drained through an opening at the bottom downstream end of the combustor, and quenched, as disclosed in said U.S. Pat. No. 4,851,722. The quenched metal oxide would be stored on board until offloaded at the destination, where reprocessed metal powder would be loaded.

The price of the metal is a secondary factor because the metal oxide formed after oxidation in the slagging combustor would be recycled at the destination. While hydrogen would be preferred to reduce the metal oxide to metal, other processes are also acceptable, such as the Hall process for aluminum, or even carbothermic reduction of aluminum, as disclosed in U.S. Pat. No. 6,440,193 and other previous ones. The determinant on which process is selected depends on efficiency and cost. Hydrogen is preferred because pure metal is not of paramount importance. The only requirement is that the hydride be oxidized in a pre-combustor to drive off the hydrogen before injecting the metal into the combustor in order to prevent the formation of $H_2O$ in the metal combustor because $H_2O$ or even OH molecules have a very large cross-section to electron collisions that will quench non-equilibrium ionization inside the MHD generator and accelerator even at concentrations of a small fraction of 1% of the parent gas. Fortunately the heat of formation of these metal hydrides is a very small fraction of the metal oxide heat of formation. Therefore, the $H_2$—$O_2$ reaction can precede the metal-oxygen reaction.

U.S. Pat. No. 4,851,722, which by reference is incorporated herein in its entirety, disclosed that the metal oxide droplets are totally dispersed in helium or hydrogen. Consequently heat is transferred very efficiently from the nominal 10-micron diameter metal oxide liquid droplets to the $H_2$. The result is that the heat transfers from the droplets to the gases. Therefore the gas entering the MHD generator would be at temperatures up to 6250° K from 1 atm to 100 atm. This is substantially higher than the nominal 2800° K peak temperatures attained in graphite pebble bed nuclear reactors under the AEC/NASA NERVA nuclear rocket program. Therefore, the thrust attainable with noble gases or hydrogen or nitrogen will be substantially higher with these metals than with nuclear reactors.

Furthermore, the gas exiting the MHD accelerator still contains significant thermal energy, which provides substantial additional energy that will further increase the thrust on the rocket in zero pressure in outer space. Therefore the gas in the exit nozzle would continue to expand and propel the rocket until the static pressure at the exit is only slightly higher the outside, namely, zero on Space.

The concern of nuclear radiation in the exhaust does not apply for Space applications where radioactive materials are insignificant in the vastness of Space. As for the ground testing in the NERVA nuclear rocket program, the hydrogen tests were of several minutes duration, which presumably was too short to allow the escape of significant radioactive matter from the nuclear refractory core.

However, even without any risk of escape of radioactive materials from the pebbles in open cycle operation in space, nuclear power for MHD generation or propulsion is limited by the "heat transfer barrier", namely the energy density of uranium is so high that extracting its energy is limited by heat transfer from the nuclear fuel to the MHD generator gas or propulsion gas because the nuclear heat must be transferred through a refractory metal oxide barrier of relatively low thermal conductivity to heat the MHD gas to the stagnation gas temperatures. In contrast, the metal oxide droplets formed by combustion transfer heat directly to the gas, and they are at substantially higher peak temperatures. Also, with metal oxides, there is no concern about radioactive hazards to humans, to machines and to the environment. However, it must be strongly emphasized this the advantage of metals over nuclear is only available for time constrained use, namely propulsion missions. For extended time missions in outer space, nuclear is clearly needed. So despite the heat transfer limit, nuclear power is the only solution in many cases.

Said U.S. Pat. No. 4,851,722 also teaches that for MHD use, the combustor requires a second coaxial downstream chamber with counter swirling gas flow injection to remove the first chamber's swirling action (FIG. 1). This is necessary to assure an axial gas flow in the MHD generator, which is co-axial to the two-chamber combustor. In the present application the first and second chamber gas $H_2$, in FIG. 1, is drawn from the liquid hydrogen tanks that exceed the hydrogen available from the water dissociation.

At the $2^{nd}$ stage combustor exit Cs from 0.1% to 1% is added to gas leaving the combustor exit nozzle to implement thermal and non-equilibrium ionization. By way of illustration how this is implemented nitrogen results taken from the Provisional application for $N_2$ is selected. Results with 6000° K $H_2$ would be higher. For $N_2$ at stagnation temperature, $T_o$=4330° K, and Mach 0.9 in the generator, $N_2$, specific heat ratio $\gamma$=1.3, static temperature $T_s$=3897° K, velocity U=1108 msec. Equilibrium conductivity, $\sigma_1$, is 200 Mhos/m with 0.1% Cs, and $\sigma_2$ is 700 Mhos/m with 1% Cs. At B=4 Tesla, a generator load, K=0.8, the power equals, $$P_{out}=\sigma U^2 B^2 K(1-K), \text{ in MW/m}^3, \quad \text{(Equation 1)}$$

628 MW/m³ at $\sigma_1$, and 2,198 MW/m³ at $\sigma_2$.

Supersonic flow is needed to lower the gas temperatures and pressure to yield an elevated electron temperatures, $T_e$, and conductivity in the MHD generator and MHD accelerator by:

$$T_e/T_o = [1+\gamma(1-K)^2 M^2 \beta_{eff}^2/3\delta]/[1+0.5*(\gamma-1)*M^2] \quad \text{(Equation 2)},$$

$\beta_{eff}$ is the effective electron cyclotron frequency divided by the electron-atom or molecule collision frequency, and it is caused by plasma turbulence, PT. For example, at 10 atm., 2000° K stagnation temperature in Cs seeded argon, B=4 T, and PT=0.5, $\beta$ is 9.1, and $\beta_{eff}$ is 2.1. For B=6 T, PT=0.2, $\beta$=15.2 and $\beta_{eff}$=4.7. $\delta$ is the inelastic electro-atom or molecule collision loss factor, which is a function of $T_e$, and it is unity, 1, for monatomic gases. In DOE ECAS Case 102, (Provisional No. 61/418,977), for Cs seeded Argon at 2000° K, the MHD power was 1000 MW in a 15 m long MHD generator at 4 Tesla or 10 m long in a generator at 6 Tesla.

The argon cases were with non-equilibrium ionization at one half the temperatures achievable with metal fuels. For $N_2$ stagnation temperature, $T_o$, of 4330° K, with $\delta$=7.8, PT=0.5, $\beta_{eff}$=2.1, M=0.9, K=0.8, $\gamma$=1.3, Te=1.008× $T_o$=3897° K, versus the stagnation temperature of 4300° K, which yields the conductivity used to get the above power density from equation 1.

However, as the gas accelerates and cools in the MHD accelerator, non-equilibrium ionization is needed for $\sigma$. The gas cools due to the high area ratio in MHD generators, which in ECAS equaled 6, which with isentropic expansion for $N_2$, at $P_o$=10 atm. yields 2.8 atm. at Mach 1.5 at the generator entrance and 0.15 atm at a Mach 3.2 exit. $\beta_{eff}^2$ would be higher although the magnetic field is tapered down. Also, the Mach outlet over inlet would be 4.55. So electron heating and ionization is possible with Cs seeded $H_2$ or $N_2$ as $T_{gas}$ decreases in the accelerator.

The significance of this is that after the GE MHD Group was disbanded in 1981, (details in No. 61/523,601) remaining closed cycle MHD researchers at Eindhoven and Tokyo shifted to the disc MHD generator in shock tunnels and blowdown testing. This was despite the validation of the GE 5 MW linear MHD generator at Eindhoven in 1983. This Inventor discovered in August 2011 the most probable reason for this shift in a theoretical paper at the 26th MHD Symposium, June 1988, on using the NERVA reactor on a non-equilibrium pulsed MHD disc generator for Earth orbit military defense, the same application as Zauderer's U.S. Pat. No. 4,851,722. The MHD generator operated at Mach 2.5 with $T_s$ of about 1600° K and $T_e$ of 4500° K to 5000° K. However, the cesium seed was 5×10⁻⁵ in $H_2$, versus 0.1 to 1% used herein. This was done to fully ionize the cesium, which the authors' theory claimed would suppress PT, plasma turbulence. As a result $\sigma$ was only about 12 Mhos/m because there were too few electrons. With no PT, $\beta$ and the Hall voltage was very high and the disc MHD output was computed at 2600 MW/m³, while the authors claimed that the linear MHD generator output was only 10 MW/m³. Both numbers are fiction because there was no data to support the disc prediction, while the GE-MHD shock tunnel generator with Cs seeded argon measured 50 MW/m³ at 2000° K stagnation temperature, which was 1000° K lower than the NERVA's 3000° K. This totally erroneous dismissal of the linear MHD generator and unsubstantiated claims on performance of the disc MHD generator is another example of what led to the demise of MHD power in the early 1980s. It also explains Rosa's statement in the 1987 reprint of his 1967 MHD book that "the feasibility of non-equilibrium ionization is yet to be demonstrated, some encouraging results have been obtained". His reference was to the disc MHD work in Japan and the Netherlands, and he failed to mention the linear MHD generator work at GE 15 years earlier.

In any case, the disc MHD generator is useless for MHD acceleration, and for high temperature MHD power with $H_2$ and $N_2$, the generator should run-subsonic with equilibrium $\sigma$.

The Critical Role of Electron-Molecule Collisions in MHD Power

MHD power is a function of the electrical conductivity that depends on the degree of ionization of the alkali metal gas seeded in the transport gas in the generator and accelerator. Ionization is a function of the electron temperature of the alkali seed electrons and ions. The electron temperature depends of the elastic collision cross-section of electrons with the transport gas, which in open cycle MHD are the products of combustion, and in closed cycle MHD it is the monatomic gas. Monatomic gases, e.g. helium, argon, can be considered as billiard balls with a collision energy loss of (2 $m_e/m_a$), where $m_e$ is the electron mass and $m_a$ the atom mass. Since this ratio is the inverse of about 2000, the electron energy loss is minimal and heating of several 1000° K are achieved, resulting in very substantial elevated electric conductivities.

In sharp contrast, electron collisions with molecules involve energy losses that also are elastic and comparable to those in equal weight monatomic gases. However, in addition there are electron collisions with molecular rotational quantum states, vibrational, and ionization states, each of which result in sharply increasing electron energy losses, which eliminate non-equilibrium ionization in gases from combustion product gases, but not all molecules, as discussed next.

Therefore, to evaluate their potential performance for MHD, the first step is to obtain accurate electron-molecule collision cross-section data. Such data collection has been on going at increasing depth since early in the 20th Century, and greatly accelerated in the second half of that Century, most of which is US Government sponsored research.

Inelastic collision losses are expressed as a number for the term, $\delta$. MHD researchers in the 1960s used the $\delta$ data reported in a book by Craggs and Massey—"Collisions of Electrons with Molecules" (Handbuch der Physik, Vol. 31/1, 1959): Although they reported that differences in the measured values for some molecules depending on the measurement method, the MHD community used only one set of values. The result was that decisions in the 1960s and 1970s on how much molecular gas concentrations could be tolerated in a noble gas before non-equilibrium ionization would be quenched were based on this one set of values of $\delta$. Then when the steady state non-equilibrium MHD experiments that operated at under 3000° F. due to limitation of electrode gas heaters and due to the small size of the experiments of a few centimeters MHD channel diameter failed to produce any results, the prime suspect was the molecules based on these values. It never occurred to anyone that may be the electron-molecule inelastic collision cross-sections were much smaller and therefore operating the MHD generator at higher gas temperature, non-equilibrium ionization would be feasible, especially in some biatomic molecules, $N_2$, $H_2$. In revisiting this issue for the present invention, this Inventor found late 1980s papers by Japanese researchers who reviewed the very extensive research on electron collisions with $N_2$, $H_2$, $O_2$ and atomic oxygen, published in the Journal of Physical and Chemical Reference Data by the American Institute of Physics (AIP) under the auspices of the U.S. National Institute of Standards and Technology (NITS). The most interesting result of this massive review of the status on this field was that the collision data still was not complete.

The purpose of this comment is to emphasize that accurate data on the collision cross-sections is critical for MHD power applications. In the heyday of MHD in the 1960s the accepted wisdom was that only combustion of a fossil fuel at extreme temperatures of 4500° F. under equilibrium gas-electron temperatures was suitable for power generation, despite the harsh environment and minimal electric conductivity in the 10 Mho/m range. This required massive 1000 MW electric MHD generators for efficient commercial power plants. This narrow focus was compounded during the 1973 oil crisis by using only coal as the fuel. Non-equilibrium MHD was assumed to work only with noble gas with a nuclear heat source, and it required a purged refractory heat exchanger fired with gas as an intermediate development step to nuclear heat. Once coal became the energy salvation, every power system had to use coal, which for closed cycle MHD was doable but extremely costly due to the need for over one dozen massive heat exchangers for gas purge cycling, as reported in the governments ECAS study in the mid-1970s. It was known that other gases could be used, primarily hydrogen, but only under equilibrium conductivity at peak gas temperatures above 3000° K. That non-equilibrium MHD with bi-atomic gases, namely nitrogen and hydrogen might be used was not considered. This might not have been the case if more electron-molecule collision data had been available. Even now, four decades later there is no freely and readily available cross-section data. Therefore, this invention discloses using metal fuels at high enough equilibrium gas temperatures to enable efficient MHD power, followed by gradual temperature reduction in the hydrogen or nitrogen to determine feasibility of non-equilibrium MHD.

The use of cesium-seeded hydrogen at high temperatures of 3000° F. and above was considered for pulsed power MHD, as cited above in this Inventor's U.S. Pat. No. 4,851,722 However, it was not considered as a continuous long duration power source, and certainly not with nitrogen, whose electron loss factor $\delta$ is about double that of hydrogen in the patent.

While staring them in the face, MHD researchers in the entire non-equilibrium research field four decades ago overlooked the significance of the huge difference between $\delta$ in biatomic molecules, such as nitrogen, oxygen, hydrogen, whose values are less than 10, and heteroatomic molecules, such as CO, whose value is over 100, and NO with values of 1000, and $CO_2$ with values of several 1000, all of which are products of fossil fuel combustion. This difference was recognized by researchers in MHD in the 1960s, as evidenced in two important MHD books by Rosa and by co-authors Sutton and Sherman. They both cited the $\delta$ data in Craggs and Massey in "Collisions of Electrons with Molecules" (Handbuch der Physik, Vol. 31/1, 1959). Nevertheless, Rosa stated: "Because of the high values of $\delta$ there seems very little hope of inducing useful non-equilibrium effect in molecular gases" (emphasis added by this Inventor). What Rosa certainly had in mind were products of fossil fuel combustion, as did all others. The result of this statement was to steer away non-equilibrium MHD researchers from considering diatomic gases as a seeded MHD working gas.

The MHD Generator-Accelerator:

Another benefit of using the MHD generator to drive an MHD accelerator is that the gas exhaust from the MHD accelerator still contains substantial additional thrust that can be used as it expands into the atmosphere or into Space.

A metal oxide heated, cesium seeded nitrogen gas flowing through a MHD generator at 4300° K stagnation gas temperature that is designed to extract one-half of the stagnation enthalpy, would reduce gas temperature at the generator exit to about 2150° K. This would reduce the equilibrium electrical conductivity to less than 1 Mho/m, which cuts off power, unless non-equilibrium ionization could be applied to the cesium-seeded nitrogen. If equilibrium power is still desired the MHD power that drives the gas in the MHD accelerator, must be reduced by reducing the enthalpy extraction to about 25%, which yields an exit temperature of about 3225° K, and at roughly 2 atm. static pressure (from 10 atm stagnation) and an equilibrium conductivity of about 80 Mhos/m, more than enough for MHD power.

Powering the MHD accelerator is much simpler. In an MHD accelerator the transverse load factor K is negative, and the generator electrodes drive the accelerator electrodes. Assuming a K of (−1) yields a power input in the term (1−K) equal to minus 2. (Note: The electromagnetic force vectors are governed by the "right hand rule: in which current, velocity, and magnetic field, J×U×B, are orthogonal. Therefore in the MHD generator, the force on the gas velocity is upstream. Therefore, in an MHD accelerator, B must be directed 180° opposite to the MHD generator direction in order for the J×B force to face downstream. If the same magnet is used for the MHD accelerator and generator, the applied voltage K must exceed the induced Faraday voltage U×B. In the calculations in this section it is assumed that K and U×B are in the same direction to show the MHD potential. This reversal can be done by reversing the voltage and current direction by 180° in the magnet that covers the accelerator section of the channel.

Since a high velocity is desired to increase acceleration, M=2 is assumed, which yields a static temperature of 0.6280×3225° K=2016° K.

So for $N_2$ with $\gamma=1.3$, $(1-K)^2=4$, $M^2=4$, $\beta_{eff}^2=4.41$ at B=4T, $\delta=7.8$, equation (2) yields $T_e=4.92*T_o=4.92\times3225°$ K=15,867° K. The electrical conductivity with 0.1% cesium at this electron temperature would be 6,000 to 8,000 Mhos/m. Even using the static gas temperature, $T_g$, of 2016° K, in place of $T_o$ in equation 2, yields Te=9,919° K, which yields a $\sigma_3$ of 2000 Mhos/m with 0.1% Cs. The gas velocity at 2016° K and M=2, is 1310 msec. and the acceleration power density into the $N_2$ is $P_{in}=\sigma_3 U^2 B^2 K(1-K)=110,000$ MW/m³. This number is unrealistic because one cannot take out more power than power put in, in this case, either 628 MW/m³ with $\sigma_1$, or 2198 MW/m³ with $\sigma_2$.

To validate the calculations in the previous paragraph, it was assumed that in this accelerator, the magnetic field is aligned to induce the U×B voltage vector in the same direction as the applied electric field. This requires the field direction in the upstream MHD generator to be flipped 180°, whose feasibility depends on the space between the accelerator and generator.

If magnet rewiring of the magnet that covers both the MHD generator and accelerator is not feasible for any reason, an alternative, enabled by the high power density in the MHD generator could be to insert a separate MHD generator channel in parallel to the MHD accelerator channel whose outlet gas would be directed into the MHD accelerator channel.

However, there is an even more interesting alternative. It has been established by this Inventor and confirmed by other MHD researchers, such as the Eindhoven University MHD Group, of the existence of "streamers" in the transverse inter-electrode directions that generally follow the electrode segmentation. Those researchers considered streamers an adverse effect and decided to switch their non-equilibrium MHD research to the disc generator, as did Japanese and others in the US. The disc has two flaws. One, there is no assurance that circumferential streamers are not worse in large generators in that they may concentrate at one radius. Two, they cannot be used for efficient MHD accelerators due to the need to change direction of the flow three 90° turns. In this inventors research no adverse performance effects from transverse streamers were observed in numerous shock tube MHD tests. More important, the streamers are certainly regions of elevated electric conductivity. Therefore, if the applied voltage to the accelerator could be synchronized with the streamer frequency the applied current inside the streamers would be enhanced which would enhance the J×B force.

Even with 50% enthalpy extraction, which results in a static gas temperature of 1350° K, yields a $T_e$ of 6,642° K, and $\sigma_4$ of about 400 Mhos/m. Here $P_{in}=\sigma_4 U^2 B^2 K(1-K)=22,000$ MW/m$^3$, which is again much too high, but it shows that MHD acceleration can cover a very wide energy range. However, in this case non-equilibrium ionization is essential in the upstream MHD generator.

The point of these accelerator calculations is to show that the accelerator is not the limiting "showstopper". It is the generator that must provide sufficient power to drive the accelerator. The metal fuel heat source provides the power for the high ship propulsion application far better than nuclear. These calculation examples show the huge advantage of MHD power and MHD acceleration for land, sea, air, and space transportation over other forms of power, and also show that metal fuels used for transportation by transferring the very high temperature metal oxide products of combustion to the MHD working gas are a far superior power source than direct use of fossil fuels and even very high gas temperature pebble bed nuclear MHD power generators and accelerators.

The critical requirement for metal fuel use is the capability of recycling the metal oxide products of combustion that result from using dry air or oxygen and hydrogen or water, especially for outer Space, as both the metal oxidizer and MHD power gas, by using the energy from a unique coal fired power plant that yields hydrogen (U.S. Pat. No. 7,282,189) to reduce and recycle the metal oxide into metal and metal hydride MHD power fuel and acceleration fuel (U.S. Provisional Application 61/532,601), or gas cooled 2000° K nuclear reactor in remote regions, e.g. Space bodies.

The advantage of the disclosed power systems derives from understanding the role of thermodynamics and heat transfer in power cycles, both for stationary and for transportation. The efficiency of a power cycle increases with peak temperature, which is known to all students of the thermodynamics of power cycles. What is widely overlooked is that the key challenge of power cycles is transferring the heat from the source to the power cycle working fluid.

Metal Fuel and MHD Propulsion in Outer Space

Metal Fuel and MHD propulsion can be applied to space rocket power for propulsion and for on-site rocket power and for nuclear power in space stations; on the Moon, Mars, the moons of the outer planets, and large asteroids.

There are situations where nuclear propulsion needs to be augmented with light atomic weight metals, such as beryllium, because rocket propulsion is a function of the gas exit velocity from the rocket, which increases with increasing peak stagnation gas temperatures and pressures. Nuclear reactors with graphite reactor cores are limited to peak gas temperatures for hydrogen propulsion to about 2778° K (5000° R). On the other hand, beryllium in oxygen to form beryllium oxide droplets can heat hydrogen to the adiabatic flame temperature to 6,250° K (11,250° R) at stagnation pressures of 100 atmospheres and exhaust it into space, and the hydrogen thrust will be much greater than with nuclear heat at its lower peak temperature.

For missions to Mars and beyond, both energy sources are essential if the objective is to reduce the transit time to about one month from 6 months.

With either heat source there are two thrust options:

1) One is to expand the heated hydrogen into space.
2) The other is to expand the hydrogen to about Mach 0.8, which lowers the stagnation temperature by about 10% and seed it with 0.1% to 1% cesium that results in an equilibrium electric conductivity of about 30 Mhos/m at 2500° K and 20 atm static, to 1000 Mhos/m, 5600° K and 60 atm static for the combined nuclear and beryllium heat sources, a magnetic field of 6 Tesla, a load factor in the MHD generator of about 0.8, would yield from about 2,000 MW/m$^3$ to a huge 170,000 MW/m$^3$, respectively. This would provide massive power to a co-axial or adjacent MHD accelerator with non-equilibrium ionization-electric conductivities to yield higher velocities than with the first option. In addition, when the hydrogen exits the MHD accelerator, it continuous to expand down to almost the zero pressure of Space. (This MHD option is discussed further below.)

What is unique in this application is that the beryllium micron size particles burn in oxygen to form liquid beryllium oxide that on impact to the liquid oxide covered wall stick on the liquid beryllium oxide on the combustor walls and are either retained in a chamber on the rocket for reprocessing into oxygen and beryllium by energy from the on-board nuclear reactor for reuse or carried to the destination for reprocessing there or dumped into space. In either case, the BeO particles or droplets heat the hydrogen propulsion gas directly which means that heat transfer is extremely efficient. Thus despite the added weight of Be and $O_2$ which can exceed the weight of a nuclear reactor, the thrust of the rocket could greatly exceed that attainable with the lower temperature nuclear reactor. This results in much higher speeds that offset the added weight.

Metal particle combustion as a MHD generator heat source was disclosed in Zauderer's U.S. Pat. No. 4,851,722, which by reference is incorporated herein in its entirety. However, the applications therein were as a power source for short multi-second pulses. At no time was there any claim that this metal fuel fired MHD generator could be used to drive an MHD accelerator for rocket propulsion, certainly not for planetary missions to Mars. A strong proof is that all literature on Mars missions dismissed chemical propulsion because the focus was on using the nuclear power to drive the rocket. However, despite the extensive use of the word MHD as a solution for future interplanetary travel even including manned travel, this was always associated with undefined power sources or power sources that consist of technologies that look good on paper but have no supporting experimental test data. Examples selected at random, are positrons, plasma jets, inertial confined fusion, etc. All had one thing in common, the need for 10 or more years to develop. That has been the time frame since the days of NERVA nuclear rockets in the 1960s. In sharp contrast, the metal fuel thrust method disclosed herein can be demonstrated almost immediately with modest funds.

Using Planetary Water for Interplanetary Rocket Propulsion

On October 2010, NASA announced that impact by a rocket that was deliberately crashed into a crater at the Moon's pole revealed from the dust cloud the existence of significant amounts of ice water and chemicals, including hydrogen. This greatly increases the prospects for manned space travel by nuclear rockets to the planets, beginning with Mars as the first candidate.

Water has been previously detected on the poles of Mars.

Also recently astronomers reported that the water exists on asteroids in the outer Asteroid Belt on the side of Jupiter, and probably on the moons of Jupiter and those of the outer planets.

The significance of this discovery for "refueling" for interplanetary travel is stupendous. It opens the path for refueling on the way to the destination, at the destination, and on the return. This is possible because water would be dissociated in the rocket into oxygen and hydrogen. The $O_2$ will react with the metal, preferably beryllium, which will heat the $H_2$ that provides the rocket thrust. There is also a possibility that suitable metals could be found at said locations. But water alone opens the path toward deep space explorations. As presented in this application, gas cooled nuclear reactors alone cannot provide sufficient thrust to reach planetary destinations.

Incredibly this application is an unanticipated combination of MHD power with slagging coal combustion technologies.

The 1960s NERVA Nuclear Power Program for Manned Missions to Mars:

The common way of stating the use of rocket propulsion systems has been the "Specific Impulse" (SI) function, which is a measure of the thrust of the vehicle, and it is expressed in "seconds". The term equals the thrust of a rocket divided by the mass of fuel ejected to drive the rocket. For storable chemicals it is 330 sec, for cryogenic chemicals it is 440, for nuclear heated gases, such as hydrogen, it is 825 sec. This clearly shows the supposed advantage of nuclear. However, when applied to electromagnetic propulsion, which includes ions, plasmas, etc., this term is grossly misleading. Ion electric thrusters have SI ranging from 2000 to 10,000 seconds, which have been used to send probes to the outer planets, including the little vehicles that landed on Mars. There is one big problem with these ultra high SI numbers. When converted to thrust, the force that drives the rocket, the 825 seconds of the NERVA nuclear rockets converts to 240,000 lb. force, or 1.06 million Newton. This is sufficient for a manned Mars mission of 1 to 2 year duration with a landing on Mars. It was to be implemented with the total rocket firings per each leg of the mission at the beginning of each leg for less than one-hour total duration followed by drifting for one-half year, each way. Based on the current knowledge of space and Mars after decades of unmanned research rockets, this plan is unrealistic and the chance of success is negligible to none.

However, in sharp contrast, the ion thruster's 10,000 SI is huge but the thrust is a miniscule mass flow rate. Velocities with ion engines can achieve 90,000 m/s (200,000 mph) from 40 kW of power from solar panels, or nuclear isotopes. However, the thrust is only around 0.5 Newton (0.1 lbf). These missions are meant for probes with travel periods of years. This clearly shows that these engines are not meant for heavy loads, and certainly not for manned missions. This deficiency of ion engines is mentioned because proposals have been advanced to use plasma thrusters for travel to Mars in 39 days at speeds of several 100,000 mph without defining the power source. The present invention will show how MHD generators and accelerators can implement the movement of heavy loads and future manned travel to the Moon, Mars and beyond at such high speeds to reach the target in a matter of weeks.

After reflection on this matter, this Inventor concluded that there does not seem to be a NASA program to place large loads, much less humans, on Mars and return. In fact, neither is there a program for travel to the moon for extended periods. Interestingly a proposal was recently reported to send senior citizens to Mars and leave them there never to return. However, the present invention could lead to manned space travel to the Moon certainly, and to Mars very possibly in the near future if this invention is followed.

Comments on the Origin of the Manned Nuclear Rocket to Mars:

The NERVA manned nuclear rocket program to Mars of the 1960s envisioned Earth orbit takeoff, mid-course correction, Mars orbit on arrival, Mars landing module, Mars takeoff to orbit vehicle, takeoff from Mars orbit, acceleration and retro firing slow down for Earth landing. Each of these steps places huge stresses on the rocket structure. Also, using hydrogen as the rocket thruster adversely affects the nuclear reactor core due to its chemical reaction with graphite, which weighs half as much as metal refractory, such as aluminum oxide, or magnesium oxide. Graphite reactor cores were dictated for the NERVA nuclear rocket missions to Mars. The plan anticipated that the short firing time in each of the above cited steps of a Mars mission would not be of sufficient duration for the hydrogen to damage the graphite core. This short duration argument is flawed. The hydrogen will react with graphite. Also, the rapid change in gas pressure during these brief firings subjects the reactor core to high pressure, which would damage the core.

As to details, the NERVA nuclear power rocket engines were designed and tested with thermal input in the 3000 to 5000 MW range. The rocket engine would weigh in the 22,000 to 35,000 lb. force range, the engine thrust was to be in the 145,000 to 240,000 lb. force range, the Specific Impulse from nuclear power would be 825 seconds, and the total rocket weight with fuels would be in the 2 to 4 million pound range of which about 60% was hydrogen fuel. These weights were from 50% to 85% lighter than chemical rockets. The total mission times depending on the distance from the Earth to Mars orbits and the mission trajectory would range from about 400 to over 800 days. For the Mars landing with a stopover from 30 days and up, and a total travel time from 400 to 1000 days, an 8 astronaut crew, required a 70,000 lb. mission module and an 140,000 lb. Mars landing module.

The rocket firings for one 5000 MW per rocket case was 765 sec. by three 240,000 hp rockets from Earth orbit followed by 50 days of coasting, then mid-course correction and approach Mars with a single 240,000 hp rocket firing for a total 1060 sec. during the period of another 250 days of coasting, which ended with 30 days on Mars, and return to Earth with 557 sec. firing and 250 days of coasting and Earth braking and re-entry. The total rockets firing time was to be 3912 seconds or 1.08 hours at 5000 MW, which equals 5400 MWH (thermal) for a trip that would take 550 days. All this is with a limit of 825 seconds specific impulse (SI).

A quick look at these numbers shows the irrationality of a manned flight to Mars even with a nuclear rocket using the NERVA propulsion. To move the 8 astronauts in a 60,000 lb. module requires a 2 to 5 million pound loaded nuclear rocket, and on a mission that makes them just passengers for over one year with almost no control to change direction in case of a mishap. More important, recent medical research questions whether astronauts could survive radiation in space and on Mars, and survive mentally cooped up in a small cabin. Tests on the ground with volunteers locked up for 6 months now in progress prove little because mentally, the volunteers on the ground know that they can simply walk out at any time.

In contrast, the present invention discloses a much more realistic solution that can be implemented in about one month each way with high thrust from a joint metal fuel and electromagnetic MHD propulsion with mission control the entire way to Mars and back to Earth. In addition, and this is very important, it is now proposed that the initial missions over a series of years be done with unmanned vehicles, but with gradually increasing payloads, and with the goal of preparing the Moon and Mars for human landings once all the mission aspects are clarified.

The 1960s analyses with the NERVA nuclear reactor with hydrogen can be transferred directly to the proposed propulsion gas, hydrogen. It is also now disclosed to use a much higher specific impulse and thrust that are attainable with higher hydrogen temperatures and higher specific impulses and electromagnetic acceleration of electrically conducting gases, also called plasmas. The nuclear power would supply the heat to an equilibrium and non-equilibrium electrically conducting MHD generator, which could operate at up to 4,500° F. and reject heat from radiators above 1000° F. into space. However, radiators will at most be needed for a small part of the heat rejection. The same design nuclear-MHD power plant could support manned and unmanned colonies on the Moon, Mars, and on some moons from the outer planets. Another very important feature is to use chemical propulsion, preferably with fine beryllium particles fired with oxygen especially during the high power rapid acceleration parts of the mission, namely during takeoffs, direction changes, and landings. One reason for using metals is to overcome the limitations in a solid nuclear reactor to transfer heat to a gas, which is much more rapid from dispersed liquid metal droplets and is essential in case of rapid propulsion change to avoid object in space. Also, with metals, such as beryllium, comes the ability to achieve stagnation gas temperatures up to 6000° K (10,800° R) at 100 atm, which is double that achievable with gas cooled nuclear reactors, such as NERVA. The Specific Impulse of 1620 seconds is double the 825 seconds of the nuclear NERVA rocket with the same gas, hydrogen. This can be achieved with metal fuels, especially beryllium.

To all these novel aspects an even more very novel solution for interplanetary travel is disclosed, namely using water, which is found on the Moon and Mars and other Moons, some asteroids in the outer asteroid belt, in the Solar System and nearby stars, as the metal fuel oxidizer, oxygen and the propulsion gas, hydrogen. The water would be heated by the nuclear reactor to about 3000° K and followed by the beryllium heating to 6000° K. The hot steam-beryllium reactions will dissociate the water and produce liquid BeO particles that entrain on the liquid BeO walls of the combustor for removal to a metal oxide collection chamber with the objective at capturing 90% to 95% of the oxides for reprocessing to metal at the rockets destination. Be and other metals react with oxygen at much higher temperatures than hydrogen so that there is no concern than hydrides will form.

Incredibly proof of this statement comes from the Japanese Fukushima nuclear reactor disaster. The hydrogen explosions that were broadcast worldwide were the result of the cooling water pumped on to the reactors to cool them that was insufficient to prevent the reactor cores from heating to somewhere about 2500° C., where the zirconium in the reactor cores reacted with the water to form $ZrO_2$ and release the hydrogen in the water. While ZrH, a gas, could also have formed in the reactor, its concentration must have been minimal otherwise there would not have been much hydrogen to cause the massive explosion. While there is also BeH, it would be displaced by the oxygen. In any case its vapor pressure would be extremely low and it would not impact non-equilibrium ionization.

The key benefits of using water are:

1) It is available at the origin, namely, the Moon, and the destination, Mars, which eliminates the need for huge rockets to launch through the Earth's atmosphere and gravity.

2) Its density is 62.4 lb/ft$^3$, while liquid $H_2$ is 4.44 lb/ft$^3$, and liquid $O_2$ is 7.11 lb/ft$^3$, which means the rocket would be much smaller than a nuclear rocket with only hydrogen, such a NERVA. In outer space or the Moon and Mars, there is little gravity and minimal air drag on Mars, so there is no need for massive lift rockets on departure. Therefore, acceleration and deceleration can be implemented over much longer periods than the 2 hours total firing time on NERVA. One proof is the tiny probes that have been launched for decades to explore the solar system. Despite their infinitesimal thrust of a few Newton, the very high Specific Impulse in the thousands of seconds has enabled them to reach the edge of the Solar System in voyages of a decade duration. The present invention discloses how to accomplish high thrust and high Specific Impulse in large space ships in short time periods The invention also discloses exhausting from the MHD generator into an MHD accelerator using hydrogen seeded with cesium. This gas for power generation could be used for rocket acceleration and deceleration. This is accomplished by reversing the electromagnetic force vector by 180° into the downstream section of the MHD channel. The MHD generator becomes an MHD accelerator suitable for powering rockets. In other words, the power output from the upstream electrodes will be connected to electrodes in the downstream end of the MHD channel. In the generator, the electric force vector, $J \times B$, (where J is the current density and B the magnetic field) is directed back toward the MHD channel, while in the accelerator, it is directed downstream. To the best of this inventor's knowledge, although proposed, this reversal has not been tried before, and it may cause plasma instabilities.

If the two channels have to be separated then it will be necessary to slow down the gas exiting the MHD generator channel in a gas diffuser, and redirect it to an accelerator consisting of a nozzle, an MHD accelerator section followed by exhaust into space without a diffuser. The only difference, if this latter option is needed, is to make the rocket somewhat larger by placing both the generator and accelerator channels next to each other inside the same magnet core.

Now if a separate MHD generator and MHD accelerator is used, it would still be desirable to use cesium seeded hydrogen for both units because the spaceship will need on board power which requires a radiator. A benefit with hydrogen is that one can inject lithium at the MHD generator exit to form Lithium Hydride, LiH, which is a liquid at 1270° F. The LiH can then reject the MHD cycle heat in a radiator, followed by compression in an electromagnetic pump to the inlet pressure of the MHD generator. The lithium will then be separated from the LiH by boiling heat from the nuclear reactor that is followed by further heating of the hydrogen to about 3540° F. (4000° R), and probably to 5000° R, (2778° K) and then seeded with about 0.1% lithium or cesium upstream of the MHD generator inlet in order to achieve high non-equilibrium electrical conductivity. The cycle is repeated as shown in FIG. 3.

This hydrogen-LiH cycle is discussed in Zauderer's Terrestrial and Space based Pulsed Power MHD U.S. Pat. No. 4,851,722. The application there was pulsed power and the fuel was a metal, namely, Al, Mg, Be, Zr, that is oxidized to form liquid oxide droplets that directly heat the hydrogen while the metal oxide is removed by cyclonic $H_2$ gas flow in the combustor before the alkali metal seeded hydrogen enters the MHD generator.

The present application is different. The LiH cycle is used only for part of a MHD cycle to provide on-board power to the spaceship for weeks and months on end. Therefore, the function of the LiH in the Brayton cycle is to replace the gas compression part and heat rejection part of a gas only Brayton cycle. However, this radiator heat rejection is only a small part the output of the MHD generator, which is to power the propulsion of the MHD accelerator. The hydrogen that exhausts into space rejects most of the heat and there is no need for a heat rejection radiator for this function. Since the on-board power part of the MHD generator must operate for extended periods in the spaceship but at far less power than the MHD accelerator, the heat rejection from this part of the gas Brayton cycle could be satisfied with gas compression or LiH compression depending on the results of a tradeoff system analysis. For space based power the benefit of LiH is to sharply reduce the liquid compression power.

Figure 3:
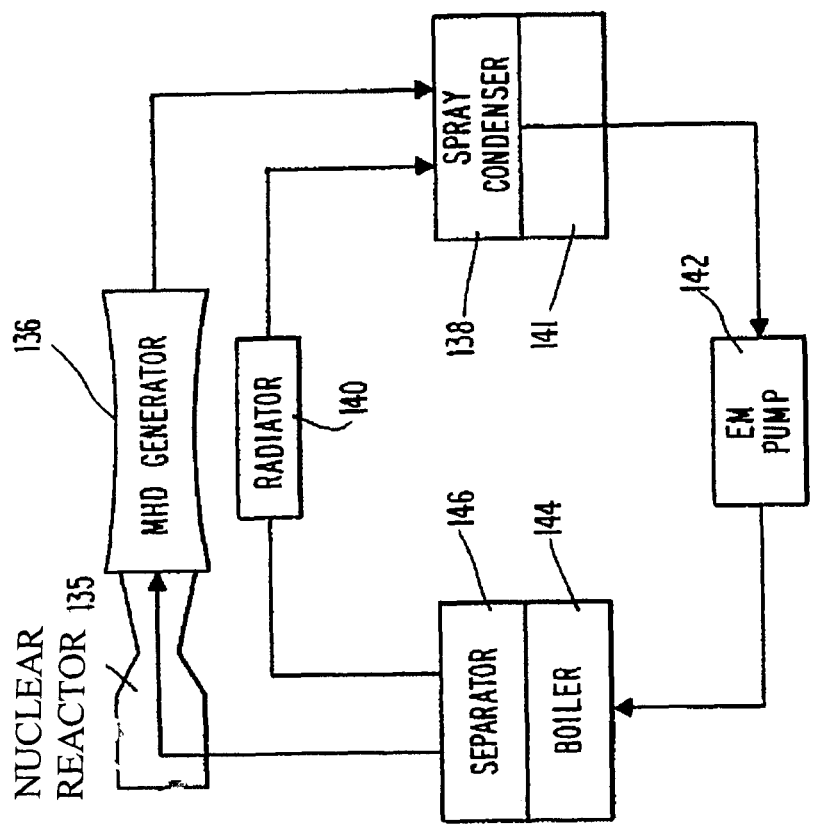
FIG. 3 is a schematic of an on-board MHD power plant into which some of the heated $H_2$ is drawn from the nuclear reactor in FIG. 2 that is seeded with 0.1% to 1% cesium or lithium to power an MHD generator at whose outlet the gas is mixed with additional lithium to form a lithium hydride liquid that is compressed into an electromagnetic pump to the cycle's stagnation pressure, and followed by heat rejection to space in a radiator, while the lithium hydride and cesium is heated to boil off the hydrogen prior to the $H_2$ re-injection into the nuclear reactor, while the cesium is re-injected at the reactor outlet, and the lithium liquid is pumped to the MHD generator outlet.

FIG. 3 is a modified drawing of the Li—H cycle in said U.S. Pat. No. 4,851,722, to the present application. FIG. 3 shows the lithium hydride, MHD power cycle for space application. This closed cycle space-based MHD system uses the hydrogen as the generator working gas, into which 0.1% to 1% cesium is injected as the $H_2$ leaves the nuclear reactor at a temperature of 2000° K to 3000° K to render it electrically conducting to generate electric power in MHD generator 136, from which it exits to enter a Spray Condenser 138, in which it mixes with liquid lithium at a temperature above its 1270° F. liquefaction temperature, that exits the radiator 140, which rejects the cycle heat temperature at above 1270° F. into Space. The Hydrogen and Lithium combine to form lithium-hydride in the spray condenser 138. The lithium-hydride is stored in a receiving vessel 141 from which the lithium-hydride exits into an electromagnetic pump EM Pump 142 to the combustor stagnation pressure. Then the lithium-hydride is heated in the boiler portion 144 of a separator/boiler unit 146, The Hydrogen is separated in the separator portion 146 and heated in a separate on board pebble bed nuclear reactor 135. At the reactor exit the hydrogen is seeded with cesium and flows to the MHD generator 136, while the lithium liquid flows into radiator 140 where it is cooled and then supplied to Spray Condenser 138. In this continuously operating cycle, radiative heat rejection to space occurs in real time.

In contrast, gas compression power in space is relatively high due to the high heat rejection temperature of the Brayton in space. However, as noted above, if the MHD generator exhaust is turned into a MHD accelerator, the need for LiH is sharply reduced because it is used for on-board power generation, which is a small fraction of the total power generated. Instead of LiH for heat rejection and compression, which involves chemical reaction with hydrogen, other methods are available, such as emulsions of the hydrogen with non-reacting liquid metals, which have been studied in past MHD research but these are not advocated due to their added complexity and measured lower efficiency.

In summary, the selection of LiH for compression and heat rejection is to offer a solution to the electric power part of the MHD cycle. However, the main function of MHD power for space travel is its use to produce high thrust. Using nuclear closed cycle MHD is entirely different and much more realistic for unmanned and manned Mars missions, as opposed to those promoted by the NERVA Mars mission in which the rocket ship is hurled on each leg of the round trip mission in short bursts. In contrast to the prior art in the cited Patent for the pulsed power applications, nuclear power was not an option due to its limited time mission use.

It is interesting to note that concurrent with NASA's 1960s manned Mars NERVA Nuclear Rocket test program, NASA was also involved in the closed cycle, non-equilibrium, MHD power program. While there was an implicit assumption that Closed Cycle MHD could be connected to the NERVA nuclear rocket, the funds committed to this effort were negligible.

As discussed earlier in the Space Nuclear Power Section in this application, the lack of funds for MHD was based on the assumption that existing technologies would be used to implement the mission and that no new and better technologies would render the existing technologies obsolete. The history of science and technology has repeatedly shown the error of a "stand pat" model, yet it continuous to be pursued to this day. The primary reason for its continued popularity is that the existing stakeholders benefit from the status quo and they use their financial and political clout to maintain it. This same status quo approach drove the nuclear rocket program. The original mission in the nuclear rocket program was to be the last stage in the manned lunar landing program, but then the focus suddenly shifted to an improved Saturn rocket for the Apollo moon effort. In retrospect in recalling the events of the early 1960s, it is probable that the original plan was to reach the moon in one step, as had been proposed by Jules Verne in the $19^{th}$ Century. The solution of circling the Moon and sending a lunar module to land with only two astronauts appeared early in the Apollo program. It required a great deal less fuel and that was almost certainly the real reason for removing the nuclear rocket from the Moon landing. Circling in Moon orbit became the accepted method, and was included in the Mars plan.

Figure 5:
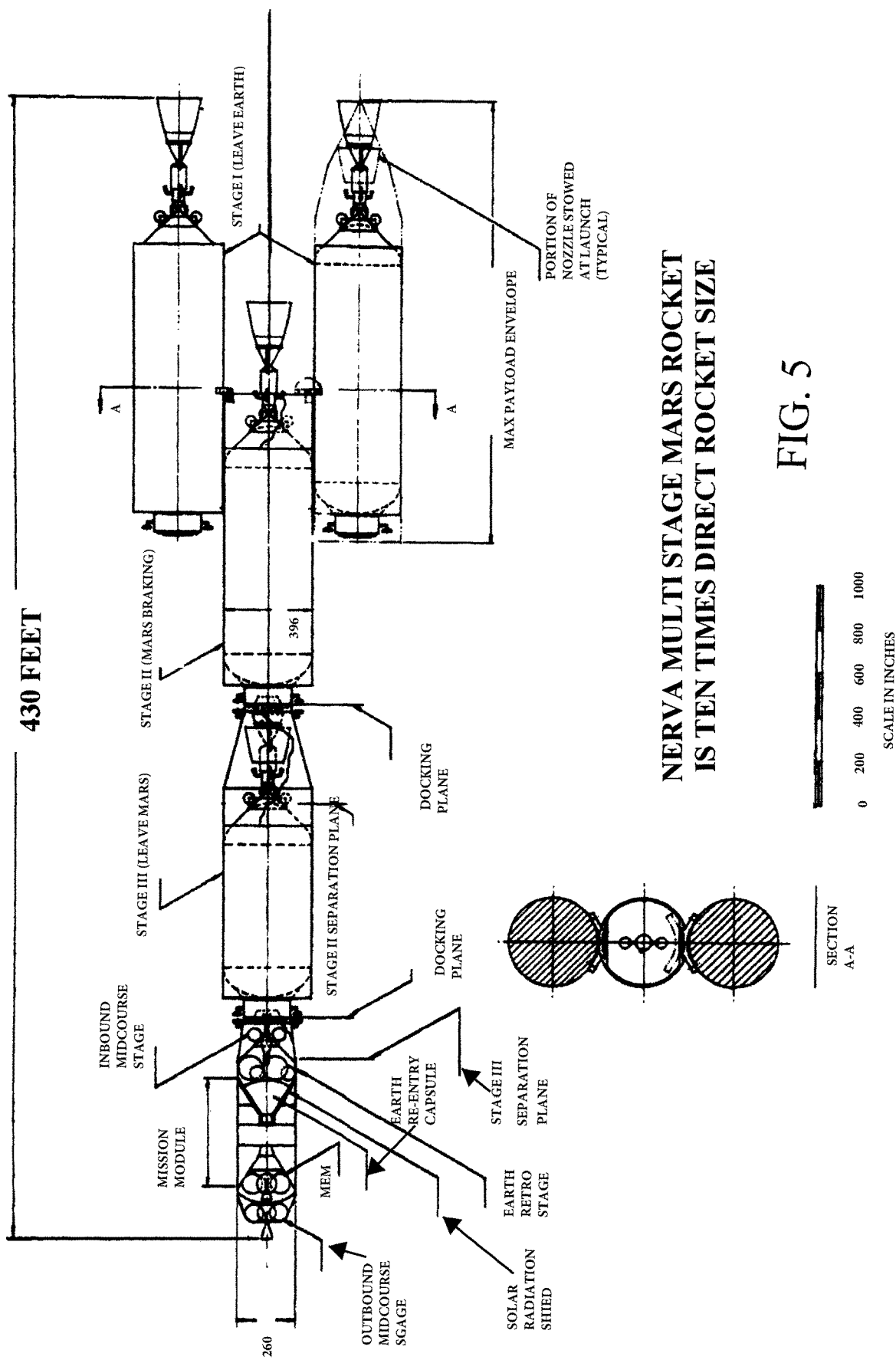
FIG. 5 shows a typical NERVA Mars multi-stage 430-foot long rocket weighing 1,930,000 lb. of which 61% of the weight is for liquid hydrogen, which is over 10 times the volume of the present Mars rocket with a nuclear reactor, beryllium, water and liquid hydrogen.

Various groups performed very extensive analysis in the 1960s on manned Mars missions. One such study funded by NASA by a team headed by TRW that was published in 1965 in nine volumes, and cited in at least one nuclear propulsion symposium held under the auspices of the AIAA $3^{rd}$ Propulsion Conference in Washington, D.C. on Jul. 17-21, 1967 is discussed herein. The massive study analyzed very numerous Mars mission variations, such as a Mars landing or a Mars flyby, with an Earth recovered payload of 15,000 lbs. In one set of cases, the Mars Lander weight was 144,000 lb. with 8 astronauts. In another set of cases the Mars Flyby Module of 70,000 lb. had 5 astronauts. The weight of the entire rocket with NERVA nuclear power was in the range of about 2 to 8 million pounds, depending of the trajectory and the mission year-date selected. The nuclear engine power ranged from 3000 to 5000 MW, the single engine thrust was 145,748 lb. to 241,412 lb. force, the engine weight from 21,770 to 33,498 lbs, and the Specific Impulse was about 827 seconds. A three-rocket cluster was used from Earth Orbit takeoff and dropped, followed by single engines for succeeding legs. The burn times depended on the engine power, mission and year date ranged from 738 to 1748 seconds leaving Earth, from 993 to 1892 seconds arrival on Mars, and from 658 to 1147 sec. for leaving Mars. FIG. 5 shows a cross-section of this rocket.

As stated above, this should be called the "sling shot" plan. As noted its flaw is that all the rocket power is consumed on takeoffs and landings, leaving only enough fuel for a mid-course correction with no room for changes due to space object avoidance, emergency from breakdowns, illness of occupants, especially with total round trip times ranging from 400 days to 1000 days including short stays on Mars. These deficiencies were known at the time, but nevertheless funding near $200 million continued to the early 1970s.

More important, a potential Mars "showstopper" was discovered in the past decade that adversely affects landing with large payloads on Mars. The 1960s plan was for a parachute landing. The problem with balloons was discovered during NASA's Mars landing with tiny robot vehicles that weigh less than 1000 kg. It was found that the thin Mars atmosphere is so unstable that it would interfere catastrophically with larger vehicles during entry. This point is raised to show that it is unrealistic to consider manned flights the Mars before extensive unmanned missions in the rocket size range of a Mars manned mission are implemented.

Note added Aug. 8, 2012. On the $5^{th}$, NASA's 1 ton Probe Curiosity landed on Mars with a complex landing method, which shows that NASA had found a solution to this problem that would not work for the 5 larger earlier probes that used bouncing on landing. The 1960's balloon descent would not work, (See FIG. II-1, TRW-NERVA Final Report, N65-35350, March 1965). It is very doubtful whether the present NASA method would work. However, with a 1-month travel time there would be multiple opportunities to try methods in various size landing vehicles.

The "Shovel Ready" Non-Equilibrium Conductivity-MHD Power Technology

In view of the key roles of the MHD generator in this Invention it is necessary to show that its technology is developed to the point where a prototype could be fabricated to implement the objectives of this Invention, which is propulsion on Earth and Outer Space.

The first step was to prove that magnetically induced non-equilibrium ionization and electric conductivity works was demonstrated in the 1960s R&D tests by this Inventor in a small MHD generator (2"×2" cross-section×12" long) channel in a shock tube with a 100 μsec pulse. This was done by gradually lowering the gas temperature behind the shock from about 8000° K in xenon where equilibrium ionization exists to about the 3000° K range where only non-equilibrium ionization can produce MHD power. With a few exceptions, the rest of the closed cycle MHD researchers used tiny electrically heated noble gases, seeded with cesium, at about 2000° K and produced nothing. This Inventor's data showed that electrode voltage losses exceeded the induced Faraday voltage, (U×B)*D, in all the small steady state facilities. This was repeatedly dismissed by the MHD community. Instead, the blame was assigned to plasma instabilities that were advocated by plasma physics theoreticians, especially those engaged in fusion research were different instabilities were clearly barrier problems. This so-called solution found favor because very costly steady state facilities produce much more revenue.

However, the sponsor of this shock tube research, the U.S. Office of Naval Research supported the next step to erect a supersonic 10 MW (thermal) MHD generator that could produce sufficient power to demonstrate MHD's viability as a power source. Several generator channels were fabricated, beginning with a 3 to 1 area ratio followed by a 6 to 1 area ratio, which extracted more power. The generators were 1 meter long, with a 25 cm×19.1 cm. exit, with 3 to 6 times smaller inlet areas. It was placed at the end of a 1 ft D×40 ft long shock tunnel that provided a 10 millisecond flow, which was 25 times longer than the 400 microsecond gas transit time in the MHD generator. A 4 Tesla pulsed saddle coil magnet was powered by a 10 kV, 1 mega-joule capacitor bank. An extensive 6-year R&D effort with 100s of tests over several years was implemented. This led to 19.3% enthalpy extraction that was equal to 1.82 MW electric power at 1.4 Tesla only, in neon seeded with cesium at 4 to 5 atm and 3000° K to 3500° K stagnation temperature. The static temperature at the generator inlet was 2020° k, and 1200° K at its exit, which required strong non-equilibrium ionization, as per the electron temperature that ranged from 2700° K at the inlet to 2400° K at the generator outlet. The power density was an incredible 220 MW/m$^3$. Now the electrode voltage drop was 150 Volts, which in a 10 to 20 MWe generator would have been negligible, and result in 30% enthalpy extraction. By comparison, the massive 40 MW Avco Corp Mark 5 combustion MHD generator, fired with high energy, liquid fuels in oxygen and potassium seed, at 3100° K. 400 MW thermal, put out only 32 MW, or 32 MW/m$^3$ and only 8% enthalpy extraction. More important plasma turbulence and inter-electrode striations, which were advanced by plasma theoreticians as roadblocks to non-equilibrium MHD power, only reduced the conversion efficiency somewhat.

After these shock tunnel-MHD power results were first reported around 1970, the next step was to implement a 50 MW thermal, about 15 MW electric output blowdown experiment of one minute duration. GE's Corporate R&D and Power Generation groups and the utility's R&D EPRI committed initial funds for its construction by which natural gas was to be used to heat cored brick alumina to 3100° F. followed by its evacuation and heating argon to 3000° R and seeding it with cesium. The balance of the funds of several million dollars was requested from DOE's $50 million annual MHD budget that reached $400 million by 1981, However, open cycle MHD advocates arranged to have ERDA, DOE's predecessor, sponsor a study ECAS to compare the various power technologies and to limit the work to massive 1000 MW electric coal fired power plants, which doomed indirectly fired Closed Cycle MHD power due to the need for over one dozen massive ceramic heat exchanger that had to run on coal. They then used this to cut off any significant funding for closed cycle MHD to $1 million out of $400 million total MHD funds. This eliminated the 50 MW MHD blowdown, by 1981 the National MHD program ended. This was compounded by GE shutting down the entire MHD group. This decision permanently destroyed two decades of this Inventor's R&D at GE.

Now the most probable reason for DOE-MHD Group's rejection of the 50 MW blowdown was to prevent delivering 15 MW of power under steady state conditions because this could have led to termination of the massive $400 million coal fired combustion MHD Program.

There was however one small closed cycle program at the University of Eindhoven, The Netherlands, that implemented shock tunnel MHD tests in the 1970s. In the late 1970s, they secured Dutch government funds for testing a 5

MW thermal, argon seeded with cesium MHD blowdown of under 1 minute duration. This Inventor recalls that the GE MHD Group co-operated with them but could not recall the nature of that co-operation. Then in July 2011, when searching on the Internet on MHD work, he came across a one page summary of a Report to DOE No. DOE/PC/12993, dated Jan. 1, 1983 by B. Zauderer "Analysis and evaluation of the US/Netherlands 5-MW (thermal) closed cycle MHD generator experiments at Eindhoven University, The Netherlands". The report reviewed the test effort and offered suggestions on corrections of problems in operation and increasing the power to 401 kW, equal to 7.1% enthalpy extraction, which was about one-third of the computed value. Page 6 of the 75 page report stated: "The US designed and fabricated MHD channel was delivered to Eindhoven in the Fall of 1981". (This was about 3 months after GE decided to shut down the 2 decade long MHD effort at the Space Science Laboratory in King of Prussia, Pa. and lay off the entire 30 person staff.) Furthermore, it was tested initially in the summer of 1982 when a panel cooling water leak delayed further tests until 1983.

Dr. Zauderer did not recall anything about this GE MHD generator in subsequent years, nor recognized its significant until the July 2011 Web site discovery. However, it is very significant for the following reasons.

1) The most important one is that the significance of the tests in the 5 MWt GE MHD channel is the only confirmation of the validity of the extensive 10 MWt GE shock tunnel MHD test results to steady state conditions. Even such unusual results as cutoff of current in the last third of the shock tunnel MHD generator was also experienced in the Eindhoven tests. They both attributed this problem to oblique shock waves that sharply increased the electrode voltage loss. However, the shock tunnel result was corrected by installing wire electrodes away from the wall and this resulted in power production until the channel exit. Also, the GE 50 MW channel was designed with boundary layer suction to eliminate the need for friction increasing protruding electrodes. This and other Eindhoven results increased confidence in the shock tunnel data so as to eliminate the need for an extensive blowdown test effort, and it enables proceeding immediately to a MHD power plant construction. Incidentally the reported water leak is a minor problem probably caused by a poor weld and rapid expansion in a one-minute blowdown.

Overall, the effort to stifle the closed cycle MHD work was by open cycle advocates, such as the failure of Richard Rosa in his 1987 reprint of his 1966 MHD book where his new introduction in 1987 cites the closed cycle MHD work at Eindhoven, without mentioning the role of GE in this effort as well as the extensive GE shock tunnel work.

In the end the effort to stifle this work was in vain. It did not prevent the demise of that massive $400 million dissipated effort on coal fired open cycle MHD. New research means that Closed Cycle MHD has a future in many more fields than central station power. Some of these are disclosed in the present application.

Even more important in the Provisional Application No. 61/418,977, filed Dec. 2, 2010, that was filed as Non-Provisional application Ser. No. 13/302,247, Nov. 11, 2011, and Published as Application US 2012/0137877, on Jun. 7, 2012, disclosed that with use of natural gas, or gas derived from coal volatile matter to fire a pebble bed heat exchanger in a Brayton Closed Cycle MHD generator in parallel with a char coal fired slagging combustor Rankine cycle would result in total $CO_2$ removal and sequestration using only 4% of the power output. This is only one-third of the 14% total power required for the $CO_2$ sequestration process disclosed in U.S. Pat. No. 7,282,189, and over 6 times less than the 26% efficiency loss with the present $ 6.9 billion DOE projects selected to sequester $CO_2$ in oil wells, which increase $CO_2$ by 250% when the $CO_2$ extracted oil is burned.

Incredibly in 2012, coal fired Open Cycle MHD is long gone, and Closed Cycle MHD can save coal with zero emission $CO_2$.

An Equilibrium Conductivity MHD Generator-Non-Equilibrium MHD Accelerator:

After considerable reflection on the present Invention another unrecognized benefit of non-equilibrium conductivity for MHD power generation was uncovered, namely, to utilize the high, 3000° K, temperature attainable with nuclear reactors, and add on top the extremely high temperature attainable with the metal fuel, beryllium, of 6000° K in order to achieve extremely high thrust propulsion, especially in space ships.

As an example use is made of the above MHD generator case with 1% Cs seeded $H_2$ at 5600° K, 100 atm, generator inlet Mach No 0.9, load factor K of 0.8, equilibrium conductivity of 1000 Mhos/m to obtain theoretical MHD power of 170,000 $MW/m^3$. It is reiterated that these extremely high values are only meant to convey the potential of closed cycle MHD. Even power outputs of only a few percent of these values still yield very high equilibrium MHD power.

The first new benefit disclosed herein derives from the very high gas pressures, (100 atm. and probably higher), and the high power densities (1000s of $MW/m^3$) for space travel where the gas exhaust pressure is zero. However, to benefit from thrust at the zero pressure supersonic nozzle exit, the area ratio must large enough to pressure the exit nozzle walls. Otherwise the exhaust would leave with considerable unused thrust.

Figure 4:
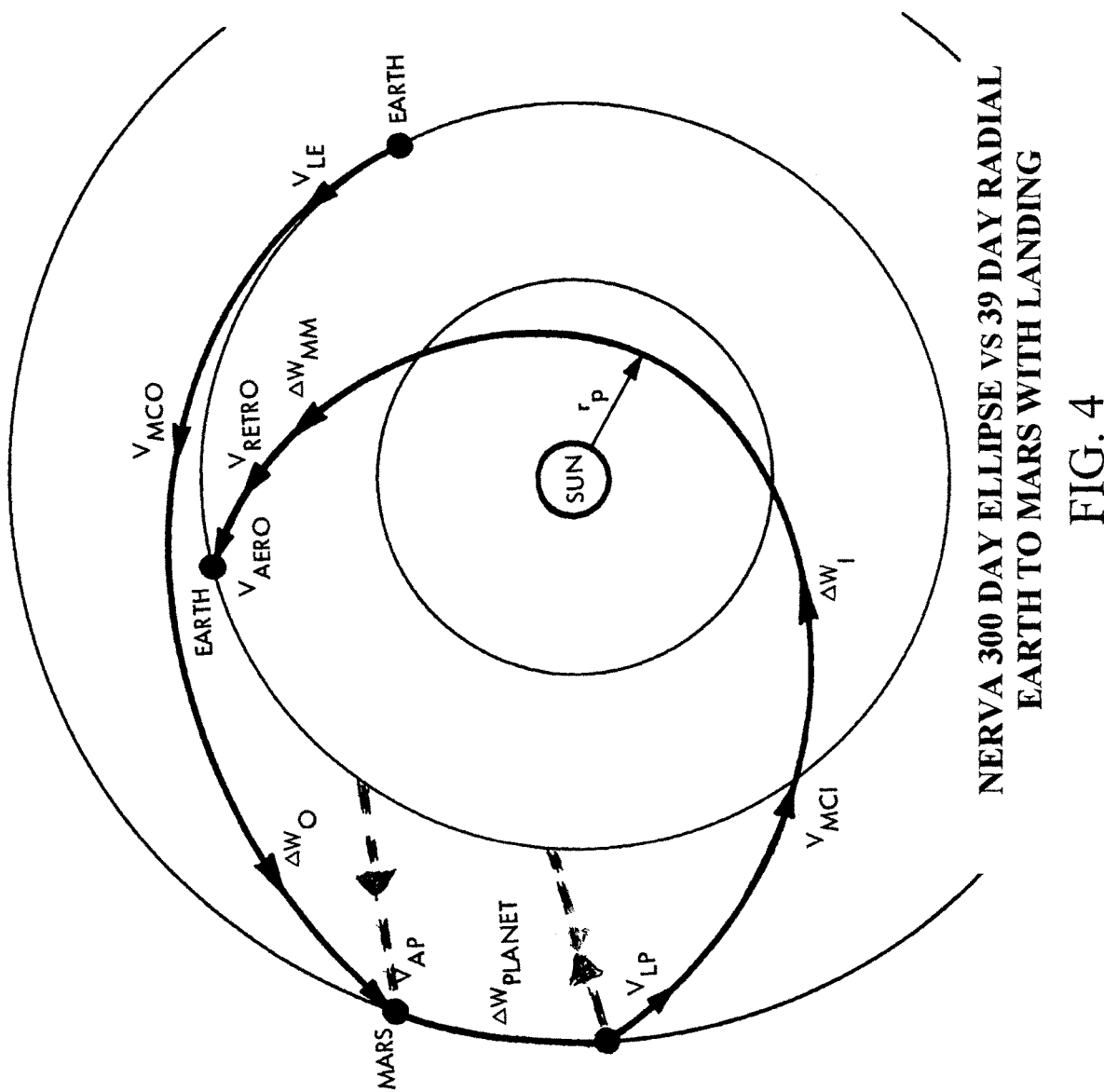
FIG. 4 is a typical NERVA mission overall trajectory from Earth orbit to Mars with a Mars stop over of about 100 days and return to Earth in a semi elliptical path which requires about 6 months each way, and also shown is the trajectory of the present invention's direct average 75 million km outbound, one month on Mars with a lander, and return to Earth orbit with each outbound and inbound leg in 39 days

For example, the common NERVA nuclear rocket with liquid hydrogen with a specific heat ratio $\gamma=1.3$, heated to 625 psi and 4500° R that produced a SI of 825 sec., yielded a thrust of 240,000 lbf. One feature of these massive studies is the lack of detailed information to enable outside researcher to reconstruct the results and apply them to other conditions. Incredibly, apparently all the 50,000 Mars mission cases used the NERVA class graphite 5000° R (2778° K) nuclear reactor. This limited the rocket path to very long indirect Mars approaches such as shown in FIG. 4. The currently disclosed direct Mars path shown in FIG. 4 is attainable with gas expansion from the nuclear reactor plus further expansion from metal combustion.

To validate the attainable thrust used in the NERVA projects and extend this to a nuclear heat source topped by beryllium fuel, with and without MHD propulsion, information had to be deduced with considerable effort from data scattered throughout the Mars project papers. Complicating this task were items such as the omission of detailed information on the rocket's exit nozzle specification, which plays the key core role in propulsion. It was approximately deduced from a drawing of the NERVA Mars rocket in the TRW study (see FIG. 5, herein). From a scale of the entire drawing, the conical exit nozzle diameter was estimated at 200 inches. This is the location that the above cited thrust $T_{th}$ of 240,000 lbf should be used (but no statement that it was) in the following Equation (3) from the "Gas Tables' by J. H. Keenan and J. Kay ((Willey, N.Y. 1945).

$$T_{th}=p^A^(1+\gamma^**M^2) \qquad \text{(Equation 3)}$$

Using the above NERVA rocket values, yields an exist area 176 $ft^2$ at Mach 6, which is close to the rough estimate of 218 $ft^2$ from the NERVA drawing because the area ratio from Mach 1 expands very rapidly from the present 120 at Mach 6 to 285 at Mach 7. The exit plane pressure is only 2.94 psi showing correctly that the entire nozzle surface was used to produce thrust. From this one derives a Mach 1 sonic throat area of only 1.5 ft², although no evidence of this was found in the technical papers. Note that $T_{th}$ should be the reported thrust at the exit. At this exit plane, the wall thrust function listed by Keenan is 1.468, compared to 1.0 at the Mach 1 throat, where the thrust is only 163,488 lbf.

To check this exit thrust, one can use the SI of 825 and the mass flow rate of $H_2$ for each of the three Earth orbit takeoff rockets of 231,000/765=302 lbf/sec, yielding a thrust, τ of 249.177 lbf per rocket, which about equals the reported exist value of 240,000 lbf.

Now if the pressure were increased to 100 atm, as in the present Invention, but with retention of the 4500° R nuclear heat source and the same exit nozzle would yield a thrust of 571,643 lbf. The exit gas pressure is still minimal at 12.25 psi (=1470/120). However, SI remains the same because it is a function of gas temperature. Therefore, the gas pressure must be used to increase the thrust, which results in a near doubling of the gas flow rate. This requires a much larger rocket since the hydrogen accounts for about one half the present volume and weight. This in turn increases the rocket weight in order to contain the higher pressure. Therefore, there is no incentive to use this as long as the temperature remains the same.

On the other hand, adding beryllium fuel on top of the nuclear rocket increases the peak gas temperature to about 6000° K, which is about double that in NERVA rocket, and more important it more than doubles the SI to 1620 seconds, as shown below. Therefore, to maintain the 240,000 bf thrust per rocket engine, the $H_2$ flow rate is reduced to 148 lbf/sec from 302 lbf/sec.

To achieve anywhere near 6000° K an additional heat source, namely, combustion of a metal fuel, specifically beryllium combustion with oxygen is needed that forms liquid BeO. The BeO must be removed by cyclonic action in the combustor otherwise its high molecular weight will reduce rocket thrust.

Now the incremental heat into $H_2$ from 3000° K to 6000° K from the JANNAF Tables is 25,738 Btu/lb, which equals:

(#1) 3,809,224 Btu/sec for the above flow rate of 148 lbf/sec, (#2) $8.92 \times 10^9$ Btu from Earth-orbit with a 3-rocket of 346,500 lbf of $H_2$ in 765 sec. and (#3) $1.61 \times 10^{10}$ Btu for the entire Mars mission with 625,534 lbf of $H_2$ for 3,912 sec, which us one half of the NERVA $H_2$ flow.

Now the Heat of Combustion of Be with oxygen to form BeO is 29,197 Btu/lb. lb. for Be at ambient T. This requires 130.47 lb/sec of Be, and 231.92 lb/sec of 0, for a total of 362.39 lb/sec of BeO for example #1.

For the Mars mission, example #3, the numbers are 551,463 lb. Be, 980.277 lb. O, and 1,531,174 lb. of BeO. To this must be added the $H_2$ of 624,534 lb. for a total 2,155,708 lb. This total is about 183% of the 1,181,000 lb. of $H_2$ in the NERVA Mars mission. To this must be added the energy needed to heat the Be, $O_2$, and BeO to 6000° K, as well as the wall heat transfer losses. Therefore, it appears that there is no benefit in doubling SI and reducing $H_2$ in half due to the heavy weight of the fuel and oxidizer. Also, the benefit from doubling the SI while retaining much of the $H_2$ to increase the spaceship velocity and thereby decreasing the Mars transit time would be counterbalanced by the increased fuel-oxidizer-propulsion load.

However, this conclusion overlooks a very important fact, namely, the much higher density of these consumables over $H_2$. This applies especially with the use of ten times denser water on-board the rocket for oxidizer and propellant, which includes dissociating all the $O_2$ and some of the $H_2$ from water as discussed below. Also, the above 50% reduction of $H_2$ is only one example of the use of the dual nuclear-metal fuel process. There are many variations of the ratio of nuclear to heat input that may serve some specialized use.

These calculations result from the use of only gas dynamic expansion to generate thrust. However, the real benefit of a high SI and high thrust comes from MHD generators and MHD accelerators that offer a totally different path to extremely high thrust with high payload for interplanetary travels.

The Coaxial Linear MHD Generator-Accelerator:

The first step is to operate the MHD generator at sub-sonic velocity with equilibrium conductivity in $H_2$ seeded with cesium at 0.1% Cs, where σ is about 400 Mhos/m and with 1% Cs it is about 1000 Mhos/m. This is achievable with the high, 6000° K, gas temperatures with metal fuels, and yields the MHD power densities, cited above. The gas exhaust from the convergent subsonic MHD generator channel expands through Mach 1 to supersonic velocity.

The gas then expands further through the MHD accelerator from which it exits at Mach 5 into space. Neglecting real gas and MHD effects, the isentropic area exit ratio for $H_2$ is 46 times the Mach 1 value, and the isentropic exit pressure is 0.117 atm (1.72 psi) from 100 Atm, (1470 psi stagnation.) So a 1-m², Mach 2 MHD accelerator entrance with 1 m³ volume, would require only a 26 m² nozzle exit having a 19 ft·D. This is about the same range as the 16.7 feet D. exit nozzle and the 33 feet diameter of one of the NERVA rocket tanks used in this application.

As is disclosed herein in connection with ship propulsion in the present provisional application to, almost all the energy is directed toward propulsion. However, in the rocket application the oxidizer and propellant are either liquefied prior to takeoff, or preferably the oxidizer-propellant is water. In both cases almost all the energy is used for propulsion after deducting energy losses, such as wall heat transfer, pump power, etc. The exact losses require detailed analysis and more important, experiments. For present purposes a 20% loss is used. (Note: While this number is arrived at by considering that there will be no significant gas compression needed to move the various liquids, the 20% loss must come from unrecoverable heat transfer, a recent review of the energy transfer efficiency to propulsion was found to be in the 70% range in a number of electromagnetic thrust experiments.)

Preferably, the analyses and testing of the rocket in the 1960s NERVA program is used because this rocket converted essentially all the propellant into thrust. Very important is the extremely high power density and the very high consumable density, especially with the use of water. As a result very small, or high capacity spaceships, compared to the NERVA rocket, is attainable The next step after the MHD generator, the gas exhausts through Mach 1 in a subsonic-supersonic nozzle into the supersonic MHD accelerator, where the pressure and temperature are sharply lower, which eliminates equilibrium ionization, but facilitates non-equilibrium ionization. An MHD generator is not suited for electron heating in molecules, such as CO, and tri-atomic $CO_2$ and $H_2O$ due to the high loss factors, δ, and low induced voltages as in fossil fired MHD. However, $H_2$ and $N_2$ could enable non-equilibrium ionization especially in accelerators because a high electric field can be imposed. To achieve efficient electripower in MHD generators the load factor, K, should be high, e.g. 0.8, which leaves little induced field for electric heating. However, in an accelerator the electric field is imposed and can augment the induced Faraday field if the B vector is reversed by 180° from its direction in the generator. For example an imposed K=−1 will double the electric field. This application is totally new because no one thought that nuclear energy could be augmented with metal fuels to achieve very high equilibrium conductivity and high non-equilibrium ionization and conductivity to deliver high thrust from MHD.

The MHD generator with $H_2$ and 0.1% Cs at 100 atm and 5600° K stagnation, nominal Mach 0.9 in the MHD generator, ratio of specific heat–γ=1.3, T=5096° K, yields an equilibrium σ=400 Mhos/m, U=5250 m/sec., load factor K=0.8. B=6 Tesla, UBK=25,200 V/m. with power density=65,500 MW/m$^3$. The current, J=P/UBK=2.6×10$^6$ amp/m$^2$. This value of 260 amp/cm$^2$ appears at first glance to be much too high for thermionic emissions from the channel electrodes. The $F_{em}$=J×B for this is 1.56×10$^7$ Newtons/m$^2$.

However, a recent review of the 10 MW thermal shock tunnel in the 1970s revealed that current densities of about 40 Amp/cm$^2$, were achieved in cold tungsten wire electrodes. Also, enabling higher cesium to deposit on the tungsten electrodes also facilitated high electron current capacity. Also, the shock tunnel data revealed that electric arcs were struck on the cathodes. The inlet pressure to the generator at Mach=0.9, is 60.8 atm, which results in a Hall Parameter, β of 0.12 at 6 Tesla, which means it can be neglected and the generator can consist of only one cathode and anode. However, if a higher voltage than 25,200 Voltage is needed to drive the accelerator, it will be necessary to use multiple parallel generator channels because it would be difficult to attach the anode voltage to a nearby cathode to stack the output voltage because electric breakdown from one anode to the adjacent one would occur. Using multiple MHD generators should be no problem due to their small size resulting from the high output power density.

One issue that must be evaluated is the high upstream, directed electromagnetic force, $F_{em}$=J×B=1.56×10$^7$ Newtons/m$^2$ to determine its impact on the stability of the subsonic gas flow. With only one half of the $H_2$ flow in the MHD generator, this thrust is 14 times that of 1.11×10$^6$ Newtons thrust from one of the three NERVA rockets leaving Earth-orbit. Since the MHD accelerator terminates upstream of the nozzle exit into space, additional gas expansion thrust to the nozzle exit plane should added. A rough estimate for this is discussed below.

As stated above, the J×B force vector is directed upstream in the MHD generator, and it is used here as examples on the high strength of the J×B force. Now in the MHD accelerator if the magnetic field vector is the same direction as in the generator, the J×B force will also be directed upstream and the applied voltage from the generator must exceed this value in order to accelerate the gas. However, if there is sufficient distance between the generator and accelerator is may be possible to reverse the polarity of the magnetic field and have the local J×B vector augment the applied current, instead of reducing it. All these are design options, and they are noted here to alert the user of this invention to evaluate this option preferably by experiment due to the plasma non-uniformities, which made predictions just about impossible based on this inventors MHD experience. In fact it was noted above that this inventor's prior tests indicate that transverse striations may actually assist gas acceleration by focusing the higher conductivity and currents inside the striations, which is another reason for tests.

The next step is to estimate the energy conversion efficiency from the heat source to the propulsion thrust. The present example is for a thermal input to one rocket at the NERVA rocket scale with a $H_2$ flow rate of 148 lbf/sec, (which is one half the rate of a NERVA rocket nozzle due to the double SI of 1620 sec) for 765 seconds from the combined nuclear-beryllium-oxygen heat source. The heat input to the $H_2$ from 298° K to 6000° K of 50,080 Btu per lbf of $H_2$ times 148 Btu/lb. yields 7,411,840 Btu/sec. Using the same 765 seconds duration as in one of the three NERVA Earth-orbit rockets yields a total of 5.67×10$^9$ Btu, which equals 1,661 MWH for the 3 rockets. The hourly power rating per rocket is 7818 MW.

For comparison this same size NERVA rocket heated by the nuclear reactor at 302 lbf/sec of $H_2$ from 298° K to 2500° K (4500° R) at 15,150 Btu per lb. of $H_2$ yields 4,575,149 Btu/sec, and for 765 seconds yields 3.5×10$^9$ Btu, or 1025 MWH. The hourly power rating per rocket is 4826 MW. This is 40% of the disclosed thrust listed in the previous paragraph. This is about equal to the 5000 MW the rating per rocket. It is not the total for the three rockets on Earth-orbit takeoff, a point that was not clarified in NERVA reports. This indicates that the current method is much more efficient. (Note that there is no clear information in the NERVA reports on the efficiency of the rocket acceleration.)

Before turning to the MHD accelerator, an important thermodynamic point must be addressed. At first glance it would appear that using the MHD generator output to drive a MHD accelerator is at best inefficient, and at worst a perpetual motion machine, especially if they are placed coaxially. The reason this is an erroneous assumption is that all the MHD power extracted from the gas is recycled back to the MHD accelerator except for modest heat transfer losses. There are certainly inefficiencies due to wall friction and heat transfer losses and due to gas and plasma instabilities and uneven current flows. However, most of these losses dissipate in the gas flow and as such increase the gas temperature, which in turn increases the gas trust on the rocket. It is only those losses that occur at lower temperatures that are not recoverable for propulsion and are "lost" heat energy. Examples of "lost" energy are losses in gas compressors and liquid pumps, wall heat transfer and friction losses. However, most of the energy extracted from the MHD generator is continuously recycled to the MHD accelerator, and as such most of the energy is not "lost". Since the generator load factor, K, has been selected at 0.8, ideally up to 80% of the generator output is recycled into the gas in the MHD accelerator and it is not lost. The recycled energy can be obtained by analysis of the MHD flows and by computing the Gibbs Availability function, $$G°=h-Ts, \text{ where "}h\text{" is the gas enthalpy, "}T\text{", the gas temperature, and "}s\text{" the entropy.}$$

In effect this equation states that the greater the non-uniformities the greater the entropy and the lower the availability and the lower the energy source's utilization efficiency. However, since enthalpy is a function of temperature, the higher the temperature the greater the energy that can be extracted. Also, the electric power extracted is used to generate non-equilibrium electrons and ions, which increase the thrust on the neutral hydrogen.

Therefore, the objective of this Invention is to teach how to benefit from MHD for propulsion in general terms by showing its huge potential. The details can be computed by those knowledgeable in the subject matter. An example of the failure of doing an overview is the 50,000 cases analyzed for the Mars mission in the 1960s that went into great detail. However, it was not productive because no one realized that the peak 3000° K gas temperature limitation in the NERVA graphite core nuclear reactor limited the results to year long round trip missions with a low to negligible probability of success.

In contrast, the MHD accelerator with operation at low pressure and high velocity facilitates non-equilibrium ionization. For example, operating the accelerator around Mach 2.5 results in an isentropic static pressure of 5.6 atm from the 100 atm stagnation pressures. Now the increase in gas temperature from ohmic dissipation in the MHD generator is ignored, as it will increase the gas temperature, which increases the thrust, at the cost of reducing efficiency. As such it does not have a major impact on the MHD acceleration process. The important item at this time is the non-equilibrium ionizations, that is derived from Equation (2) listed above, and used here:

At Mach 2.5 in the MHD accelerator and $\gamma=1.3$ yields $T=2890°$ K, Ps=5.6 atm. and the U=2.5*local the speed of sound=9886 msec. With 0.1% Cs, from Rosa's tables, $\sigma$ is about 40 Mhos/m, and with 1% Cs, $\sigma$ is about 140 Mhos/m. Since the MHD power is proportional to the velocity squared, 1% Cs reduces the power by 40%, while $\sigma$ increases power by 3.5, leaving a net doubling of the power. However, the high cost of 1% cesium seeded in $H_2$ will probably exceed the benefit of higher power.

Another factor consists of the Hall effect. At B=6 Tesla, 5.6 atm. $\beta=1.2$ for 1% Cs and it is 2.4 for 0.1% Cs. These values are low enough as to limit the reduction in $\sigma$ from plasma turbulence, which is a major factor in argon. To show the potential of the disclosed processes and methods it will be assumed that the electrode can be segmented enough to limit the axial Hall effect short circuiting in the accelerator. Again all these issues would be resolved with MHD channel tests.

The accelerator's applied load factor is K=−1, which yields an applied field, −UBK=−9866*6=−59,196 Volts/m. This voltage substantially exceeds that in the generator. Connecting the anode voltage of one electrode to the next cathode downstream, and so on, can produce it. This method has been tested extensively. It is called a diagonal wall connected, linear Faraday generator. The key requirement is to limit axial Hall voltage shorting along the electrode wall.

The current can be derived from the accelerator input, Power=$\sigma*U^2*B*(-K)*(1-K)$=−40*9866²*6²*2=280,000 MW/m³. This is an enormously high number. With 1% Cs it is more than double this number. It is meant to convey the enormous power attainable with MHD. (Again it is noted that the J×B vector in the acceleration is directed upstream or downstream depending on the B vector, while the applied voltage and its current is 180° in the opposite direction. Therefore, the best method for resolving this matter would be in a MHD accelerator in a shock tunnel.)

The current J=P/V=$\sigma*U*B*(1-K)$=2.8×10¹¹/59,196=4.73×10⁶ amp/m².

This yields a thrust J×B=2.84×10⁷ Newtons/m², which is about 9 times the thrust of the three NERVA nuclear rockets for Earth orbit takeoff of 3.3×10⁶ Newtons.

As the gas expands its temperature will drop sharply, and non-equilibrium ionization is necessary, which can be calculated from Equation 2:

$$T_e/T_o=[1+\gamma(1-K)^2M^2\beta_{\mathit{eff}}^2/3\delta]/[1+0.5*(\gamma-1)*M^2] \quad \text{(Equation 2),}$$

The stagnation temperature is 5600° K. It is assumed that $\beta_{\mathit{eff}}$ of the regular $\beta$ of 2.4 from 0.1% Cs is used. The $\delta$ of 4 for $H_2$ in this temperature range is used. The result of Equation (2) is $T_e=2.52*T_o=14,163°$ K. This result yields $\sigma=6000$ Mhos/m. This would yield a thrust of 4.3×10⁹ Newtons/m², in the range of 100 times higher than in the MHD generator thrust and in the range of 900 times that of the NERVA rocket. To validate this potential of MHD power and acceleration, shock tunnel tests can be implemented, followed by minute duration blowdown tests on a scale performed in the 1960s NERVA rocket program except Zirconium would be used to achieve 6000° K gas temperatures instead of releasing Beryllium into the Atmosphere. This would also be less environmentally hazardous than an Earth bound nuclear rocket test.

The Specific Impulse, SI, shows the power of MHD. The thrust term is designated as $\tau$, which in the equilibrium MHD accelerator is 1.6×10⁷ Newtons/m². Due to its importance and potential for gross misunderstanding, it is listed as a numbered equation, (Equation 4)

$$SI=\tau/(MF)*g, \quad \text{(Equation 4),}$$

where MF is the rocker gas mass flow rate in kg/sec or slugs/sec, and g is the acceleration of gravity that cancels the same term in MF. Now for NERVA SI=−825 sec. MF*g was computed as 302 lbf/sec., and thrust was listed as 240,000 lbf. Using NERVA's 825 sec yields a slightly lower MF presumably due to rounding errors.

In the present example $\tau$ is 1.6×10⁷ Newtons=3,600,000 lbf. Then (MF−g) was 180 lbf from the $H_2$ gas dynamic flow at 6000° K. This yields a SI of 20,000 seconds. At first glance one might conclude that this SI is unattainable. However, Sutton & Sherman (Section 13.1) address this point and state that Impulse should not be defined as the mass of the chemical rocket times its velocity, $M_{ch}*V_{ch}$, which has been done here without MHD power, but by $M_{el}*V_{el}$, the electric system mass and its velocity. However, they assume that the electric system weight will be greater than the chemical system weight, an assumption probably motivated by the heavy magnets of the 1960s. Contrary to this it has been asserted herein that even without the use of metal fuel temperature topping, very high thrust can be achieved in the 10 times range and up. The magnitude depends mostly on the electrical conductivity, not the gas mass flow rate, nor the weight of the power supply. Therefore, pending tests to validate this position, it is assumed that the J×B force controls the force on the rocket. This in turn depends to a great extent by the electric conductivity. Therefore, the specific impulse will be selected to achieve a desired velocity and the mass flow rate will be adjusted to achieve this on condition that the energy conservation is satisfied.

For example, assume that the SI would be based on the electron temperature, Te, 14,163° K, the SI would be (14,163/6000)^0.5*1,620=2,489 seconds, or about 1.5 times the SI at 6000° K Nuclear-BeO, —$H_2$ rocket. This Te also yields, SI—(14,163/2500)^0.5*825=1964 sec, and about 2.38 times the NERVA nuclear-He rocket. These hypothetical calculations assume that Cs electrons drag the ions, which in turn drags the neutral hydrogen. In addition, plasma striations, which are streaks of elevated streams transverse to the gas flow between anodes and cathodes in a Faraday linear MHD generator also could enhance this gas dynamic drag. Much has been made of striations by assuming that they adversely affect the generator performance. In fact a thesis at Eindhoven was devoted exclusively to studying this phenomena. It has been advocated as a reason to switch to disc MHD channels but without considering the possibility that in large discs beyond the size used for experiments, striations may be concentrated near the shortest diameter, and yield uneven results However, the objective here is acceleration, and striation by focusing on the higher conductivity locations would increase the J×B force and drag the neutral hydrogen along.

The above examples do not show the hydrogen energy needed to achieve these thrusts. That is done below.

This phenomena might also be similar to one that could be called a plasmon wake, which is similar to the wake of a boat traveling on water faster than the wave velocity on the ocean, or an aircraft flying above the speed of sound, as discussed in R F Egerton "Electron energy-loss spectroscopy in the TEM" Rep. Prog. Phys. 72 (2009) 016502. In both cases the speed is greater and there is no reason why that could not apply to neutral atoms in ionized species. It applies to electron moving at speeds greater than the Fermi velocity, which is the result of alternative positive and negative space charge along the electron trajectory. Although these tests were conducted with 100 keV electrons it may apply at less than one eV as in the present case, although it is not clear whether the effect on such low energies is caused by the target, electrons but not by the driver electron. This phenomenon is mentioned herein because Space contains radiation from the Sun and Stars and there may be some means to take advantage of this as rocket ships are propelled to velocities that enter some fraction of the speed of light. After all before air compression became a "barrier" as jet aircraft approached the speed of sound engineers discovered designs that enable a jet power aircraft to "break the sound barrier". Until now approaching and breaking the light speed barrier was in the realm of science fiction, e.g. "warp speed". However, unless we try entering even a small fraction of the speed of light we won't know. The present invention enables us to try.

The bottom line is the options are many, and they are not available with gas dynamic thrust by itself.

In conclusion to this Section, the potential of non-equilibrium ionization in the MHD accelerator opens a propulsion regime far beyond anything available today for both very high specific impulse and high total thrust. The numerical examples are meant to show the opportunities, and the means to implement them are based on the extensive tests performed on shock tube/tunnel non-equilibrium ionization, closed cycle MHD in the 1970s. This confidence has been enhanced by this Inventor's recent discovery that some key elements from the shock tunnel results were tested in a steady state closed cycle blowdown MHD generator fabricated by the GE MHD Group and tested in the Eindhoven MHD blowdown facility in the early 1980s.

A key new data to be implemented to practice this invention are the metal fuel fired slagging combustor and the steady state MHD generator and accelerator to determine their maximum output. This technology can then proceed quickly to practical power use.

The Rocket Energy to Thrust Conversion Efficiency:

The next extremely important rocket issue is to compare the overall conversion efficiency from thermal energy input to net thrust. To obtain this, one divides the net thrust, $\tau$, by the total heat input, $Q_{in}$. This Inventor's review of the cited NERVA rocket program did not find this information, especially after the completion of the Earth-orbit takeoff. In fact, it is not even clear what happens after takeoff from orbit. One 1967 NERVA summary report, Paper No. 67-476, (AIAA $3^{rd}$ Propulsion Conference) states that takeoff firing is by three rocket engines, each with 240,000 hp thrust for 765 second. After this first stage rocket separates, the spaceship coasts for 50 days. This is followed by a single 240,000 hp rocket engine firing for a total 1060 seconds, followed by 250 days of coasting until Mars. There is no information on rocket speed, nor an explanation for the three different Earth-Mars trajectories taken, all of which involve a very long nominal 300 million km semi-circular path to and from Mars.

There is information in the cited paper, and in Paper No. 67-510, and in the cited TRW Reports, on the firing time and $H_2$ consumption, and that of the rocket-stage jettison after the various rocket stages. However, even here there is potential misinformation. For example, Equation (4) consists only of the fuel mass flow rate term, MF, from the rocket, while ignoring the massive weight of the rocket components, which accounts for 39% of the initial Mars multistage rocket.

One source that explains the relationship of thrust to energy efficiency is this Inventor's College textbook: "Internal Combustion Engines" by E. F. Obert, $2^{nd}$ Edition, (1950), a date when space flight was in the realm of science fiction. As such the mass term, MF, was identified as a fuel mass flow because the rockets, such as the V-2, stayed in the atmosphere, and its shell was a small fraction of the total weight . . . . Therefore, ignoring the shell weight was a second order term, which is not the case with interplanetary space flight.

In fact, the efficiency issue is extremely important for deep manned space flight. This point only became clear after extensive reflection on this issue. The question that comes to mind is why is it that with a high temperature nuclear rocket at 5000° R, (2778° K) as investigated by NASA in the 1960s, did the massive studies with 50,000 or more variations focus solely on a very long semi-elliptical path, including even a long flyby detour around Venus? Even worse, the trip took about 6 months each way thereby sharply increasing the risk of failure and exposing astronauts to extended life threatening radiation and physical and emotional distress. Why not a straight radial path?

The most probable answer came during calculations on thrust efficiency, namely the NERVA rocket had insufficient thrust to get to Mars or anywhere else in a straight line. Therefore, it was necessary to use Newton's law of centrifugal acceleration in a circular path to "fling" the spaceship to Mars and to return. This can be shown with a simple set of calculations for a typical NERVA rocket. However, the required information must be unraveled from the incomplete data cited in the NERVA technical papers. Why is the velocity of the rocket after completion of the firing from Earth-orbit not listed, or the location of the mid-course rocket firing and velocity, or the Mars approach firing and velocity, or the velocity at various points in the mission not listed? Listing this might reveal that the mission is hopeless. Incidentally, the advocates of electric acceleration are also not forthcoming with the details of their energy systems.

The following describes how the NERVA mission was analyzed based on the disclosed data: To calculate the efficiency one requires the total thrust of the rocket that includes the mass of the rocket, not just the consumed fuel. For lack of detailed information, the length from Earth to Mars for the NERVA rocket, and for the present radial path, were deduced from astronomical data and from FIG. 4. One-half of the average elliptic orbit between Earth and Mars is about $2.94 \times 10^8$ km ($1.83 \times 10^8$ miles). In sharp contrast, the direct path is only one-quarter, $7.5 \times 10^7$ km. The average velocity for each path is taken from the listed duration of the trips, the reported 219 days for NERVA and the specified 39 days for the present radial path. The average velocity for the NERVA elliptic path is 15,590 msec (51,113 ft./sec, 34,848 mph). The selected direct radial path is about the same, 49,790 mph, but the length is one-quarter and the time is only 18% of the elliptic path.

The following is one method for calculating efficiency. Additional discussion is found near the end of this application.

The thrust power is computed by the equation: $\tau = V*M/g_o$ where V is the average velocity=51,113 ft/sec, M=1,237,000 lbf, is the weight of the rocket after the takeoff and $H_2$ of 693.000 lbf has been consumed. The result after exhausting this $H_2$ in 765 seconds on Earth-orbit takeoff is $1.96 \times 10^9$ lbf-ft/sec, converted to 2,663 MW.

Now the energy input from 693,000 lb. of liquid $H_2$ heated by the NERVA nuclear reactors to 4500° R from 40° R using Keenan & Kaye's Gas Tables is about 17,500 Btu/lb., which yields $1.21 \times 10^{10}$ Btu for the 765 seconds that thrust is applied. However, the conversion is from Btu to MW instead of MWH because it was applied only during the 765 seconds exhaust, so this converts to 3553 MW. This suggests 75% of the heat input energy is converted to thrust, which appears reasonable as the thermal energy is directly converted to thrust. Interestingly, in the initial work on this invention, the Inventor assumed that direct conversion of heat to thrust should be very efficiency and selected an efficiency of 80%. As stated further in this application, this Inventor recently uncovered MHD accelerators in prior art that reported about 70% conversion efficiency. (See below.) Therefore, the propulsion over energy efficiency used in this invention is 80%.

A question arises that if about the same velocity can be obtained with the direct approach to Mars, why was the very long elliptical road selected? A plausible explanation is that this thrust was inadequate for a direct transit due to presumably the sun's and interplanetary gravity, which could only be overcome with the centrifugal force from an elliptical approach to reach Mars. As was the case with stationary power generation and with terrestrial propulsion why did no one recognize that all existing technologies had temperature and thrust limitations that could only be solved with a totally new energy production approach, in the present case, MHD. However, once huge sums became available for energy R&D in the early 1970s, the goal of the existing energy stakeholders became to obtain all of it and the easiest way of doing that was to promote cosmetic changes to existing technologies. Current low temperature water-cooled nuclear reactors are an example of the adverse consequences of such an approach. Their efficiency of 30% is very poor and requires massive amount of cooling water, which have resulted in disastrous results in Japan, Yet the power industry embraced these reactors because much of the steam technology was fully developed. Now it turns out that massive amounts of water were needed for emergency cooling that failed to stop the meltdown and substantial radioactive wastewater were released in Japan. Then at the end in June 2011 it was revealed that the 4 reactors that melted had key control switches outside the main reactor buildings, which immediately failed after the tsunami hit and cut of emergency cooling components. Five other adjacent reactors, erected years later, had these controls inside the reactor buildings and they did not fail. The utility was aware of this potential problem but did nothing about it. The problem is the inefficiency of water-cooled nuclear reactor and the large quantities of radioactive spent fuel storage ponds needed for the radioactive waste. In other words, there are inherent problems with water-cooled nuclear reactors. The biggest is the huge accumulated wastewater storage, their low efficiency, and their massive size. The high gas temperature nuclear reactor-MHD power has none of these, especially since their compact size allows underground placement away from population centers and the water resources can be used for agriculture, forests, etc.

MHD is an example of an advanced technology that suffered catastrophically from this self-dealing attitude when the true enormous cost and the unlikely success of coal fired Open Cycle MHD became very clear, and resulted in its permanent shutdown in the early 1980s. Another adverse consequence of this attitude is the present case of the Mars project where those that should have recognized that the deficiency of NERVA propulsion for interplanetary high load and for manned missions was due to limited heat transfer to the propellant gas even at 3000'K and technologies that could have solved this such as MHD where NASA was involved, yet no one saw the connection.

The present teaching has the important advantage in that the claims for this invention can be readily computed and problems can be immediately apparent. If instead complex computer models are used, as was the case in the NERVA program, flaws and shortcomings, such as the 5000° R (2778° K) limit, are not apparent, and this makes the massive and very costly work of limited use.

In the following further details as how to implement this Invention is given.

The use of MHD to achieve a major objective of this invention, namely multi-ton unmanned payloads, and manned payloads, is given next. The following lists some of the huge advantages of MHD for propulsion in outer space.

1) MHD thrust is not limited to gas dynamic expansion. The gas dynamic thrust is limited by the gas molecular weight, which favors hydrogen with high stagnation temperature and pressure. Nuclear power is good but it is limited by reactor material temperature to about 5000° R. (2778° K) Increasing pressure increases thrust by enabling higher Mach numbers. However, once exit Mach 5 or 6 is reached, the ratio of exit area ratio over the throat reaches a limit because the nozzle outlet area is from 100 to 1000s times the nozzle throat area. To benefit from further increases requires increased stagnation pressures. This, in turn, requires stronger and heavier rocket gas containment vessels. The MHD solution disclosed herein greatly exceeds these limits.

2) MHD power is not limited by the miniscule thrust of ion accelerators: All of NASA's deep space probes used ion thrust technology, which have very high Specific Impulse but miniscule thrusts of a few Newtons and the vehicle take years to reach planetary destinations. The reason is simple. Thrust depends on mass, which is miniscule in ion accelerators.

3) The primary benefit of MHD acceleration is that the electrons drag the ions, which in turn drag the neutral gas molecules that outnumber the ions 100s and 1000s of times. This force enables substantially higher thrust than by gas flow expansion alone because the energy is transferred first to electrons through their conductivity, which enables high J×B forces without requiring prohibitively high gas dynamic forces. Also, the efficiency is much higher because almost all the energy input is focused on thrust instead of being dissipated on other elements of the cycle such as gas compression. The exact thermodynamic efficiency calculation involves detailed gas and plasma analyses. In the present examples, the MHD thrust will be computed from the J×B force.

To this is now added doubling the gas temperature to 6000° K above the already high nuclear gas temperatures. This opens a very high thrust, high payload, regime that enables unique extremely very high-speed, high payload missions to Mars and beyond.

In writing the last sentence this Inventor recalled that in the 1960s he used shock tubes and a shock tunnel to investigate equilibrium and non-equilibrium MHD power generation from 2000° K to 8000° K at up to 10 MW thermal input. At that time the International MHD community used electric heaters to 2000° K in a few cm wide MHD channels that produced no power. The theoreticians immediately developed plasma turbulence models that predicted non-equilibrium MHD could not work, and this Inventors assertion that the failure was due to electrode wall voltage losses were dismissed, as was the shock tube data. Subsequent analytical modeling showed that plasma turbulence substantially reduces the effective Hall parameter, but it does not quench non-equilibrium ionization. Nevertheless, as noted elsewhere herein, the Inventor recently discovered in Rosa's MHD book still maintained this position in his 1987 update, of his 1967 book, which was released almost two decades after Zauderer's 10 MW non-equilibrium shock tunnel tests yielded 2 MW MHD DC electric power, which was 20% enthalpy extraction, a level necessary for high efficiency MHD power plants.

All this is stated now because the analytical methods for MHD flow were well known in the 1960s. However, the theories on plasma phenomena and their conclusions were in error, and the only way to verify the MHD claims herein is by experiment. High temperature tests can be done in a high thermal capacity, high temperature shock tunnel, MHD generator-accelerator, as well as in a MHD blowdown facility using an electrically heater ceramic bed to simulate the nuclear reactor discharging the heated gas into a metal fuel heated combustor followed by discharge into an MHD blowdown facility. In this way the key technical issues would be addressed without expending $100s millions in costly, steady state, high temperature prototypes.

One example where a shock tunnel would be useful is to study the effect of the Magnetic Reynolds Number, $R_m = \mu^* \sigma^* V^* L$, where $\mu$ is the magnetic permeability=$4\pi \times 10^{-7}$, $\sigma$ is about 1000 Mhos/m which could be achieved with 1% Cs in $H_2$ at 5000° K equilibrium, V is the velocity which is 5000 msec in $H_2$ at 5000° K. L is the MHD channel width that could be 0.3 m. in a 10 MW thermal MHD channel. This yields $R_m = 1.88$. A number above one means that magnetic field lines are partially frozen in the gas. This example shows that strong electromagnetic interactions can be studied in a shock tunnel or blowdown facility. Strong electromagnetic interaction will occur in the MHD channels needed for Mars missions.

In summary, the advantage of the specifications in the application is to show how to practice this invention in a manner that meets this invention's goal of very high-speed, high power, high payload transport systems for use on Earth, the sea, and outer space. These calculations give a concise top-level view of MHD operation and avoid complex and detailed calculations in order to show the range of MHD performances attainable. The analytical methods for in depth MHD analyses were widely published decades ago. The unmet challenge in the intervening decades has been to convert these data into working power systems, a challenge that was never met due to non-technical and non-scientific interference.

On Using Nuclear Heat Alone to Propel Missions to Mars:

As stated above, concurrently with the 1960s NERVA program, research began on electromagnetic acceleration, including MHD accelerators, (which operate with electricity input instead of electricity output), such as electric arc jets, and plasma jets. As stated in the Introduction to the Application of MHD to Space Power Missions, the use of "Specific Impulse" to characterize electric plasma and ion accelerators can be grossly misleading if the concurrent thrust force is not specified. The SI number for ion engines is in the 2000 to 10,000 sec range compared to chemical and nuclear power that are in the range of 300 to 825. This created the erroneous impression that plasma accelerators are the road to the future in space travel, while in reality they fill a very narrow, but important niche, namely sending tiny 100s of kg probes far into the solar system to accumulate data on the planets, comets, asteroids, and someday to the nearest stars.

Such an example is the mission to Jupiter's moon, Juno, which was launched in the first week in August 2011. Its expected arrival is June 2016, after 5 years. It includes a slingshot around an inner planet. All this is for a 3515 lb. payload. The cost is $1.1 billion. In contrast the preferred Mars mission disclosed herein with a 130,000 payload, which by using the same thrust and velocity as the present radial Mars design, would arrive at Juno in 1 year. More likely the trip would take only one half that time, 6 month or even less, if we put astronauts inside. Also, it would more probably cost less if priced as a commercial venture. More likely, the destination would be Europa, which has an ocean of water beneath the surface. It is almost certain that these moons and asteroids also must have water and very valuable minerals, metals, and even gold and rare earth minerals.

However, the proposal of space enthusiasts to use these high SI plasma accelerators in high speed rockets to send astronauts from Earth orbit to Mars in about 40 days, instead of 6 months or more with a hydrogen heated NERVA reactor, is not realistic. An examination of the various schemes proposed leaves much to be wanted. There is no mention in public advertising releases by advocates of advanced electromagnetic missions to Mars and elsewhere as to the means whereby the presumably nuclear energy is converted to electricity that is needed to power electromagnetic accelerators to Mars. Some technical papers that do mention MHD power display an ignorance of how the process works. They erroneously cite the non-equilibrium ionization at the equilibrium gas temperature instead of electron temperature, and they fail to discuss how the generator walls are cooled at such high gas temperatures. (Incidentally cooling the MHD channel walls at very high gas temperatures is disclosed in Zauderer's U.S. Pat. No. 4,851,722, which by reference is incorporated herein by reference in its entirety.) Some of said papers also show a lack of understanding of the Laws of Thermodynamic power cycles by proposing cycles with peak temperatures too low to reject heat in space, or by citing high efficiencies that cannot be thermodynamically achieved. Also, the use of nuclear radioactive materials to render the MHD gases electrically conducting is proposed without consideration that spreading of radioactivity would render the spaceship uninhabitable.

Now the current discovery of ice-water and even hydrogen in a lunar pole region on the Moon, combined with the previously known existence of ice-water at the poles of Mars, changes the whole picture of unmanned and manned space travel because there are now sources for human survival as well as fuel sources outside the Earth. To indicate the importance of this discovery it has been estimated that it would cost $50,000 to lift a pint of water from the Earth to the Moon. This makes nuclear MHD critical to manned exploration because voyages to Mars can be implemented in a matter of weeks instead of 6 months or longer, even with nuclear rockets. Separately or concurrently, augmenting nuclear preheat, which is temperature limited to about 3000°

K, with metals, namely beryllium combustion with dissociated water would double the peak temperature to 6000° K, and double the specific impulse to 1600 seconds even without MHD acceleration. This would make 40 day manned voyages to Mars from Earth orbit or the Moon possible. With added MHD acceleration, large rockets and voyages to the outer planets are in the realm of possibility, as explained above and below.

This invention offers several means for interplanetary travel because new barriers may appear as new data becomes available that would eliminate some of the proposed travel modes. For example, the 1960s NERVA program assumed a balloon landing on Mars because it has an atmosphere, albeit a thin one. However, observation on the landing of the tiny robots on Mars in the last decade has shows that the thin Martian atmosphere is so treacherous that a balloon landing will probably fail.

As noted above, the Mars landing of the larger 1000+ pound payload in Curiosity on Aug. 5, 2012, shows that NASA has learned this lesson. The landing did not use a balloon but some sort of crane device. A 140,000 pound manned Mars lander will need a rocket powered landing.

A Plan for Using the MHD Generator & Accelerator for Moon and Mars Missions:

One possible mission with MHD power would begin with establishment of a Moon base for beginning planetary take offs and landings. Rocket fuel of hydrogen and oxygen could be prepared from water on the Moon's surface, for use on takeoff and landing from the Moon, and for the Mars landing module. Closed cycle nuclear MHD generators with hydrogen and either cesium or electrically ionized gases not susceptible to radiation would be used. Most important, the entire development effort including Mars flyby and landing will initially not involve any on board astronauts because the cost would be prohibitive and dangerous to their lives. Remote control today is much more feasible than in the 1960s. Furthermore, this invention will enable the use of much smaller rockets than the NERVA multi-million pound behemoths. The rocket propulsion would be hydrogen. However, as disclosed below, the use of liquid water that is dissociated on board the rocket ship with the oxygen oxidizing the metal fuel and hydrogen as the propellant is preferred because it sharply reduces by up to a factor or 10 the volume of the rocket.

To define the technical aspects of a Mars mission, the development would begin with terrestrial nuclear MHD, which in turn is derived from terrestrial gas fired closed cycle MHD.

The selection of the gas to be used in MHD generators has a major impact on the MHD heat source. For example, with alumina pebbles, a 2000 MW thermal nuclear reactor (which is in the range for the 3000 to 5000 MW NERVA rocket) has a weight of 1,936,000 lb. at 200 lb/cu. ft. of 80% dense alumina. Now NERVA's hydrogen with graphite can be safely used provided the pebbles are spray coated with high temperature refractory oxide as disclosed below. Graphite's density of 137.6 lb/ft$^3$, versus 200 lb/ft$^3$ reduces the weight to 1,328,800 lb. Now replacing argon with hydrogen allows increasing the peak temperature to 3540° F., or even higher to 4500° F. in the NERVA rocket. The thermal conductivity, $\lambda$, and the convective heat transfer in an argon heat exchanger at 3000° F. and 10 atm is 0.035 Btu/(hr·ft·° F.), while $\lambda$ for hydrogen at 3540° F., 10 atm. is about 0.51 Btu/(hr·ft·° F.). Therefore, $H_2$ provides about 15 times better heat transfer than argon, which reduces the pebble bed reactor weight to 88,587 lbs. This new weight is based on estimates of the heat transfer coefficients for argon and hydrogen. By comparison, the NERVA rocket engine at 3000 MW (thermal) was 21,770 lb. but with no design details.

The point of this calculation is to show the primary role of a selected gas in an MHD Brayton cycle. All advocates of MHD power overlooked this critical point. The open cycle advocates that focused on coal only should have realized that in addition to the extreme gas temperatures, the corrosive nature of coal slag, and the low electric conductivity would prevent this from becoming a central station power source. After dissipating $400 million in the 1970s, the US government finally realized this. Interestingly, the closed cycle advocates also erred in their gas selection of argon, with a nod to helium, although considering the self-dealing at the time, it would not have made a difference in obtaining funds for Closed Cycle MHD.

The error in the use of Closed Cycle MHD in 1970 was in focusing only on cesium-seeded argon because it produced a very high electric power density. Helium was considered but not emphasized. In fact, this Inventor ran shock tunnel tests with Cs seeded Neon and obtained very enthalpy extraction at 3000° K stagnation. However, no one, including this Inventor, considered at the time that the problem with argon was its very low thermal conductivity, $\lambda$, as determined during the ERDA-ECAS Study in 1975. A 1000 MWe CC MHD plant would need to cycle 14 massive, cored ceramic brick heat exchangers to transfer the coal combustion gas energy to the argon. In contrast, with helium or hydrogen the number of heat exchanger and their size would be about 10 times fewer and 10 times smaller. Even though this was known at the time, no one considered using cesium-seeded $H_2$ in a stationary terrestrial MHD power plant. Even as late as Dec. 2, 2010 when this Inventor filed Provisional Application No. 61/418,977 that included a closed cycle MHD generator, the only two gases listed were argon (preferred) and helium. While hydrogen was used, its function was to power gas turbines, not MHD generators.

The most probable reason this approach was not pursued was due to the persistent negative publicity on Closed Cycle MHD, and it was certainly due to the assumption that non-equilibrium ionization was not possible at such low temperatures as 2000° K. As stated elsewhere in this document, everyone overlooked that the electron collision loss factor $\delta$ was about 60 times smaller than heteratomic CO and 1000 times smaller that $CO_2$, the primary molecule in combustion gases.

The feasibility of non-equilibrium ionization was computed with Equation (2) for Cs seeded $H_2$ at 2000° K that is accessible with most refractories, and 2500° K that is accessible with $ZrO_2$ and $ThO_2$ in oxidizing gas in a pebble bed heat exchanger. The conditions were: $P_o$=10 atm, Mach No 2, $T_g$=1256° K and 1560° K, Cs=1% and 0.1%, U=4036 m/sec, and 4500 m/sec, B=6 Tesla, $\beta$=6 and Te=2000° K and 2800° K, $\sigma$=0.8 Mhos/m and 40 Mhos/m, Power density=75 MW/m$^3$ and 4600 MW/m$^3$. The small numbers apply to the 2000° K case and the high numbers apply to the 2500° K case.

These numbers are to show the range of power that could be obtained with enhanced conductivity in seeded hydrogen. The potential is huge. The cost for validating this is minimal. If GE or DOE had not scrapped the 10 MW MHD shock tunnel in the mid-19070s, this thesis could be validated in a matter of months. This Inventor still has all the documents, designs, photographs of the shock tube, shock tunnel, blowdown design and an entire pulsed power MHD test system and they are all "shovel ready", and work could begin immediately at modest cost.

The hydrogen could come from coal or gas or from water and the hydrogen could either be retained in a closed cycle, or it could be sold for transportation, energy use or chemical processes. All this is in this Inventor's cited U.S. Pat. Nos. 7,282,189 and 7,553,463, and Provisional Application 61/418,977, and in this application.

The present calculation shows the key role of the gas selected for use in a Brayton cycle. The contrast of heat transfer from argon to helium or hydrogen shows the mistake made in the 1970s of using argon as the coal fired MHD generator that was heated indirectly with dozens of cored ceramic brick heat exchangers that were prohibitively expensive. No consideration was given to the lighter gases whose high heat transfer would have sharply reduced the number of heat exchangers, It is noted that the thermal conductivities of argon, helium and hydrogen at these high temperatures were obtained by this inventor from references in a colleague's personal library. These data were obtained one-half century ago and they cover a wide range of temperatures and pressures that are also available on the Internet.

This inventor's original intent was to use helium, which has nearly identical gas dynamic properties as hydrogen and will not damage graphite. However, there are two major "show stopper" problems with using helium or for that matter any of the noble gases.

One "showstopper", the heat rejection radiator, applies to MHD and to gas turbine power. Both use a Brayton gas cycle, which means that after gas compression and MHD power generation (or gas turbine-power) the gas heat must be rejected. In outer space this can only be done with a radiator. So assuming 50% enthalpy and power generation from 3540° F. helium, the MHD exit temperature will be 1540° F. Radiation is governed by the Stefan-Boltzman Law, namely radiation, $Q_r = \varepsilon * \sigma_r * T^4$, in Btu/(hr/ft²), where $\varepsilon$ is the emissivity of the radiating surface or liquid or gas whose value is 1 for a Black body, and decreases depending of the reflectivity of the radiating surface, $\sigma_r$ is the Stefan-Boltzman constant of $0.1713*10^{-8}$, Btu/[(sq. ft.)(hr)(° R⁴)]. R is the absolute surface temperature equal to "x"° F.+460° F. For present explanation purposes $\varepsilon$ is taken as 1, which could be nearly achieved by painting a flat radiator surface black. So using this equation for 2000 MWt input and a 1000 MWe output and radiating 1000 MWt at 2000° R into space from the Mars rocket would requite a black, flat plane radiator of 124,000 ft², namely a flat plane of 352×352 ft², which equals two football fields. Tiny rocks in space could puncture the radiator, and the helium or any other gas would leak out, and the odds of hitting a few pebbles in a one year or longer mission with such a large radiator, while remote, it is not zero, and a hit could end the mission.

However, with a smaller radiator that only rejects heat when the power output is only used for non-propulsion purposes, or short propulsion period purposes, a hit may be acceptable.

Overlooking the radiator issues is another example of the incomplete solutions or outright science fiction solutions that have been offered by advocates of electric or electromagnetic space missions with human occupants or heavy cargoes that permeate Space Travel literature.

The second "showstopper" is the gas compression step in the Brayton cycle, which follows the heat rejection step. The previous paragraph showed that even high heat rejection temperatures still results in a massive radiator. The compression ratio is determined by the enthalpy extractions, namely, the percent of heat converted to power. The compression ratio is a function of the ratio of specific heat, which is 1.67 for noble gases, and 1.3 for diatomic molecules at moderate temperatures. For only 20% enthalpy extractions, the pressure ratio is 12.7 for hydrogen, and 6.3 for helium. For single stage compression from 2000° F. heat rejection exceeds the power output for hydrogen while it is about two-thirds of the power output with helium. Staged compression would improve this but to no purpose. The bottom line is the Brayton cycle is not suitable for space use at large power levels.

As noted above, one step that would be suitable for MHD power in space is a modified Rankine cycle with Lithium-Hydrogen as the working fluid, as discussed above and in Zauderer's U.S. Pat. No. 4,851,722, "MHD System and Method", Jul. 25, 1989, which by reference is incorporated herein in its entirety. It dealt with pulsed power in which metals were used to heat cesium seeded, helium or hydrogen with powdered metals burned with oxygen that formed liquid metal oxides as the $H_2$, and He were heated to 4000° K to 6000° K The Patent dealt with space based pulsed power, and in one option the $H_2$ leaving the MHD generator reacted with lithium to form liquid lithium hydride. This was computed for temperatures around 1000° K. The liquid LiH was then compressed in an electromagnetic pump to the inlet pressure to the metals combustor wherein the powdered metal fuel, such as aluminum burned with oxygen to form liquid aluminum oxide. Upstream of the combustor, the lithium was separated from the hydrogen to be reused at the outlet of the MHD generator this application was limited to short duration pulsed MHD power in space.

This lithium hydride MHD cycle can be used with a nuclear reactor heat source. However, as disclosed above, it should only be used for producing power in space, but there is a much better use of hydrogen in what should be called a topping cycle, in which the "top" is the MHD generator, and the "bottom" the residual thermal energy in the hydrogen exiting the MHD generator to add to the thrust force of the rocket.

The MHD Generator-Hydrogen Rocket Combined Cycle:

Due to the problem of the massive radiator needed for heat rejection the following alternative for Moon, Earth and beyond travel with heavy unmanned and manned loads is proposed. One solutions disclosed herein is to use a hydrogen powered nuclear MHD generator, and use the hydrogen exhaust to augment the rocket thrust from the hydrogen exhausting from the MHD generator. This could be implemented by combining the NERVA nuclear rocket with the closed cycle MHD generator.

The first step is to offer a solution to the problem of reaction of hydrogen with the graphite pebbles filled with uranium. One solution is to flame spray millimeter thin refractory metal oxides on the surface of graphite pebbles to prevent a hydrogen-carbon reaction. $ZrO_2$ is useful to 2600° K (4680° R) in oxidizing atmospheres, and probably higher with $H_2$. The $ZrO_2$ is useful to 3000° K (5400° R) in non-oxidizing gases. This would solve the pebble bed nuclear reactor material problem.

The second and crucial step is to determine the thrust or force that an MHD accelerator can implement. Here again the NERVA size nuclear rocket to Mars is used as an example.

However, the analysis presented here differs from what is apparently the method used in the literature, where the emphasis is on the Specific Impulse (SI), which is reported in "seconds". The various SI levels for rockets from chemical, to nuclear, to electric ion were presented above, and it was noted that beyond nuclear with SI in the 825 seconds range, the values in the literature are misleading. The impression created is that SI in ion engines are superior because the ion SI is in the many thousands range. However, converting ion engine SI to thrust reveals that the thrust is insignificant and is only useful for small instrument carrying rockets to the outer planets. While this is a very important scientific goal, it is also a dead end as there is no-way these devices can ship large loads, much less humans anywhere with current technology. This distinction initially escaped this inventor as to the purpose of high SI because Impulse has been defined since the early jet age as a force, namely:

The impulse function, $\tau$, (pounds-force or Newton) equals $pA+\rho AV^2$, where p is the pressure, A is the cross sectional area of the gas flow, and V is the velocity. Now when dealing with compressible gas dynamics, Specific Impulse, $SI=\tau/MF*g$, where MF is the mass flow rate in kg/sec, or in slugs/sec. A slug equals the mass in lbs. force divided by the acceleration of gravity, g. Therefore, g cancels out and the equation for SI is valid no matter what the gravity, as long as the same g is used in the SI equation.

Now in chemical and nuclear rockets, thrust, $\tau$, is determined by the state of the gas, namely temperature and pressure and by the expansion through a nozzle to the zero pressure in space. This is the source of the SI of about 300 for chemical and about 825 for nuclear rockets. The advantage of the nuclear rocket is that it can heat hydrogen, the lightest stable atom or molecule, stored at very high pressure in gas or liquid phases. In the NERVA rocket the nozzle chamber pressure was 625 psi, and the stagnation temperature, 4500° F. This yields SI of 825. On the other hand the chemical rocket fuel must be oxidized so even $H_2$ become $H_2O$ with a molecular weight that is 9 times that of $H_2$, and the denominator with combustion is greater, which reduces SI to the 300 second range.

However, when dealing with electromagnetic thrust, as in MHD accelerators, or in ion accelerators, a new force enters the thrust term, the Lorentz force, $F_L$. Its vector is parallel to the gas velocity. It is orthogonal to JA'×B, where J is the current density in amp/$m^2$, A' is the electrode surface area on the parallel walls, perpendicular to the gas flow vector in the MHD accelerator. B is the magnetic field in Tesla that is perpendicular to both the current direction and the gas velocity.

The ion thrusters operate on another unique principle, namely an electric field with or without a magnetic field that accelerates ions. To achieve high thrust a heavy ion, namely xenon is used. However the volumetric ion density is so minute that the total thrust is very small. It is generally less than one Newton, despite the very high SI.

In total contrast, the MHD accelerator disclosed herein operates under non-equilibrium ionization at elevated electron temperatures at high particle density, in the $10^{14}$ to $10^{15}$ electrons per cubic centimeter. This density determines the enhanced electric conductivity, which in turn determines the electric current which in turn determines the Lorentz force, J×B. Therefore, the electrons drag the cesium ions, which in turn drag the hydrogen gas and decelerate it to produce power. It is also the electric conductivity that determines the magnitude of the force that drives the MHD accelerator. As described earlier in this Section on Space Applications of MHD, the preferred option is to place the MHD accelerator downstream of the exit of the MHD generator.

Another very important feature of the MHD accelerator is that the electric conductivity in the accelerator can be further very substantially enhanced above the level obtained in the MHD generator by selecting the MHD accelerator load factor, which by definition is negative, $-K=-V/(U\times B)$ that will sharply increase the non-equilibrium electron temperature and ionization and thereby the electrical conductivity of the seeded hydrogen. As a result the thrust can be changed as needed to control the rocket flight through a wide range of velocities. In addition, added thrust is obtained when at the MHD accelerator exit the hydrogen thermal energy continues to expand in the exit nozzle in area ratios as much as 100:1 into space. This means that most of the hydrogen energy is used to propel the rocket, which enables velocities that far above those attainable with a nuclear rocket alone. This enables speeds many times faster than with a nuclear thermal rocket. Trips to Mars in the order of one month or even less are now feasible, initially unmanned and much later manned.

Again the NERVA rocket example will be used, with one huge difference. The numbers shown here apply to the total 3912 seconds firing time for all the engines from the NERVA manned Mars landing analysis. However, by using MHD power, the duration, course corrections and space rocks avoidance during the entire trip will be under control of the team on the Earth control station in unmanned missions, and under the control of the astronauts and ground station in future manned flights.

One example of a nuclear NERVA rocket to Mars had a total weight of 1,930,000 lb. of which 1,181,000 lb. was hydrogen fuel, and the balance being the bulk weight of the rocket including stages dropped on the way to and return from Mars: SI=825 sec., thrust=240,000 lb. per rocket engine, of which there are apparently 4 or 5 with 3 fired simultaneously on takeoff from Earth Space Station orbit followed by jettison of the first stage, and one engine during the rest of the mission to Mars with jettison, and one for return to Earth with jettison. While two or three reactors are probably jettisoned, it is not clear where the $3^{rd}$ one is used for the rest of the mission, or there are two more. It is probable that the $3^{rd}$ reactor is used for the entire trip. Each reactor power=5000 MW.

Applying this reactor example to an MHD generator inlet temperature=4000° R; MHD outlet=2520° R; MHD Mach No. 0.9; MHD enthalpy extraction=50%; Load factor, K=0.8; Hydrogen velocity (average), U=2819 m/s; non-equilibrium electrical conductivity, $\sigma$=100 Mhos/m, a super conducting magnet, B=6 Tesla; Faraday voltage, U*B*K=13,446 V.; MHD current-JA'=336,000 Amp/$m^2$; yields a power density of $\sigma*U^2*B^2*K*(1-K)$=4520, MW/$m^3$.

The above MHD power levels are for 1 $m^3$ of MHD channel, which may be too compact because the current density of 33.6 Amp/$cm^2$ is about 3.36 times the usual 10 Amp/$cm^2$ peak with thermionic emission. However, in tests in the 10 MWt shock tunnel MHD generator at GE this Inventor observed current densities of 40 Amp/$cm^2$. Also, in gas combustion MHD generator tests spot current densities up to 50 Amp/$cm^2$ were reported "Open Cycle MHD Electrical Power Generation" by M. Petrick and B. Y A, Shumyatsky p. 193 (Argonne National Laboratory, 1978). The temperatures in the present application are substantially higher that the thermionic emissions studied in prior art, such as discussed in depth in a survey book: "Thermionic Emission" by W. B. Nottingham in Encyclopedia of Physics, Vol. XX1, (Springer Verlag, Berlin, 1956). In the present application where no oxygen is anticipated in the MHD channels, this prior art listed in both books can be tested to extend thermionic emissions to the current densities disclosed herein. One candidate would be tungsten with cesium coating, and used as seed herein, might reach the desired current densities. Also, the insulating gap between adjacent electrodes should be equal to the electrode width. If thermionic emission limitations are a factor, a nominal 7-meter long channel, with an axial spacing of 50% electrode and 50% insulator whose combined width is 10% of the anode to cathode separation. The latter is wide enough to yield induced voltages that are at least 10 times the value of the electrode voltage drop of about 100 Volts. The height of the electrode wall is selected to yield a 7 m$^3$ channel volume. These dimensions are selected to show how the channel is designed. The actual dimensions are based on MHD generator computer analysis, which are implemented by established optimization methods. Note that the short duration of a Mars trip could enable the use of electrodes that would not survive in a commercial power plant. In any case, as noted, electric arcs striking the electrodes carry much higher current densities than with thermionic emissions.

The empty rocket weight at Earth orbit takeoff is 749,000 lb. The weight of the nuclear reactor based on pebble weight was given above as 88,587 lbs. The other heavy item is the 6 Tesla superconducting magnet, which serves both the generator and accelerator. In the 1970s Open Cycle MHD program a large saddle coil superconducting, magnet was fabricated at the Argonne National Lab, and a 6 Tesla magnet for a future 1200 MW MHD plant with an active warm bore of 154 m$^3$. The present MHD generator active internal volume could be as small as 1 m$^3$ and assuming another 1 m$^3$ for the accelerator, this could be housed inside a 2 m$^3$ active warm magnet bore, which equals 1.3% of the said design, with a resultant magnet weight of 68,035 lb. Again scaling from the large magnet yields 17.8% for the super conductors, 10% for the Cryostat, and 73% for the structure. The structure is clearly the place where weight reductions of the magnet could be found. In fact in Space where weight and volume are of prime importance the steel structure can be mostly replaced with high strength carbon fibers such as are used now on airplanes. Iron will be required for magnetic flux. However, the weight of the structure could be reduced by at least one half, to 25,000 lb. This would make the magnet total weight 35,000 lb. a manageable number with room for further weight reductions.

The weight of the nuclear pebble bed reactor and the magnet is 25% of the 745,000 lbs. NERVA rocket without fuel. So even without reducing the weight of the magnet, it is not a "showstopper".

However, another major weight reducer in the structure would occur if water were used in place of liquid H$_2$ and O$_2$. In this case, the reactor core would consist of parallel-cored tubes, and the wall convective heat transfer with water and high-pressure steam (100 atm) would be much higher than with equal pressure gaseous hydrogen.

The above calculations provide the result of interest now, the thrust of the rocket. The rocket was designed for 240,000 lb/sec. of thrust during all phases to the Earth Orbit to Mars landing and return to Earth. The first leg used three rocket engines, each weighing 38,00 lb. which equal 15% of the rocket weight without the fuel. The other two legs, for Mars approach and return to Earth orbit, use one engine each for a total thrust of 1,200,000 lbs, or 5,337,866 Newtons. As noted the firing time total 3912 seconds, or 1.09 hours. Now the MHD generator produces a 2,016,972 Newton/m$^2$, while the energy left in the hydrogen exhaust from the MHD generator yields 2,668,933 Newton. Now this sum is 88% of the thrust produced by the rocket alone.

In any case the MHD thrust vector points upstream while the gas expands in the rocket nozzle, with a net result that the rocket does not move. Now, the power output of the MHD generator which cooled down the hydrogen from 4000° R to 2520° R and slowed the gas from 3130 m/s to 2473 msec could reaccelerate the gas to nearly its original condition less non-reversible energy losses, but with no gain, to what purpose?

(Note the previous sentence was written under the assumption that the magnetic field vector pointed in the same direction on the generator and accelerator, and therefore, the J×B vector in the accelerator opposed the gas flow direction by also pointing upstream as in the generator. However it was noted above that by reversing the magnetic field vector, the J×B vector also accelerates the gas downstream. This is not considered in the present example.)

But now non-equilibrium ionization comes into play. By rearranging the generator output, the power from the generator can be used to increase the electron temperature, which increases the electron concentration, which in turn increases the electrical conductivity, and the current and power into the accelerator. Assume that the accelerator runs at Mach 2, which yields a velocity of 5498 m/s at the local 2500° R gas temperature. The load factor K is reversed and increased to −1 in the accelerator. The conductivity σ increases from the 100 Mhos/m in the MHD generator to at least twice this value by the applied electric voltage from the MHD generator electrodes to the MHD accelerator electrodes. Since most of the MHD power goes to the MHD accelerator it is assumed that the entire output of the MHD generator is used to drive the accelerator. For the above hydrogen gas conditions in the generator operating at Mach=0.9, an average velocity of 2800 msec, B=6 Tesla, and K=0.8, one obtains an average induced voltage of 13,446 V/m, a current density of 336,000 amp/m$^2$, an average power output density of 4,520 MW/m$^3$, and about one-third enthalpy extraction. This yields an average force J×B from the MHD accelerator of 2,016,972 Newtons/m$^2$. In addition, the remaining thrust available from the exhaust of the hydrogen from the MHD accelerator into outer space is 2,668,933 Newton for a total 4,685,905 Newton. This equals 88% of the sum total hydrogen thrust of 5,337,866 Newton if the hydrogen would exhaust though a subsonic-supersonic nozzle from the stagnation pressure into outer space from the NERVA rocket for a total 1 hour firing during for the Mars round trip, including a short one-month Mars landing. By increasing the channel cross-section to 1.3 m$^2$, J×B increases to 2,682,573 Newton and the total thrust equals 100% of the NERVA thrust. To repeat, this MHD generator output would then drive the co-axial downstream MHD accelerator at supersonic nominal Mach 2 whose lower gas temperatures would operate under non-equilibrium electric conductivities to achieve the 5.3 million Newton thrust. As per NERVA, the rocket weight would be 1,930,000 lb. at Earth-Orbit takeoff of which 1,181,000 lbs. is hydrogen.

The above calculations show that the MHD system with a NERVA rated nuclear heat source can readily duplicate its performance. However, as noted, the NERVA one-year mission is a totally unrealistic "sling shot" approach whose length is dictated by fixed, unchangeable area nozzle to one-hour total firing for the Mars roundtrip. In contrast, the thrust attainable with MHD acceleration is variable by adjusting the power output and accelerator input levels throughout the entire mission. This would enable acceleration at much lower rates but for very long periods, thereby reaching far greater velocities, which would enable the rocket to reach Mars in a radial direction in 39 days at 46,000 mph with a similar deceleration during Mars approach. Also this is made possible using the Earth space station velocity of about 17,500 mph to kick start the rocket from the space stations.

In the above MHD Accelerator sub-section, several examples were given of how much non-equilibrium power could be extracted from an MHD accelerator with cesium seeded nitrogen. The range of power selected as examples was from 22,000 MW/m$^3$ to 110,000 MW/m$^3$ with electron temperatures from T=9,919° K to 15,867° K while the static gas temperatures was only about 2000° K. With hydrogen the power density is much higher than in $N_2$ due to its lower molecular weight. Also, its inelastic collision loss factor, $\delta$, is about one-half of nitrogen, which would double the electron temperature. The velocity for $H_2$ is 3.74 times higher than $N_2$. So the thrust from MHD accelerator gas expansion is so much higher than gas dynamic rocket velocities so that the 100,000s mph range could be feasible for trips to Mars and beyond.

All this is achievable with gas-cooled nuclear reactors operating at about 3500° R to 5000° R, (1944° K to 2778° K) as in the NERVA program.

MHD Interplanetary Propulsion with Metal Fuels:

Now in order to achieve high load unmanned and manned missions to Mars it is disclosed to use propulsion with metal fuels, preferably beryllium, to yield hydrogen gas temperatures of 6000° K after preheat to 3000° K in a cored parallel tube or pebble bed nuclear reactor.

When the Saturn rocket was selected for the Moon program, the weakness of relying on nuclear rocket propulsion for Mars should have occurred to rocket specialists in the 1960s, namely its peak temperature is limited to 3000° K, which limits its specific impulse and thrust to only double that of a chemical rocket. The 1960s are cited because Sutton and Sherman's 1965 book: "Engineering Magnetohydrodynamics", (McGraw-Hill, p. 448) disclose the following equation on the limiting exit velocity into a vacuum: $U_{limit}=\sqrt{(2 C_p T_o/M)}$, where $U_{limit}$ is in msec, $T_o$ is the stagnation gas temperature in degrees Kelvin, $C_p$ is the molar specific heat at constant pressure, and M is the molecular weight. Now for hydrogen at 3000° K, $U_{limit}$=10,535 msec, and dividing by g the acceleration of gravity of 9.8 m/sec$^2$ yields a Specific Impulse (SI)=1075 msec, which is somewhat higher than the 825 second used in the NERVA Reactor project. However, at the peak temperature achievable with Be combustion at 6000° K and 100 atm, $U_{limit}$=15,875 msec, and SI=1620 second. It is emphasized that this SI is due to gas dynamic expansion. When adding the electromagnetic force, SI can be substantially increased to 20,000 as shown in an example of the J×B force above. This enables reaching Mars in 39 days in million pound rockets. Furthermore, the very high SI attainable with electric thrust was known at the time. However, instead of focusing on MHD power, the focus was on very high SI but tiny thrust ion accelerator. As a result we have remote control trucks on Mars, and NASA is now expending $2.3 billion on a Mars rocket, Curiosity, with a tiny 2000 lb. load landed on Aug. 5, 2012, as noted above. To this one add the $1.1 billion Juno rocket with a 3518 lb. payload, launched on August 2010.

So the question arises is since the shortcomings of temperature from nuclear reactors and almost negligible thrust from high SI electric accelerators must have been recognized at the time, why was MHD power in space never attempted? One plausible answer is that the MHD community decided to put all the resources on coal combustion, Open Cycle MHD because it promised immediate huge revenues while manned travel to Mars was relegated to the 22$^{nd}$ Century, or was it the 24$^{th}$ or 25$^{th}$ Century, as disclosed by the mid-20$^{th}$ Century Comic book "Buck Rogers". Also, the solution disclosed herein of using BeO oxidation to heat $H_2$ and doubling the SI and greatly increasing thrust was not considered because no one thought of removing the metal oxide from the combustor gas exhaust which would hold the molecular weight of the exhaust gas down. That is the reason why boron, which is only slightly heavier, is not proposed herein because it is a gas at these temperatures.

In fact, the solution disclosed herein only became feasible after decades of R&D that began with this Inventor's MHD Group at GE in the late 1970s on the air-cooled, two-stage, counter-swirl, slagging coal combustor, which turned out to be a deficient design, and its correction became the sole focus of this Inventor's firm, Coal Tech Corp after 1981. The method disclosed herein is based on the combustor retaining up to 90% to 95% of the BeO, which is substantially higher that the 70% to 80% retention with coal because to achieve very high slag retention requires high swirl pressure, that reduces cycle efficiency. Incredibly, the potential of higher slag retention was found unexpectedly by this Inventor in high swirl tests around 1990 in the air-cooled combustor on conversion of coal fly ash slag. However, this was not pursued because high fan power was required, which reduces the efficiency of the furnace. As a result the 100 hp fan used at the time was replaced with a 50 hp fan. Now over two decades later this fossil fuel result can apply to space propulsion.

Another novelty is recycling the metal oxide BeO at the rocket's destination or origin, which incredibly makes this costly metal "renewable", if nuclear power is used for recycling, or even wind or solar or preferably coal with $CO_2$ sequestration. Even if the 5% BeO is entrained in the $H_2$, it adds only 0.36% points to the molecular weight $H_2$ of 2, which reduces the $U_{limit}$ by only 9%. So even without MHD acceleration, the way is open for a high-speed rocket whose SI is double the 825 seconds used in the 1960s. Also, as explained below, another major novelty disclosed herein is to use the nuclear reactor to heat the water, instead of liquid hydrogen and oxygen, to 3000° K followed by heating it to 6000° K by beryllium reacting with the dissociated oxygen from the water. Until very recently no one knew of the existence of massive amounts water in the Solar System, especially on the asteroids in the outer Asteroid belt, on our Moon, on Mars, and on moons of the outer planets, such as Jupiter's moon Europa that has an ocean below the surface, all of which provide sources for the oxidizer and propellant. Water 10 times greater density than $H_2$ and $O_2$ enables the rocket size reduction by a factor of 10. This makes major manned space ships even for near interstellar exploration possible.

In addition to the absence of a database on advanced slagging combustors in the 1960s and 1970s there was another shortcoming on MHD power in the 1960s, namely the great weight of conventional magnets and the extremely low electric conductivity of fossil fuel combustion products systems. The result was a belief that electric power systems could not match chemical rocket propulsion. Superconducting magnets were considered at the time. However, high strength low weight composite materials were not available, nor needed for land-based applications. Also, much more important, at the time there was no evidence, except this Inventor's initial non-equilibrium shock tube results, which were not duplicated until later in the decade and confirmed by him and then the Dutch, and other MHD shock tube tests in Japan in the 1970s, and finally by one minute blowdown tests at 5 MWt by the Eindhoven group that used GE's 50 MW blowdown design and one GE fabricated MHD generator.

However, despite the fact that this later MHD evidence coincided with a period when torrents of funds for energy R&D and MHD R&D became available, no government funds were made available for coal based, closed cycle MHD, much less for non-coal based MHD. The request by this Inventor's MHD Group at GE for DOE co-funding with GE and the electric utilities R&D institute, EPRI, for a 50 MW (thermal) non-equilibrium MHD, one minute, blowdown experiment that would have demonstrated the commercial scale viability of this MHD method, and cost only a few million dollars out of the $400 million MHD funds, was repeatedly rejected by DOE. The argument in the 1970s that 1000 MWe coal-firing, closed cycle MHD would require over a dozen massive, costly cored ceramic brick heat exchangers was specious because it could have been replaced with helium and 10 times smaller heat exchangers, as disclosed herein.

However, recent examination by this Inventor of the relevant U.S. 1974 Public Law revealed that the CDIF accounted for less than one-half the funds, and the balance was not allocated to a specific MHD technology. Subsequent documents by U.S. Budget Office and the Congress Office of Scientific Research substantiated this. That early 1980s documents stated that closed cycle MHD received only $1 million out of the $400 million expended in the entire decade of 1970.

However, one of the most probable culprits was accidentally discovered by this Inventor in May 2011 when he borrowed the Revised Printing in 1987 of Richard J. Rosa's 1968 book, "MHD Energy Conversion", several of whose contents are cited herein. The only new item in the 1987 printing is a 3-page Preface that claims to summarize the MHD events since 1967. Although the 1967 edition has 24 out of 196 pages on Non-equilibrium Closed cycle MHD, its viability was questioned despite citing Zauderer's shock tube and shock tunnel work. By the time of the 1987 edition Zauderer's 10 MW shock tunnel results of the early 1970s with 20% energy conversion at 2000° K, and the GE/EPRI plan for a 50 MW thermal, closed cycle MHD blowdown test were disclosed at several USA and International MHD Conferences. Nevertheless, Rosa's 1987 Preface cites only two non-equilibrium results. One was from Japan and the other one was from the Netherlands where tests were performed on a 5 MW thermal, scale down version of GE's 50 MW design that GE's MHD Group made available to them. Even at that small size the best Dutch enthalpy extraction was up to 12%, which at least matched the best obtained in 250 MW thermal combustion MHD generators. Nevertheless, Rosa's preface does not mention the GE shock tunnel results. Also, Rosa stated: "While the feasibility of non-equilibrium ionization is yet to be demonstrated, some encouraging results have been obtained and some very interesting observations were made". This is followed by citations of the Japanese and Dutch references. Interestingly the Dutch work was reported in quite a number of Symposia and published technical papers but with no reference that their MHD blowdown was based on the GE design. Rosa's employer AVCO Everett Research Co was a major beneficiary in the DOE $400 million open cycle MHD program, which might have been curtailed if the closed cycle MHD tests were successful.

Even more incredible, as detailed above, this Inventor discovered in early July 2011 that the early Eindhoven MHD tests included tests with the GE fabricated MHD channel, a fact that was never disclosed by the Eindhoven group. To this one can add the decision made by some upper managers at GE to shut down a two decade long dedicated, high recognized quality MHD R&D Group whose funding was almost all obtained from government sources by this Inventor from which GE profited in fees and overhead expanses, without any investment in 20 years, except the small $300,000 from GE Corporate in the early 1970s.

The present novel technology rests on sound science and is superior and very far less costly than other publicly revealed energy and propulsion technologies. Also, metal fuel powered propulsion and MHD generation and propulsion database exists and can be implemented almost immediately. A major apparently unrecognized scientific principle that could describe this method is its indirect use of Archimedes Principle as a means of traveling to the Moon to Mars, to asteroids, to the moons of the outer planets and beyond, with heavy loads that involves using a metal fuel, preferably beryllium with MHD generators and accelerators and the very novel unanticipated use of on-board dissociated water as the oxidizer and propellant. Water would come from the Moon, from Mars, and from newly discovered untold massive water sources on the outer asteroid belt and on some of the moons on the outer planets. Thus with nuclear power, augmented with 90+% renewable, metal fuels, the means are available to send unmanned missions to the outer planets.

One would assume that liquid $H_2$ and liquid $O_2$ should be prepared at the origin of a rocket trip, not on Earth due to the great lift power needed, but on the Moon, on Mars, on an asteroid, or an outer planet moon. However, it is disclosed herein that instead of using these liquefied gases whose very low density require huge rockets, water whose density is about 10 times greater, which makes the rocket 10 times smaller, should be loaded in the liquid state into the rocket ship, and dissociated therein into $H_2$ and $O_2$ at the rate that it is consumed.

(Note: The rate of $H_2$ flow is controlled by the adjustable MHD power rate and therefore it can be adjusted to match the $H_2O$ dissociation rate.)

Dissociating water provides oxygen that will react with metals, again preferably beryllium because it is the lightest metal to form a liquid metal oxide BeO, and in the process, hydrogen is released and heated by the BeO droplets to a stagnation gas temperature of 6000° K (10,800° R) at 100 atm pressure which is double the 3000° K nuclear reactor. (Note: The amount of beryllium to be used is variable and depends of the mission requirements. It can vary from zero to 100% above the nuclear energy.) In both cases, hydrogen is the propellant. Another advantages of water at very high pressure, up to 100 atm, is desired for a number of reasons, such as requiring very much less power than on-board $H_2$ gas compression. Also high pressure is necessary to prevent even minimal gasification of the BeO, which could quench non-equilibrium electron heating and electric conductivity. At 6000° K and Mach 0.9, the $H_2$ velocity is 5,236 msec. At 6 Tesla, and K=0.8, the Faraday induced voltage–UBK is a very high 25,134 V/m., which yields an extremely high power density of 157,935 MW/m$^3$. At first glance this power density would appear to be far too high. However, no one knows what "too high" is without testing. In addition, it shows the huge potential of MHD power. The only way to determine its upper boundary is to try it by testing. The generator volume can always be increased to reduce the power density, or vice versa. The current density under this condition is 6.28×10$^6$ Amp/m$^2$, or 628 Amp/cm$^2$. This is about 10 times higher than the reported limit of thermionic emission. However, such high density could be achieved with electric arcs, and values of 50 Amp/cm² in electrode arc spots in open cycle combustion MHD generators, and in the MHD shock tunnel tests at GE have been reported.

In any case, 628 Amp/cm² yields a J×B electromagnetic force of 37,702,654 Newtons/m². These examples of thrust are taken from conditions in the MHD generator, but they can also be produced downstream in the MHD accelerator at the exhaust of the MHD generator. While the gas velocities are in the same range as with conventional gas thrust exhaust, the major differences is the electrical conductivity, which is controlled by gas temperature for equilibrium conductivities, and they are sharply increased by the use of a metal fuel heat source. In addition, since gas expansion substantially lowers the gas pressure and gas temperature to cut off equilibrium electric conductivity, the non-equilibrium conductivity is used which is controlled by the magnetic field strength and the gas velocity, and the conductivity increases with decreasing gas pressure. All these conditions combine in the MHD accelerator to produce the very high thrust and SI of up to 20,000 seconds shown above.

The specific conditions to be selected for an actual mission depend on the mission profile, which can cover an extremely wide range, as evidenced by the massive 50,000 reported cases analyzed by the NASA-TRW team for the NERVA Mars mission.

The present advantage is to show that doubling the gas temperature to 6000° K and adding MHD acceleration opens a region unobtainable with any other technology. It shows its huge advantage over the NERVA rocket. This J×B force is 14 times the J×B force, as cited above, would be obtained from a nuclear MHD generator at 4,000° R (2,222° K), where the additional thrust from expansion of the $H_2$ jet to zero pressure in space would add another about 2 million Newton for a total thrust of 5.34 million Newtons that matches the NERVA rocket thrust. Therefore, the total 40 million Newtons from the 6000° K MHD accelerator is 7.6 times the NERVA thrust. But more important, it requires far less proportional propellant.

A point about additional exhaust thrust is in order. Normally, any thrust beyond the outlet of the accelerator nozzle is called a "leaving loss", (see "Internal Combustion Engines", E. F. Obert, [International Textbook Co, Scranton, Pa., $2^{nd}$ Ed. 1950, p. 592]). It means that once the gas exhausts the rocket, its force on the rocket ceases and the energy goes to waste. Therefore a high stagnation pressure is indicated. For example, at 100 atm stagnation pressure and 6000° K, an isentropic Mach 5 gas exhaust for $H_2$, with γ=1.3 results in a static pressure of 0.117 atm (1.72 psia) at an exit temperature 1260° K. Using the Mach 1 at a 1 m² throat for the MHD accelerator would require a 46 ft², or 7.65 m (27 ft) diameter supersonic nozzle exit. This is not excessive. Each of the three 1st stage rockets in the 2 million lb. NERVA that is used as a basis of comparison is 33 ft in diameter. In the present case only one rocket is needed. Therefore, the "leaving loss" in the present case is very small. Also, the MHD accelerator exit pressure upstream of the nozzle exit is recoverable. Note that these numbers are only meant to convey the range of operating conditions in a typical rocket system using this technology. The actual non-isentropic conditions with the MHD system will differ substantially. However, the overall methodology will be similar.

To re-emphasize, this invention differs totally from the high specific impulse, SI, ions thrust accelerators that have been in use for decades by NASA because they only accelerate ions and their thrust is limited to the range of one Newton. In the present case, the thrust gas, hydrogen, need not even be ionized. Instead the ionization occurs in the seed gas, such as cesium, and its ions drag the neutral metal molecules and atoms in the gas stream. Now, there are limits to this because at high magnetic fields, ions will "slip" to a lesser velocity than the neutral gas. However, this effect can be countered by operating at high pressures and temperatures, which is again possible with the present high temperature metal fuel. But even more important the use of a lightweight metal fuel means that high levels of thrust are available which enables sending massive weight spaceships to other planets on very short duration voyages.

Also, as disclosed above, it may be possible to obtain additional thrust from the plasmon wake effect, especially if transverse plasma striations are present. One means by which this could be used is to compare to a Mach 1 jet. In the ground it stands, but at it head toward Mach 1, the air carries it. Outer Space is filled with radiation and "dark matter". At the rocket heads to the Speed of Light this phenomena may begin to add lift. As to any or how much of this thrust can be achieved in practice must be determined by experiment. To seek this effect can be tried by forcing maximum rocked speed, as disclosed in the present invention.

As stated above, in the present invention, the novel aspects of the disclosed mode of the space rocket propulsion are contrasted with the 1960s studies of the NERVA Nuclear Rocket to Mars. While numerous technical papers on this subject were published at the time, much of this information is in general summary form, and it is not detailed enough to determine the technical aspects of the Mars mission. The most extensive study, which was cited in a number of contemporary technical papers in the 1960s, and cited above, was the massive nine volume study published in the 1965 NASA sponsored: "Mission Oriented Advanced Nuclear System Parameters Study" by TRW Corp. About 50,000 different parametric missions profiles to Mars were analyzed. They were divided into three groups of mission trajectories, namely:

1) Opposition—Direct from Earth orbit to Mars of over 200 days each way, and a short stay on Mars of about 30 days.

2) Conjunction—Begins when the two planets are in conjunction, which lowers the required trip energy. It requires an extensive stay on Mars, and extends the total trip to 900 days.

3) Swing by Venus—This yields the lowest energy and lowest Earth re-entry velocity but it is longer than option 1 by 100 to 150 days.

All three options used semi-circular elliptical flight paths, which have very long missions. Also, the total rocket weight was from 2 million to 6 million pounds, with the hydrogen equal to well over one-half of the total rocket weight.

While the Report is very extensive and useful, important details were omitted, such as a breakdown of rocket velocities after each leg of the mission, the distance of each leg, the acceleration in each thrust leg, thrust, and the power used. The most important shortcoming was the total focus on using a 4500° R graphite nuclear reactor. As shown herein, this limits the scope of the study in that it limited the rocket thrust and required long nominal 6-month trips each way. Also, as stated above, there is no explanation as to the reason for taking this very long route, when the calculated thrust herein was about the same as the direct radial route, which is about four times shorter. Also, hydrogen reacts with the carbon core of the reactor with no explanation as to how to deal with this. The high-energy liquid chemical propellants used in the NERVA studies limited them to total round trip firing of under one-hour duration. Only a vague Mars approach step was included with no details as to how it would be implemented. Also, there was some capability for mid-way trajectory adjustments but the firing time was not disclosed only the total available hydrogen use. Also, there were some other items such as a 22,939 lb. solar radiation shield. Presumably some capability was provided to avoid rocks during the mission. Of course with a 6 month trip the risk was greater in such a large vehicle.

In contrast, MHD propulsion can provide a factor of ten higher thrust, and thereby drastically shorten the voyage by replacing the elliptic rocket trajectories used for NERVA with direct radial interplanetary trips. To compute the trip duration, one needs information on the distances covered and the velocities. Also, needed is detailed information on the relationship between thrust and vehicle mass and acceleration. The NERVA mission studies used elaborate computer calculations, which are not available to the public. The results shown in the present application uses first order trip calculations that were deciphered from widely scattered data in the NERVA documents. Therefore, the emphasis is to demonstrate this invention's unique features. This provides information on the unique aspects of the invention, which can then be used to calculate detailed trip trajectories. FIG. 4 shows a typical NERVA elliptic mission from Earth Orbit to Mars with return of about 6 months each way. Also shown in FIG. 4 is the present direct mission with a radial trajectory of 39 days each way.

For the present invention, the first step is loading beryllium powder into the space ship. However, instead of loading liquid oxygen to react with beryllium to form BeO droplets that heat the co-injected liquid $H_2$ propellant, the rocket is loaded with water that is found on the Moon and Mars and on many asteroids and some of the moons of the outer planets. It is also probable that metal fuels also exist on some of these Solar system bodies. As with the terrestrial application, the BeO must be collected and reprocessed at the next destination back to metal. Based on testing of this Inventors slagging high ash coal combustor it is probable that with high gas swirl, 90% to 95% of the BeO will impact and adhere to the BeO liquid covered combustor wall to be drained from the combustor and quenched in water for reprocessing to beryllium at the mission end site.

The reason for using water is that its density is 62.4 lb/ft$^3$, while liquid $H_2$ is only 4.42 lb/ft$^3$, and liquid $O_2$ is 7.11 lb/ft$^3$. Be is 115.3 lb/ft$^3$, and BeO is 187 lb/ft$^3$. The result is that the volume occupied by the water, by the metal, and by the metal oxide is a tiny fraction of liquid $O_2$ and $H_2$ volumes. This gives water a huge advantage. While Archimedes principle does not apply, there is here an even more important "principle" namely, the very sharply reduced volume of the fuel and oxidizer and thrust gas, which is incredibly only 6.89% of the liquid hydrogen volume in a NERVA nuclear reactor. One of the smallest 1960s NERVA rocket analysis cases was used as a basis for comparison. As noted above, that case had a total calculated design weight of 1,930,000 lb. with 1,181,000 lbs, an incredible 61%, of the rocket weight, was liquid $H_2$.

This next result was obtained by scaling down the J×B force from the 37,701,654 Newtons/m$^2$ used in the 1,930,000 lb. nuclear NERVA rocket to its total thrust of 5,337,866 Newtons and subtracting an estimated 2,668,933 Newtons for the $H_2$ thrust from the MHD accelerator exit to the rocket exit, which leave 2,662,131 Newtons/m$^2$ for MHD thrust. This requires 48,444 lb. of Be to heat the $H_2$ from the 2500° K nuclear reactor outlet to the nominal 5600° K to 6000° K.

Now instead of loading low-density liquid oxygen in the rocket a total of 96,894 lb. water is loaded, which will dissociate into $O_2$ for combustion with Be to form liquid BeO droplets to heat the $H_2$ to the peak temperature. Now 10,765 lb. $H_2$ will come from the water, and the balance 72,626 lb. of $H_2$ will be stored as a liquid in the rocket. This brings the total weight of Be, $H_2O$, and $H_2$ to 217,956 lb. which is only 18% of the NERVA's 1,181,000 lb. of liquid $H_2$ The volume of the solid Be, liquid $H_2O$ and liquid $H_2$ is 267,195 ft$^3$, which is 6.89% of the total $H_2$ volume.

Since the $H_2$ in NERVA is 61% of the of the total NERVA weight, and about 80-90% of the total NERVA volume, which is a 430 ft high behemoth (See FIG. 5), this changes the Mars mission from a unrealistic dream to a near term realizable goal.

Also, since the huge fuel tanks are removed, the weight of the rocket structure will also plunge. Therefore, there is a great deal of room to add thrust and reach Mars in 39 days.

This is a major benefit of using water because it sharply reduces the rocket volume, making it a novel variation of Archimedes Principle.

There is another major benefit of using water, the nuclear reactor is much smaller than a $H_2$ gas cooled reactor because the thermal film coefficient of water is at least two times greater than a gas. As noted above, the three NERVA nuclear reactors for the Earth orbit liftoff weigh 15% of the rocket structure. Therefore, the much greater convective heat transfer to the water will greatly reduce the reactor weight. Due to the substantial energy needed to begin to dissociate the water, it is disclosed herein to use a high temperature (≈5000° R) (2778° K) nuclear reactor to heat the high pressure, 100 atm water-steam initially to near the triple point of 600° F. followed by continued heating of high-pressure steam toward the peak reactor temperature following by injection of the high pressure steam into the beryllium fired 2 stage-high swirl, slagging combustor where reaction of the beryllium with water vapor will dissociate it into $H_2$ and $O_2$ and be heated by Be droplets to form BeO while heating the released hydrogen to 10,600° F. This would eliminate the need for 2 of the 3 rocket engines used on takeoff from Earth orbit takes and reduce the size of the 3$^{rd}$ reactor by as much as 90%. However, for estimate purposes, only a 50% reduction is assumed to 19,000 lb., as explained below. About 0.1% cesium or potassium or lithium is injected to render the gas electrically conducting as it flows into an MHD generator-accelerator, as described above. However, at the cost of increasing the molecular weight of the hydrogen propellant-cesium mixture from 2.13 with 0.1% cesium in $H_2$, to 3.3 with 1% Cs in $H_2$, the increased equilibrium conductivity at 5000° K increases the electric conductivity from 400 Mhos/m to 900 Mhos/m, the 2.25 times increased electric conductivity will more than offset the 0.8 lower gas velocity, and result in 1.8 times higher J×B force, which is the objective of this invention. The point being made is that MHD offers almost countless mission optimization opportunities.

In connection with the last statement, it is noted there are many other ways of defining the mission and its implementation. In the present case of scaling back from the high J×B thrust may not result in a correct energy balance. In that case, other parameters cited here must be used.

The next question to deal with is how to implement the dissociation of water and how to implement the use of the liquid hydrogen that exceeds the amount obtained from dissociated water. Again it is emphasized that these are teachings to show the potential of this technology. There are so many variations that depend on the specific objectives that one would have to analyze countless variations, and in the end the result could be useless in achieving a planned objective. A pertinent example was the 50,000 cases analyzed in the NASA-TRW Mars mission, all of which would fail the manned flight objective due to the 6-month trip time, which is required presumably due to limited rocket thrust.

The present invention solves the thrust problem and opens manned flights of short duration even to the outer planet, and even beyond. However, it is strongly emphasized that the implementation depends on specified tests some of which are listed herein because based on the inventor's experience with MHD power, the theoretician's predictions based on deficient experiments that non-equilibrium MHD would not work was totally wrong, and much worse, to make sure they could not be disproved they blocked experiments, namely the 50 MW MHD blowdown. Fortunately, the inventor's recent recognition that the GE-MHD Group's fabricated MHD generator was tested in the Eindhoven 5 MWt MHD blowdown facility which validated key elements of the shock tunnel results means that all the obstruction was not only for naught but most probably denied the United States and the World the benefits of efficient and cheap MHD power. It could also have provided this power from very compact high gas temperature nuclear reactors.

The first calculations with equilibrium dissociation of water (i.e. steam) did not result in complete dissociation at the 6000° K with 100 atm conditions for use in deep space, Mars, missions. The analysis then turned to non-equilibrium dissociation, which combined with injected beryllium removes the $O_2$ from the water to form BeO thereby leaving only $H_2$, which with cesium seed is used for MHD power and acceleration and gas dynamic thrust.

The water is pressurized to 100 atm to maximize thrust by expansion to near zero thrust which requires over a 100 to 1 supersonic nozzle area ratio. The water is loaded into the rocket and heated in the nuclear reactor to about 3000° K followed by injection into a water dissociation chamber with part beryllium injection, followed by the rest beryllium into the $1^{st}$ stage combustor where the oxygen reacts with beryllium and heats the water vapor and hydrogen to near 6000° K.

The thermal dissociation of water is the reverse of the Heat of Formation, $H_f$ of water, which is a function of temperature. The gas species concentration is computed from the equilibrium constant $K_p$, which in also a function of temperature. These calculations are confusing due to the different terminologies use for chemical reactions by chemists and engineers. Engineers define $K_p$ as a function of pressure, which is listed in the JANNAF Tables as $Log_{10}$. It is listed as Heat of Formation, $H_f$, which for water is:

$$H_2 + O_2 \lt \gt H_2O. \quad \text{(Equation 5)}$$

This reaction is exothermic because the product, water, is formed by combustion of hydrogen with oxygen. Consequently reaction $K_p$ decreases with increasing temperature. The product is listed in the numerator, and the reactants in the denominator. If the reaction were listed in reverse, the $K_p$ would be $1/K_p$. This simply point is the cause of confusion, especially among engineers. Obert's 1950 book "Internal Combustion Engines" in Chapter 4: "Theories of Combustion" provides an excellent summary of the water reaction. However, he lists the above equations as "dissociation of water" instead of "formation", which applies to Eq. 5. He also describes, how to calculate the degree of formation, which is the reverse of dissociation. This is also described as formation of $H_2O$ in a first year college chemistry book, "University Chemistry" by B. H. Mahan (Addison-Wesley Publishing, Reading, Mass., 1965), Ch. 5. The species mol fractions are:

$$H_2 + 0.5*O_2 \gt (1-y)*H_2O + y*H_2 + 0.5y*O_2, \quad \text{(Equation 6)}$$

Here "y" is the percent of $H_2$ reagent, and "(1−y)" is the remaining water in equilibrium. Each gas mol fraction is divided by the sum of the gases in mols, (1+y), and multiplied by the total gas pressure to compute the equilibrium constant.

$$K_p = (P_{H2O})/(P_{H2}*P_{O2}^{0.5}): \quad \text{(Equation 7)}$$

For example at 100 atm and 70% dissociation of steam, $P_{H2O}=22.5$ atm, $P_{H2}=55.5$ atm and $(P_{O2})^{0.5}=25.9$ atm., the result is $K_p=0.08$, and $Log_{10} K_p=-1.1$. At 6000° K, $Log_{10} K_p=-0.877$, and extrapolating the almost linear function $Log_{10} K_p$ of −1.1 suggests a temperature of about 6500° K would be needed to dissociate 70% of the $H_2O$ A much lower pressure would increase water dissociation. For example at 10 atm, the temperature for 70% dissociation would be 5300° K, and at 1 atm it would be 4450° K. This is unacceptable because compression of $H_2$ to 50 to 100 atm is needed for efficient space propulsion, as noted above. This would require prohibitive compressor power even if $H_2$ were cooled to the 1000° K range to radiate the hear rejection in space.

It thus appears that equilibrium dissociation of water in space to obtain 100% water dissociation at 100 atm and 6000° K is not feasible.

However, instead of chemical equilibrium, one can use non-equilibrium effects by invoking LeChatelier's principle which states: "if any system in equilibrium is disturbed to the equilibrium, the system will respond to restore equilibrium". In the present application, for example, the analysis herein showed that very substantial additions of hydrogen are needed to obtain the rocket thrust. Specifically, for the MHD case that duplicated a typical Earth-orbit take off on a NERVA Mars mission, Be=48,440 lb. $O_2$=86,112 lb. and $H_2$=83,391 lb. of which 10,765 lb. of $H_2$ is from water and 72,623 lb. is liquid $H_2$. Now, the addition of more liquid $H_2$ will drive the reaction in Eq. 5 toward the formation of more water, while less water is desired.

Therefore the following steps could be implemented:

1) The liquid $H_2$ would be injected downstream of the Be combustion chamber, either immediately downstream of the $2Be+O_2$ combustion volume, or in the $2^{nd}$ combustion stage where the $H_2$ must be injected in any case in a counter-swirl direction to assure axial gas flow in the MHD channel. The various flow directions are shown in FIG. 1.

2) A nuclear reactor would be used to heat the water-steam to 3000° K. Although at 100 atm only a few percent of water is dissociated, the enthalpy of steam at 3000° K is about one half of the heat of formation, which equals that of the reverse heat of dissociation. Therefore, at least one-half of the dissociation energy is available without an external heat source. The beryllium would be used to react with the water and the released oxygen to form BeO that would heat all the $H_2$ to near 6000° K. This energy would be less than one-half of the energy needed to heat the hydrogen for propelling the rocket.

3) The $H_2O$ non-equilibrium dissociation would begin in a chamber upstream of the primary metal fuel combustor, where $H_2$ and $O_2$ would be rapidly exhausted with the $H_2$ passing through the combustor and the MHD generator and the oxygen would react with Be to form liquid BeO.

Due to the high velocity of $H_2$, it would appear that rapid $H_2$ removal from the $2Be + O_2$ combustion chamber can be readily implemented. However, its implementation is tricky.

For example, the 10,765 lb. of $H_2$ would be released from the $H_2O$ steam in the 765 seconds of Earth orbit takeoff, at 100 atm, 6000° K, and Mach No. 0.8, which would yield a flow rate of 14.07 lb/sec, with V=17,728 ft/sec through an opening $O_{H2}$=0.031 ft$^2$=4.5 in$^2$. The oxygen, 86,122 lb. over 756 sec=125 lb/sec. V=4,672, and $O_{O2}$=0.066 ft$_2$=9.51 in$^2$. This would require 96,887 lb. per 765 sec=126.64 lb/sec of steam, at V=5,905 ft/sec, and $O_{H2O}$=0.0938 ft$^2$=13.5 in$^2$. These three openings would drain each of these gases in 765 seconds during takeoff firing. The numbers show the flow rates needed to maintain non-equilibrium dissociation of water in a NERVA scale rocket. The three outlets would be arranged in the chamber to favor their outflow. For example, the $H_2$ outflow opening would be above the $O_2$ opening, while the $H_2O$ vapor outflow to the $1^{st}$ stage combustor would be below the other two. Also, the $H_2$ exit area would be less that one-half of the other 2 gases will drain the $H_2$ and accelerate the water dissociation reaction. For example, the Kp for a randomly selected rapid drainage rate was calculated assuming the chamber stays at 100 atm with $H_2$=0.002%, $O_2$=0.001% and $H_2O$ 5%. In other words, this example was selected to show a non-equilibrium dissociation case, where the $O_2$ and $H_2$ are essentially instantaneously removed from the $H_2O$ dissociation chamber so that by Eq. 6, $H_2$=4.25 atm, $O_2$=2.13 atm and $H_2O$=93 atm, which results in $Kp=93/[(4.25)*(2.13)^{0.5}]=14.5$, and $Log_{10}Kp=1.16$, and the reaction occurring at 3,650° K from JANNAF for $H_2O$ gas dissociation.

Another non-equilibrium example is at the other end of the $H_2O$ removal scale with 90% of the steam dissociated while 10% of the $H_2$ remains in the chamber, and the $O_2$ is completely removed by reaction with Be to form BeO. At 100 atm, the result is $H_2$=66.7 atm, and $H_2O$ would be 33.3 atm, with Kp=0.5, $Log_{10} K_p$=−0.3, and the reaction occurring at gas temperature of 4800° K as per the JANNAF Tables.

There is one major difficulty in applying these methods to the present MHD system. The chamber will be continuously filled with $H_2O$ gas as the $H_2$ and $O_2$ is withdrawn by reacting the $O_2$ with Be to form BeO liquid, leaving $H_2O$ vapor and $H_2$ as the only gases in this chamber. Therefore, even as the $H_2$ gas exits and the $O_2$ reacts with Be, some unspecified amount of $H_2O$ vapor will be drawn out of this chamber with the $H_2$ into the MHD generator and accelerator. Even small concentrations of about 0.1% of $H_2O$ will quench non-equilibrium ionization. The δ for electron-$H_2O$ inelastic collisions were not reported in the data of the 1950s that were used in the non-equilibrium MHD literature of the 1960s, such as the books cited herein by Sutton and Rosa who in turn cited Craggs and Massey electron-molecular collision review book in the 1950s.

Fortuitously Dr. Zauderer in reviewing his library of GE-MHD Group reports from the 1970s found a 1978 in depth report on the effect of inelastic collisions of electrons with $N_2$, CO, $CO_2$, and $H_2O$ by members of his Group. Dr. T. C. Dellinger, Dr. C. H. Marston, and Mr. E. L. Gray on "Theoretical Kinetic Model for Closed Cycle, Non-equilibrium MHD Generators with Molecular Impurities", (GE No. 78SDS010, July 1978). The report cited MHD test work by other members of the MHD Group, including this inventor, Dr. Bert Zauderer. The conclusion was that the collision loss factor, δ, in the literature underestimates electron losses. The loss factor for $H_2O$ was computed as about double that in $CO_2$, which is not surprising. However, the loss factor for $N_2$ was computed as about the same as for CO, and both were only about one half that of $CO_2$. This contradicts the very extensive prior art of the 1950s where δ for CO was reported at about 20 times higher than $N_2$, which is reasonable because the former is heteratomic while the later is diatomic. Examination of a graph in this GE document showing the electric conductivity as a function of the current density shows the latter ranging from 0.001 to 10 Amp/cm$^2$ with conductivities ranging from 0.001 to 2 Mhos/cm. The 1 atm gas was argon seeded with 0.1% potassium. According to a graph on Rosa's book (loc. cit.) this corresponds to electron temperatures in the range of 2000° K to 2500° K, which is at the very low end of the 1950s data and may account to the high $N_2$ collision loss factor. This discrepancy could possibly be resolved by examining data collected in subsequent decades, which is not possible due to the abuse of "copyright" of government owned data by publishers. Be that as it may, this result shows the need for experimental verification, which occurred in the GE MHD Group early in the 1970s, but not beyond that, due to cutoff of support by DOE.

In any case, the cited analyses are not grounds for dismissal of using $N_2$ or $H_2$ as the primary gas in the very high temperatures and high pressures disclosed herein. Therefore, until invalidated by experiments, for present purposes it is reasonable to use δ for $H_2O$ in the range of $CO_2$ of about 2000, which even at a few tenths of 1% is a non-equilibrium MHD "showstopper".

There are two other serious concerns in implementing the use of water for propulsion and MHD power. One is due to non-uniform mixing of all the reagents, which would result in substantial quantities of non-uniform gas regions exiting the dissociating chamber and the beryllium combustor into the MHD channel. The other is extensive steam ($H_2O$), outflow would increase the molecular weight and lower the gas velocity and the thrust. To eliminate all three problems it is disclosed to use the technology on operating the slagging coal combustor and the post-combustion zone to achieve efficient combustion and $NO_x$ and $SO_2$ control, as disclosed in this Inventor's two U.S. Pat. Nos. 6,048,510 and 6,453,830, which were cited above, and by reference are incorporated herein in their entirety.

Said Patents used air-atomized liquid droplet injection, with and without minute reagents dispersed in said droplets. Calculations in said patents were disclosed that show that, depending on the droplet size, water droplets could penetrate about 20 ft or more deep into the post-combustion interior of even large 1000 MWe boiler furnaces. Also, by dispersing the solid microscopic Be droplets in the water droplets, effective mixing of all the solid, liquid and gas would be implemented throughout the dissociation chamber and the Be metal combustor. The advantage of this mode of operation is that it is readily scaled up over a large range, as proven in the Inventor's extensive multi-decade coal combustion development.

One added point is of interest. The above calculation is for how much Be and water would be needed to match the thrust of the NERVA rocket. To this would be added Be and water to provide additional energy to dissociate the water above that needed to heat the hydrogen for the rocket thrust. The added beryllium and water for the dissociation energy requires an energy balance for the entire mission, which is time consuming, but can be readily implemented by those knowledgeable in energy systems.

All the above methods must be used to assure that essentially all the $H_2O$ is removed prior to the hydrogen exits the second stage combustion chamber. To assure this some excess beryllium above that needed to remove all the $H_2O$ must be injected.

In summary, the above specifications teach how the addition of a metal fuel and an MHD generator and accelerator to a nuclear heated hydrogen propelled Mars rocket can match the NERVA nuclear rocket performance in a rocket one-tenth its size, and greatly exceed it to the point of enabling a direct radial Earth-Mars trip in 39 days versus the 6-month NERVA elliptical path.

The following is a brief digression to other methods of producing hydrogen in order to contrast the unique features disclosed herein from the other prior art.

The other prior art uses oxidation of aluminum in order to generate hydrogen for use in areas such as transportation by forming $Al_2O_3$ while generating hydrogen, as per the following reaction: $2Al+3H_2O>>Al_2O_3+3H_2$. The process is carried out at ambient conditions and therein lays a major problem. Aluminum forms a tough coating of aluminum oxide on any aluminum surface and it must be removed before the oxygen in the water can react with the aluminum to form the oxide and release the hydrogen gas.

A recent patent publication on this $H_2$ production process from Al and water is listed as Number: WO 2010/03478 A1. To recover the energy and presumably the cost, waste heat is used to operate a cogeneration steam plant. This patent only details the equipment to be used to implement the process and co-generate the electricity. As to details of the thermodynamics and economics of this process there is nothing. Possibly this information might be contained in the extensive associated literature which is cited in the Internet search by these authors. A simple calculation can shows that this process is totally uneconomical. Two ton-mols of Al at $2500/ton, would cost $135,000. They would generate 3 ton-mols of $H_2$ that produces 620 MMBtu of energy from the 6 tons, and using natural gas prices of $5/MMBtu as a benchmark, would yield only $3103 revenue. Even a $500/ton to recycle the Al would still cost $27,000. Presumably they have information on the economics of $H_2$ that was not cited.

Another Al to $H_2$ patent, U.S. Pat. No. 6,506,360, which in turns cited several dozen other patents, discloses using a catalyst such as sodium hydroxide in water. Here the quantity of aluminum used to generate the hydrogen is about 2 gm to yield about 3 liters STP. This would cost about 0.5 cents for Al at $2500/ton to yield 0.33 cents of $H_2$ energy valued at the natural gas price of $5/MMBtu.

Whatever, the numbers used the reason for this process is obscure. This inventor's U.S. Pat. No. 7,282,189 discloses producing $H_2$ from coal volatile matter at a profit from co-products. In the present application, for terrestrial, primarily ship propulsion, air is used which involves only compression power from free air oxidizer. As for using Be and water in space applications, as disclosed herein, the small rocket size, the low cost and high success probability in a short 39 day per leg Mars mission, compared to the almost infinite risk NERVA mission, makes the disclosed application a unique opportunity.

Trip Options to Mars Using this Invention:

One key question is why did the very extensive NASA sponsored studies of the 1960s assume that a manned trip to Mars would take six months, an assumption that continues to this day, as evidence in an op-ed article in the Wall Street Journal in May 2011, and a lengthy piece on going to Mars in a July 2011 PBS News hour segment. A probable reason can be deduced from FIG. 4 herein that is listed in the above cited NASA sponsored TRW-Mars Mission Report of 1965, namely all the NERVA trips were not to be direct, but a giant semi circle each way between the orbits of Earth and Mars including a swing-by Venus as one option. FIG. 4 shows one such very long trip option but it does not contain any reason in the NERVA Reports. Also, the mathematics of the rocket trajectories is not in the TRW reports. After considerable reflection by this Inventor, the reason had to be the low Specific Impulse of 825 seconds even with a nuclear reactor, which limits the thrust of the rocket ship, as was shown in the previous section.

In contrast, the present invention uses a nuclear reactor heating the liquid $H_2$, or liquid $H_2$ and $O_2$, or water/steam, all preferably at 100 atm.

1) In one case, $H_2$ is heated to 3000° K in the nuclear reactor, seeded with cesium and passing through a MHD generator followed by an MHD accelerator.

2) In a second case, the liquid $H_2$ and $O_2$ are heated to 3000° K in the nuclear reactor and enter a slagging metal combustion chamber where combustion with beryllium forms BeO droplets that heat the $H_2$ to 6000° K, and 90% to 95% of the BeO is removed in the combustor, and the $H_2$ exhaust is seeded with Cs and flows through an MHD generator-accelerator.

3) In the $3^{rd}$ case, water replaces the $O_2$ and some of the $H_2$, and the rest of liquid $H_2$ is heated in the nuclear reactor and metal fuel combustor to 6000° K and seeded with Cs and flows through the MHD generator and accelerator.

The $2^{nd}$ and $3^{rd}$ cases included thermal dissociation and chemical reaction of the water to form BeO and $H_2$.

Note that at 6000° K, the gas dynamic SI is 1,620 seconds, the thrust is 6,528,716 Newtons and $4.994\times10^9$ Newton-sec. This is only by gas expansion from the exhaust of MHD accelerator into the rocket exit. This higher SI is 2.4 times that of the NERVA's 2,500° K, SI of 824 seconds and 2,668,933 Newtons, $2.54\times10^9$ Newtons-sec. Even with 3,000° K nuclear heated $H_2$, SI is 1,076 sec., the thrust 4,333,005 Newtons, and $3.315\times10^9$ Newton-sec. The same ratio applies to the round trip, which would be double these numbers. However, due to the unclear information on the Mars approach, landing and return, it is not included because it does not impact the key aspects of this invention. Therefore, most of these numbers apply to the outbound Earth voyage with rocket firing of 765 seconds as per the NERVA Earth takeoff, or less, as is explained in each case below.

A case that duplicates a 219 day trip, as per NERVA, is not included although there is sufficient information disclosed herein for interested persons to perform such an analysis. However, there does not seem to be any point. There will be a multitude of opportunities to study longer missions beyond Mars with billion miles missions.

Instead the entire core element in this invention of the present Mars mission is to achieve a trip to Mars in about one month by using the high thrust from the combined nuclear heat and beryllium oxidation heat sources with MHD acceleration.

Also, as per item (1) MHD acceleration can achieve high thrust with liquid hydrogen in a 3000° K nuclear reactor alone, or preferably as per Item (2) and (3) considerable higher thrust with the addition of MHD acceleration to the 6000° K nuclear-beryllium system. The latter will enable much larger unmanned rocket ships to reach Mars and the asteroid belt, the moons of Jupiter and the larger planets, with unmanned and then manned missions in future decades, which is impossible with NERVA nuclear technology. Again note that the unique aspect is this invention's direct flight path from Earth orbit or from the Moon to Mars is the radial direction focused on the Sun, a distance that varies for 50 million to 100 million km, a distance that recurs about every two years. For calculation purposes herein a distance of 75 million km is used, as shown in FIG. 4. This contrasts with the 4 times longer 300 million km NERVA trip of over 219 days from Earth orbit to Mars orbit in a semi-ellipse whose length is an average of the two orbits. FIG. 4 also shows the distance Mars travels along its orbit during a one-month stopover.

The basis for comparison of the data to be cited to a typical NERVA case that consists of liquid $H_2$ weighing 1,181,000 lb. which is 61% of the rocket's 1,930,000 lb. for the entire Earth-Mars round trip. The NERVA $H_2$ flow rate and duration of each leg of the round trip Earth-Mars mission are given, as is the payload and reactor size and weight. The first stage consisted of 3 rockets that fire for 765 seconds consuming 693,000 lbs, or 59% of the $H_2$. However, the NERVA reports omitted detailed information on the rocket structure and components weight.

As a result another example was used from the TRW Report Volume III page 66-68 that contains a detailed breakdown of almost identical weight and mission. This vehicle (see FIG. 5 schematic) gross weight, presumably from Earth orbit was 2,023,056 lb. with a 10% payload consisting of a Mars lander module, solar shield, crew module and support, and Earth reentry vehicle, all totaling 206,056 lb. The rockets structures cover 6 stages in the round trip. As in all cases studied, the rocket structure included jettison of the empty stage rocket shells after Earth takeoff, after Mars approach, and after Mars takeoff. The Earth orbit takeoff systems consisted of 279,468 lb. for rocket structures, 152,847 lb. for nuclear reactors, plus the 206,749 lb. for the payload, for a total of 643,422 lb. (This is about the same weight percentages as the first example with a 749,000 lb. rocket shell and load weight.) The total $H_2$ is now 1,369,634 lb. with 743,735 lb. used for the Earth takeoff first stage. So both rocket ships are about the same, as were many of the cases analyzed.

Now to summarize this second NERVA case:

The rocket structure was 13.8% of the total rocket ship weight, the nuclear reactors for all stages was 7.6%, and their sum plus the payload was 32.3% of the entire rocket weight. This left 67.7% for the $H_2$ fuel.

In contrast, in the present cases in this invention has either the same payload of 206,749 lb. or preferably for Case 3, a payload of 132,326 lb., which has the estimated benefits from a 10 times smaller total rocket and a 39 day trip to Mars.

Case 1A, 3000° K, uses the same total structure weight of 743,735 lb. as the NERVA Case 1. However, the $H_2$ weight of 1,181,000 lbs. is to be replaced with $H_2$ computed from the MHD-generator-accelerator to achieve a 39 day trip each way with higher thrust.

Case 2A uses about one-half the Case 1 weight but only liquefied $H_2$ and $O_2$ plus Be metal powder.

Case 3A is the definitely preferred solution. Here the consumable volume is 6.89% of the volume in the NERVA rocket consumable volume. Therefore, it is assumed the rocket structures would be reduced by about the same percent to 29,383 lb. Since only one nuclear reactor will be used, its weight would be 19,000 lb. However, as explained in more detailed below on Case 3A, room was left for 3 more nuclear reactors, which increases their weight to 78,424 lb. Therefore, the total for the three structural items is 238,193 lb. As stated above, the consumables are 267,195 lb. This yields a total rocket weight of 505.388 lb. or 25% of the NERVA rocket. Due to the compact size of the MHD generator and accelerator, they are in the range of several cubic feet, and their weight is not included. Even the magnet, which one would expect to be heavy, can be greatly lightened by using high strength composite materials, as discussed earlier in the application. Also, some additional beryllium and water for heating water and hydrogen has not been included. The reason is that the invention teaches the features and the procedures, not what a particular rocket would looks like or weigh. Persons knowledgeable in rocket and MHD technology can implement decades long established detailed calculations.

It is reemphasized that this invention differs totally from the prior art NERVA rocket, which envisioned one or more nuclear reactors heating liquid hydrogen at up to about 5000° R (2,777° K), plus some auxiliary combustion of liquid hydrogen and other high energy liquid fuels with liquid oxygen for special tasks in the Mars mission. Furthermore, the rocket firing would total about one hour for the entire nominal one-year round trip. All studies used what should be called "slingshots". While this approach is not needed with MHD, it is used here to offer comparisons with the NERVA rockets.

For example, in NERVA Case 1: hydrogen of 693,000 lbf equal to 61% of the total 1,181,000 lb. was consumed in 765 seconds on Earth orbit takeoff, with the balance on arriving and return from Mars, by which time only the command module of 70,000 lbs. is left.

In NERVA Case 2, hydrogen of 743,735 lbf, equal to 67.7% of the 1,369,634 lbf total hydrogen was consumed in 765 seconds, which is basically the same as Case 1.

This type of mission was one of the 1960s massive pametric studies that were prepared for NASA on manned missions to Mars, all of which were based on the NERVA nuclear rocket with liquid hydrogen propellant. A typical mission reported at a Nuclear Propulsion Meeting at the AIAA $3^{rd}$ Propulsion Specialist Conference, (Washington D. C, Jul. 17-21, 1967) as well as selections from the massive 1965 NASA-TRW study were used herein for comparison purposes.

The showstopper problem with NERVA was the propulsion profile, as shown for one of the NERVA Mars lander mission in FIG. 4. A six-month trip is unrealistic as it requires a massive multi-million pound, multi-stage rocket that is over 400 feet high, as per FIG. 5, costs countless billions, and exposes the astronauts to a highly probably life threatening environment. Also, as noted, the NERVA profiles fire all the fuel at the beginning of each leg of the mission. Although some fuel was allocated for mid-course corrections, fixed nozzle exhaust rockets are inherently incapable of firing minimal amounts of fuel for variable thrust to avoid tiny rocks in space. The significance of this avoidance was demonstrated on Jun. 29, 2011 when the astronauts in the space shuttle had to temporarily leave the shuttle to avoid some space debris that might have hit the shuttle. There is insufficient power to move the shuttle in less than 14 hours. On the other hand, by using MHD acceleration one can fire thrust pulses for a few minutes for mid-course corrections.

The starting point in the mission analysis is noting that the time and distance depends on the Earth and Mars orbits. As stated above, about every two years, Earth and Mars are in opposition (nearest to each other) with distanced ranging from about 50 to 100 million km, and Martian retrograde motion lasting about 70 days. An average distance of 75 million km, ($7.5 \times 10^{10}$ meters) and a transit time of 39 days (3,369,600 seconds) are selected as a mean trip of about one-month each way. This would require a constant velocity, V, for each leg of 22,258 msec, or 49,729 mph. Note: The velocity term "V" is for the entire rocket velocity. The gas velocity is determined by the thrust gas dynamics, which depends on gas flow conditions, and differs from rocket velocity during rocket firing.

It is again emphasized that the present metal fuel augmented and MHD power system is totally different from the NERVA nuclear rocked mission. The thrust function, $\tau$, consists of two terms. One term is the pressure, p, on the nozzle walls as the gas exhausts the vehicle, which is given by $(pA+\rho AV^2)$, where A is the exhaust area and V is the gas velocity, not necessarily the rocket velocity. The second term is a due to the rate at which the vehicle loses mass, M, per unit time, t. Since in most rockets the fuel is almost the entire weight of the rocket, M is usually reported as the fuel weight. However, that is not the case on interplanetary rockets, such as NERVA where the gas at initial takeoff is only 61% of the rocket weight, and the present disclosed rocket where the metal oxide is retained on board, the $H_2$ ejected is only 20% of the rocket mass. It is not clear in the NERVA rocket literature whether the total rocket weight or the $H_2$ weight was used. However, in the present disclosed case, the entire rocket weight is used, and the ejected $H_2$ is not used to reduce the mass due to its low percentage. This weight loss, (M/t) as the gas exhausts from the vehicle at a velocity V, yields a thrust $\tau=(MV/t)$. In the NERVA rocket, or in most rockets, the latter term dominates because the propellant that is most of the vehicle mass is removed in a few seconds to minutes. In the present rockets the entire weight is used in computing the thrust, which underestimates the velocity.

The same ceiling applies to both cases of gas dynamic thrust, which is a function of pressure and temperature and the molecular weight of the gas and makes nuclear heated hydrogen the propellant of choice. However, the nuclear reactor has a nominal 3000° K materials ceiling and furthermore it must transfer its nuclear heat through a solid surface, which is also at this 3000° K ceiling. This is the crucial point noted by Sutton and Sherman's propulsion velocity limit equation 13.1 in their MHD book (loc. cit.). It is the reason for disclosing herein the beryllium oxidation reaction for use to transfer heat directly from beryllium oxide droplets to the hydrogen at double the nuclear reactor gas temperature. However, there is an apparent drawback of increased weight from the metal and oxygen. However, this is more than offset by the ten times greater density of water that supplies both the oxidizer and the propellant. These are the "gas dynamic" benefits. But a major additional benefit comes from the MHD accelerator, which sharply increases the thrust without adding much volume and weight for the MHD system.

There is another huge advantage of using MHD acceleration as disclosed herein because the J×B force depends on three terms: Electric conductivity—$\sigma$; the gas velocity, V, which is supersonic in the MHD accelerator, and the magnetic field, B. What was only apparent to this Inventor, and not mentioned anywhere, is that for rocket ships, where weight should be limited, the objective should be to maximize $\sigma$ and B as they do not directly depend on the gas flow. Now it would seem that high velocity would be desired because it increases the rocket thrust. However, the greater the thrust, the more gas is consumed, which increases the gas inventory in the rocket, and its weight. Thus, while hydrogen is desired, heating it uses energy and its low density requires larger rockets. This is one major reason why this invention discloses using water in the rocket. Therefore, the focus should be on electric conductivity increase instead of hydrogen inventory increase. However, gas expansion cools the gas. Therefore, the only solution to increase $\sigma$ is non-equilibrium ionization. It takes much less energy to heat electrons than heating ions or neutral gas molecules. Proof that this logic was not recognized is that for decades NASA has been investing billion in ion engines to accelerate ion to yield ultra high Specific Impulse, SI, engines, which have negligible thrust. This is a dead end course, which is acceptable for NASA's little rockets to research the outer planets. But it will never get the USA to lift huge loads to said destinations, and find employment to the highly educated U.S astronaut corp. Non-equilibrium MHD can solve this problem.

To think that "managers", "policy makers", "engineers" and "scientists" in the 1970 wantonly destroyed this MHD field, despite the decade long record of progress showing that it worked is proof to George Santayana's saying: "Those who do not remember the past are doomed to repeat it."

Non-Equilibrium Ionization.

Analyses of this rocket power system offer a multitude of new propulsion options. Therefore, the examples herein focus on how to practice these options by comparing the results to original NERVA rocket systems, which have serious deficiencies, the most important one being the 6 month voyage to Mars.

The primary objective of the analyses is to enable a 39 days voyage to Mars. To clearly show the advantages and disadvantages use is made of Newton's law of motion, F=M*a in the form F*t=M*V. This is selected because the rocket loses mass as the propellant is consumed, which makes it difficult to recognize the preferred means of propulsion. However, by using the momentum format one can immediately calculate how much force over time was used to achieve the incremental increase in momentum.

The first example uses the present Case 2A rocket dimensions of the Case 1 NERVA rocket and replacing the liquid hydrogen with liquid $H_2$, liquid $O_2$ and Be. In other words, this is a NERVA size, 400+ Feet high, rocket but with added liquid oxygen and beryllium powder to achieved higher thrust by doubling the nuclear temperature to 6000° K and adding MHD acceleration. Anticipating the conclusion, this is not an attractive option, but it is needed to support the preferred conclusion, of replacing the oxygen and part of the hydrogen source with water.

The selected Case 1, NERVA rocket's 749,000 lb. structural weight and dimensions are retained as a benchmark, as is the approximate total consumable weight of 1,180,000 lb. However, in place of only liquid $H_2$, this is divided into the three consumables. Unlike the method disclosed above where the first one-half of the thrust was supplied by MHD powered acceleration and the second-half was supplied by gas dynamic expansion from the MHD accelerator exhaust to the nozzle's exit nozzle, both thrusts will operate in parallel, which actually occurs because the gas dynamic thrust takes place from stagnation pressure expansion. Furthermore, once the MHD thrust is computed from the J×B force the gas dynamic thrust is automatically fixed because the same velocity term occurs in both equations.

BeO formation yields $H_2$ stagnation conditions: $T_o=6000°$ K at $P_o=100$ atm. B is 6 Tesla.

Two conditions were calculated: $H_2+1\%$ Cs and $H_2+0.1\%$ Cs.

The first one with 1000 Mhos/m, V=4,202 m/sec, Power=101,681 MW/m³, and J×B=30,251,133 Newton per m² of MHD channel cross-section.

The second one with 400 Mhos/m, V=5,236 m/sec, Power=63,136 MW/m³, J×B=15,080,561 Newton/m².

In both cases for $H_2$ with $\gamma=1.3$, A=1 m², the pressure at Mach=1 is 54.57 atm., and the thrust, $\tau=p*A(1+1.3*M^2)$ =54.57*14.7*144*10.76*(1+1.3*1)=2,861,767 lbf. As the nozzle exhaust to space at Mach 6, the function for isentropic thrust τ is multiplied by 1.468 (as per Keenan's and Kaye's Gas Tables) to yield 4,201,074 lbf=18,686,375 Newton, which when adding the J×B force of 30,251,153 Newton/m², yields 58,937,528 Newtons for Earth-orbit takeoff. This compares with 3,324,524 Newton on Earth orbit takeoff, which is 14.7 times more thrust than NERVA at takeoff.

For the σ=400 Mhos/m case, J×B=15,080,561 Newtons, and adding the gas dynamic thrust of 18,686,375 Newton, yields 33,758,472 Newtons, which is 11.2 times NERVA thrust.

These two results clearly show that conductivity is the dominant term, and the focus on improving thrust should be on conductivity.

These are top-level calculations show the magnitude of thrust attainable from MHD.

For example, these J×B forces are from the MHD generator, whose force vector is directed 180° opposite the gas direction. It is needed to assure that there is enough thrust left over in the accelerator to move the rocket forward. Also, almost all the MHD power is returned to the gas in the accelerator. However, since the thrust is also dependent on B and σ the energy in the accelerator. Therefore, the force in the acceleration can exceed the generator's drag on the gas. The MHD acceleration is discussed below.

But first a gas inventory is in order in order to determine the thrust impact on the rocket motion. Here the literature is confusing, if not outright misleading, especially in the case of the massive NERVA Reports, which omitted key steps in their huge number of analyses. One simple calculation explaining all the steps would have made it much easier to analyze.

The next step is to determine from FIG. 4 the NERVA path, which from the text appears to be about one half of the average of the orbits of Mars and the Earth. 219 days was selected as a typical duration for the trip. This yields an average velocity of 51,000 ft/sec from the Earth to Mars in the elliptical path is about one=half the average orbit, as shown in FIG. 4.

Due to the confusion as to what is included in the multi-stage NERVA rocket, the analysis used was the momentum version of Faraday's Law of Motion: F*t=M*V. This avoids the confusion on the role of the mass rate of exhaust of the hydrogen and its impact on the rocket mass. This equation gives the force-time that is needed during the takeoff to give the rocket momentum to reach Mars at a constant velocity with its net mass after the takeoff hydrogen was consumed and the first stage rockets were separated. The data on the NERVA Case 1 used here gave the $H_2$ exhaust per stage but not the weight removed from the rocket casing. After much trial and error calculations the rocket case weights were determined from NERVA Case 2 where the $H_2$ and the rocket cases in the $1^{st}$ stage were listed. They amounted to about 50% of the total rocket weight, and this was used in the Case 1 whose takeoff weight was 1,930,000 lb. This left 965,000 lbf that is 30,000 slugs for the rocket mass, M, after 693,000 lbf of $H_2$ as ejected and the rocket shells were dropped. The NERVA thrust was given as 240,000 lbf from each of the three $1^{st}$ stage rockets for 765 sec, which results in F*t equal to $5.51 \times 10^8$ lbf.

Now inserting the 30,000 slugs in the right hand side and the average rocket velocity after firing the hydrogen at takeoff results in a MV momentum number that is 3.56 times greater than the 3 rocket thrust, which makes no sense. So the incremental velocity was lowered to 25,400 ft/sec on the assumption that the rocket takeoff is from Earth orbit at a nominal typical space shuttle 17,500 miles/hr orbital velocity. This lowered the discrepancy to 1.38 greater than the momentum. So by further lowering the velocity to 18,500 ft/sec the equation balanced. Now one would think that if this top-level calculation is correct, the authors of the NERVA studies would have alerted future generations of readers that using the Earth orbit momentum is needed for takeoff to get to Mars. Furthermore it appears that even that is not enough thrust and centrifugal acceleration is also needed to get there. These are not minor details. But they show that if the present MHD acceleration is used, and based on the MHD testing of the 1960s and 1970s there is no reason to believe that it will not work in some fashion. Therefore, this Invention has the potential of changes to the whole technology of interplanetary travel. If proven, and there is no technical reason why it cannot be proven, it makes the decision of the 1970s by the open cycle MHD advocates, DOE, and GE to destroy closed cycle MHD even more deplorable.

The MHD Accelerator and Gas Dynamic Thrusts:

The importance of clarifying the above NERVA mission was the confirmation that the Earth orbital velocity was most probably used to assist the Mars rocket takeoff. This basically validates its use in the present direct radial mission. The magnitude of the Earth orbit velocity is not clearly disclosed in the NERVA studies to enable its separation from the centrifugal force is the helical flight path to Mars. In any case it is of little use here due to the direct radial path selected. However, the role of gravity from the sun and planets must be included for an accurate flight path. In fact it is possible that the entire non-gas dynamic thrust in NERVA may have been due to the centrifugal force of the planets and the sun. In either case, the NERVA calculation indicates that there was insufficient thrust for a direct radial mission.

Therefore, the next step would be to determine how much consumables are needed for the Earth-orbit takeoff rocket to reach Mars in 39 days at an average speed of 22,250 msec. (73,000 ft/sec), of which the Earth orbit velocity of 17,500 mph (25,667 ft/sec) reduces the required rocket thrust to 14,426 msec (47,333 ft/sec).

The next step is to determine the J×B force from the MHD accelerator which must exceed the upstream facing J×B in the MHD generator. This calculation was documented earlier in this application, and it is repeated here due to its importance to this calculation.

In contrast to the MHD generator, the MHD accelerator operates at low pressure and high velocity, which fortunately facilitates non-equilibrium ionization. For example, operating the accelerator around Mach 2.5 results in an isentropic static pressure of 5.6 atm from the 100 atm stagnation pressures. Now the increase in gas temperature from ohmic dissipation in the MHD generator is ignored, as it will increase the gas temperature in the accelerator, which increases the thrust, at the cost of some reduction in energy efficiency. As such it should not have a major impact the MHD acceleration process. The important item at this time is the non-equilibrium ionizations, that is derived from Equation (2) listed above, and used here:

At Mach 2.5 in the MHD accelerator and γ=1.3 yields T=2890° K (from $T_o$=5600° K), $P_s$=5.6 atm ($P_o$=100 atm), and U=(Mach No times the local the speed of sound) =2.5*3954=9886 m/sec. With 0.1% Cs in $H_2$ from Rosa's Tables, σ is about 40 Mhos/m, and with 1% Cs, σ is about 140 Mhos/m. Since the MHD power is proportional to the velocity squared, 1% Cs reduces the power by 40%, while σ increases power by 3.5, leaving a net doubling of the power. However, the high cost of 1% cesium seeded in $H_2$ will probably exceed the benefit of higher power. Potassium could probably be used, but it was no calculated here.

Another power factor consists of the Hall effect. At B=6 Tesla, 5.6 atm. β=1.2 for 1% Cs and it is 2.4 for 0.1% Cs. These values are low enough to limit the reduction in σ from plasma turbulence in $H_2$, which is not a major factor as in argon. To show the potential of the disclosed processes and methods it will be assumed that the electrode can be segmented enough to limit the axial Hall effect short circuiting in the accelerator. Again all these issues would be resolved with MHD channel tests.

An accelerator applied load factor of K=−1 is assumed, which requires an applied field, −UBK=−9866*6=−59,196 Volts/m. This voltage substantially exceeds that in the MHD generator. Although shown as the local induced Faraday voltage, that voltage is applied from the MHD generator and its magnitude must exceed the UBK induced voltage to direct the J×B vector in the downstream direction. To obtain this high voltage the anode voltage of one of the first electrode is connected to the next cathode downstream, and so on, to produce it. This method has been tested extensively. It is called a diagonal wall connected, linear Faraday generator. The key requirement is to limit axial Hall voltage shorting along the electrode wall. To implement this would require limiting the axial Hall electric field to prevent inter-electrode shorting along the accelerator wall. However, the Hall parameter in Cs seeded $H_2$ is very low and may not be a problem. For example, at 5 atm from gas temperatures ranging from 1000° K to 10,000° K and 6 Tesla, β is from 1 to 2 with 0.1% Cs, and less than 1 with 1% Cs.

The current, J, can be derived from the accelerator power input. J=P/UBK,

Power, P=σ*$U^2$*B*(−K)*(1+K)=−40*$9866^2$*$6^2$*2=280,000 MW/$m^3$.

This is an extremely high number.

The current J=P/V=σ*U*B*(1−K)=2.8×$10^{11}$/59,196=4.73×$10^6$ amp/$m^2$.

This yields a thrust J×B=2.84×$10^7$ Newtons/$m^2$, which is double the J×B thrust of 1.5×$10^7$ Newton/$m^2$ from the MHD generator with 0.1% Cs.

With 1% Cs, the J×B is more than double this number, at least 6×$10^7$ Newtons/$m^2$, which is double the J×B thrust of 3×$10^7$ Newtons/$m^2$ in the MHD generator, listed above.

There is one "little" detail overlooked at first in developing this section of the invention, namely the accelerator cross-section.

The MHD generator cross-section for computing the J×B was 0.911 $m^2$, which is very close to the 1 $m^2$ of the channel sonic throat at Mach 1, and it is used at the channel area in reporting the generator J×B thrust. However, the channel cross-section at Mach 2.5 is 1.96 times the channel sonic throat, or 2.1 times the generator area. Therefore, the J×B forces are roughly double, namely 6×$10^7$ Newtons and 12×$10^7$ Newtons, respectively, which leaves a net forward thrust of 4.5×$10^7$ Newtons, and 9×$10^7$ Newtons, respectively. Now the gas dynamic thrust of 1.9×$10^7$ Newtons should be the same, so the total thrust is now 6.4×$10^7$ Newtons and 1.09×$10^8$ Newtons, respectively. These are double the above numbers deduced from the MHD generator, which has a major impact in reducing the consumables required. Also, the force vector faces downstream, so the concern of gas dynamic boundary layer separation in supersonic MHD generators should not occur here.

The next step is to use Newton's momentum equation, F×t=M×V, to determine the firing time from Earth orbit takeoff.

As stated above, at the end of Stage 1 takeoff the 3 NERVA rockets were jettisoned. This left the NERVA Case 1 weight after the first stage firing cut in half to 1,930,000/2=965,000 lbf, (434,840 kg) and increased velocity from the $1^{st}$ stage firing by 47,333 ft/sec, (14,431 msec) which equals 1.42×$10^9$ slug-ft/sec or 6.4×$10^9$ kg-m/sec. Now dividing this by 6.4×$10^7$ Newtons (1.43×$10^7$ lbf) and 1.09×$10^8$ Newtons (2.45×$10^7$ lbf) results in 100 seconds and 58 seconds firing time during Earth Orbit takeoff, respectively.

But that is not the peak attainable MHD thrust. As the gas expands its temperature will drop sharply, and non-equilibrium ionization is necessary, which can be calculated from Equation 2:

$$T_e/T_o=[1+\gamma(1-K)^2M^2\beta_{eff}^2/3\delta]/[1+0.5*(\gamma-1)*M^2] \quad \text{(Equation 2)},$$

The stagnation temperature is 5600° K. It is assumed that $\beta_{eff}$ of the regular β of 2.4 from 0.1% Cs is used. The δ of 4 for $H_2$ in this temperature range is used. (Note these β numbers are higher that the equilibrium values listed above in the entrance region of the accelerator because the pressure is now considerably lower, as shown in Rosa's tables (loc. cit.)

The result of Equation (2) is $T_e$=2.52*$T_o$=14,163° K. This result yields σ=6000 Mhos/m. The thrust is 4.3×$10^9$ Newton per $m^2$, which is 100 times higher than in the MHD generator and in the range of 900 times that of the NERVA rocket. This reduces the FIRING TIME to ONE SECOND.

These calculations show the potential on MHD power and acceleration. Note that this inventor performed MHD generator tests in a 2 inch square cross-section shock tube in 100 millisecond pulses in the 1960s in Argon at gas temperatures in the 8000° K range that yielded high conductivities in the many 100 Mhos/meter range. However, at the time the quest for non-equilibrium ionization at 2000° K stagnation temperature that would simulate gas cooled nuclear reactor temperatures. Therefore, non-equilibrium MHD power at these high gas temperatures was of no interest. What is puzzling is with the major MHD effort in place at this time no on involved with the NERVA Mars Program considered temperatures beyond the 2700° K gas cooled nuclear NERVA reactor. Proof of this is that 50,000 cases were studied with NERVA temperatures. To implement this Mars invention, the first step should be MHD generator-accelerator tests in a shock tunnel.

Case 2A Consumables: $H_2$, $O_2$, Be: Nuclear to 3000° K, Be to 6000° K. 100 atm.

Now the next question is how much consumables are required. In the present case liquid $H_2$ as propellant and liquid $O_2$ with Be powder are the consumables.

The above firing time calculations underwent a number of time-consuming iterations. Rather that redo the entire set of calculations, which in any case would be gross estimates, the two time periods calculated initially are used, especially since they are an average between the extremes. The previous numbers were 13 seconds as the firing time for Earth orbit takeoff for $H_2$ with 1% Cs, and 31 second for $H_2$ with 0.1 Cs.

Now for these condition, the mass flow rate, namely the local gas conditions at the nozzle throat at Mach 1, yields 3,125 lb/sec for 0.1% Cs, and 5,688 lb/sec with 1% Cs. This results in a $H_2$ mass exhaust of 96,875 lb. and 73,944 lb., respectively. To this must be added $O_2$ and Be. Now the $H_2$ is heated from sub-zero liquid conditions to 3000° K by a cored or pebble bed nuclear reactor. The liquid oxygen is similarly heated. From 3000° K to 6000° K the $H_2$ is heated by the formation of BeO in a slagging swirling combustor where the BeO droplet impact the combustor wall and are removed and quenched for reprocessing at the home or destination of the rocket. To heat the $H_2$ from the BeO requires about 29,000 Btu/lb. of $H_2$, which works out to 2,422 MMBtu and 2,144 MMBtu, respectively. Now with the Heat of Formation of BeO is 29,000 Btu/lb. of Be, the amount of beryllium is 83,517. Adding the $H_2$ results in a sum for all three of 279,300 lb. and 328,900 lb. for the two-cesium concentrations.

This is 40% and 47% of the NERVA takeoff weight of 693,000 lb. of $H_2$ consumed during the Earth-orbit takeoff The comparison NERVA rocket used 1,181,000 lb. of $H_2$ for the round trip to Mars. So using this ratio, the entire trip would require only 41% of the original NERVA consumables for a total of 473,000 lbs. and 557,000 lbs, respectively. More important the volume required for the liquid $H_2$ and $O_2$, which has double the density of $H_2$, would require on a weight per volume basis only about 13% of the NERVA volume required for its $H_2$ case. This means that the present rocket volume would be substantially less than one-half of the NERVA rocker, which of course further reduced the total rocket size and fuel use.

Now the above calculations are for the trip to Mars, which accounts for about 50% of the rocket structure weight and fuel. Since the weight of the rocket structure and consumables are about one-quarter of the NERVA total, the Mars approach, landing, and return trip will at most be another quarter so that the round trip involves at most one-half a NERVA rocket. Since this is not the preferred method no further comments are made, except to note that these calculations indicate that a direct, radial trip is possible, something the NERVA could not apparently do, due to inadequate thrust.

In concluding this Section a caution must reiterated, namely, the numbers presented here are top level and optimistic. However, they do not present the best MHD has to offer. Next MHD will be applied to a 3000° K NERVA nuclear only rocket with hydrogen. This is followed by the very much-preferred solution, namely, nuclear plus beryllium and water for $H_2$ and $O_2$ plus additional liquid $H_2$ for a 39-day trip to Mars.

CASE 1A: The Mars 3000° K Nuclear MHD Propelled Rocket with Hydrogen

The next case is a direct comparison with the NERVA rocket at the same nominal $T_o$=3000° K and $P_o$=50 atm stagnation using only nuclear power. The same size rocket as NERVA is used. The power output at Mach No. 0.9 in the MHD generator with $T_s$=2675° K, p=31 atm, V=3477 msec. From Rosa's graphs, hydrogen with 0.1% Cs, yields σ of about 15 Mhos/m, K=0.8, VBK=16,690 V/m. power density at 6 Tesla is 1045 MW/m$^3$, current J=6.26 Amp/cm$^2$, J×B=375,674 Newton/m$^2$.

The gas dynamic thrust per 1 m$^2$ at Mach 1, τ=p*A*(1+γ*M2)=31*14.7*144*10.76(1+1.3)=1,623,984 lbf=7,223, 479 Newtons. As above, this must be multiplied 1.433 to obtain the thrust at the Mach 5 exit at the rocket nozzle, which yields 1.035×10$^7$ Newtons, which is 28 times the generator J×B force. So it would appear that there is no point in using MHD.

However, this is in the MHD generator, which is a drag of the thrust. As before, one must calculate the MHD accelerator thrust, which now depends on non-equilibrium MHD. For rough estimates isentropic expansion at the Mach 2.5 MHD accelerator entrance is assumed. This results in a static temperature $T_s$ of 1548° K and pressure $p_s$=3.45 atm. From Rosa's book this temperature and pressure at 6 Tesla, the value of β is about 3. Plasma turbulence will reduce that, and while analytical methods have been developed, the only reliable number has come from MHD experiments, and which would be used in practicing this invention. For the present calculations a value for $β_{eff}$ of 1.5 is used. The local velocity=M*a=2.5*2803=7008 msec, and V×B=7008*6=42,048 V/m, which as in Case 2A, is double the voltage of the MHD generator. Here again diagonal connection is required to exceed this voltage. Again assuming an applied K=−0.5 (meaning the applied voltage exceed the opposing induced Faraday voltage by 50%) and δ=4, results in an electron temperature from equation 2:

$$T_e/T_o=[1+γ(1-K)^2M^2β_{eff}^2/3δ]/[1+0.5*(γ-1)*M^2]$$ (Equation 2), $T_e$=2.3*3000=6,900° K, which from Rosa's charts for $H_2$+0.1% Cs yields σ=400 Mhos/m. This gives a current, J=σ*V*B*(1−K)/(1+$β_{eff}^2$)=400*7008*6*1.5/(1+1.5$^2$) =7.76*10$^6$ Amp/m$^2$=776 Amp/cm$^2$, which may be far beyond reported MHD current densities.

The J×B force in the accelerator J×B=7.76*10$^6$× 6=4.66*10$^7$ Newtons/m$^2$. However, the area at Mach 2.5 is 1.93 times 1 m$^2$ throat at Mach 1, which results in 9×10$^7$ Newtons. Adding the gas dynamic thrust of 1.035×10$^7$ Newtons, results in 1×10$^8$ Newtons, This non-equilibrium J×B thrust is 9 times the gas dynamic thrust, and 237 times equilibrium J×B thrust in the MHD generator. This has major implication on the implementation of the thrust in this invention because the MHD generator output is concentrated on heating the electrons and increasing the conductivity, which increases the current and the propulsion. This is a far more efficient means of achieving deep space travel than simply loading the rocket with propellant and exhausting it.

As before using Newtons equation F*t=M*V and inserting the same NERVA rocket characteristics are used, especially since the same rocket is analyzed with the addition of MHD generator-accelerator and more important a straight radial 39 day trip to Mars in place of a 6 months semi-elliptical trip.

Now the same right hand terms of 6.4×10$^9$ kg-m/sec is used and the 1×10$^8$ Newton from J×B and gas dynamic thrust obtained from the 400 Mho/m non-equilibrium $T_e$=6900° K, result in a $H_2$ firing time of 64 seconds. Inserting the sonic mass flow rate of $H_2$+0.1% Cs, yields a mass flow rate of 2086 lb/sec that yields 133,504 lb. for Earth orbit departure. Doubling that for the rest of the trip to 267,000 lbs. yields only 23% of the 1,181,000 lb. of $H_2$ in the NERVA rocket. This means that not only can it get to Mars in 39 days, instead of 6 months, but also the rocket would probably be half the size and weight of the 400 feet, 1,930,000 lb. NERVA rocket. This Inventor recalls the verbal attacks on his shock tube MHD results in the 1960s and 1970s. The 1$^{st}$ objection would be that the MHD accelerator couldn't operate at these high temperature and non-equilibrium electron conditions.

So the calculation was changed to use all the NERVA first stage $H_2$ of 693,000 lb. exhausting at 2086 lb/sec to compute that the time to drain the 1$^{st}$ stage would be 332 seconds. This was inserted into the Newton equation above to obtain a thrust of 1.928×10$^7$ Newton, which after subtracting the 1.035×107 Newton from the gas dynamic thrust left only 0.893×10$^7$ Newton for the MHD accelerator. Now removing the 1.93 extra area for expansion for Mach 1 to Mach 5, removing all the terms in the accelerator current listed above, leaves a σ 80 Mhos/m, which corresponds to an electron temperature of about 3000° K, which means there is no need for non-equilibrium ionization above the stagnation gas temperature.

This totally unexpected solution arose in the course of preparing this part of the invention and it was triggered by the past experience that "experts" would dismiss the high temperature solution. Clearly no one anticipated this as evidenced by the fact that nowhere in the 50,000 cases in the NASA-TRW study of the 1960s is a direct one-month Mars mission listed.

It is again reiterated that all these numbers are meant to show the power of MHD. The real test will be to run prototype tests that can approach even a fraction of these conditions. From extensive personal experience this Inventor has repeatedly heard false procrastinations that the phenomena would not work, especially in MHD field. What "did not work" were test facilities and test implementation procedures that were designed on flawed preconceived assumptions and theories. The non-equilibrium R&D effort of the 1960 and 1970 is a classic example of this. Therefore, these present disclosures are meant as a target that must be approached in order to have a near term chance of reaching Mars.

Comment on Calculating for MHD and Gas Dynamic Thrust:

Before presenting Case 3A concerning acceleration with a metal fuel and water an aside comment is introduced here because it concerns the method used prior to presenting the version used in the two cases above, Case 1A: 3000° K nuclear with hydrogen, and Case 2A: 3000° K nuclear plus 6000° K with $H_2$, $O_2$, and $H_2$. The previous method is of interest due to the confusion in the literature in definition of units and methods.

The initial procedure taken was to duplicate the typical thrust of a NERVA mission, by scaling back this high J×B forces listed above to 2,682,573 Newtons for the J×B force and adding the gas dynamic thrust of 2,668,933 Newtons thrust from expansion of the $H_2$ from the MHD accelerator exit to the gas exhaust nozzle into space. This sum yields a total of 5,351,506 Newtons, which equals the total thrust from the selected NERVA mission, Case 1.

However, it was recognized that these values greatly underestimate the actual J×B thrust that can be applied to the MHD system. In the first place, the J & B force in the generator was used as a measure of the MHD force despite the fact that it directed upstream and drags the gas. The assumption was that the J&B force was unlikely to be much greater. However, this overlooked that the volume in the accelerator was greater than in the generator. More important, the non-equilibrium ionization in the MHD accelerator is enhanced by the lower gas pressure.

There is one other issue concerning rocket acceleration that needs clarification. In equation (4), the thrust term, τ, defines the force that drives a projectile. It consists of two parts. One is the thrust from the ejection of the gas mass out of the projectile, which equals M*V/t, where M is the ejected gas mass. However, the total rocket mass includes the rocket shell and equipment and payload, which apparently was either not considered because the shell is generally a small fraction of the rocket mass, or it was not clarified. However, that is not the case of a Mars rocket with its large payload and multiple stages. Another measure of thrust is the Wall Force Function, $F_w=pA(1+\gamma M^2)$ [Also stated as: $(pA+\rho AV^2)$], where p, A, V, and M are the local pressure, nozzle area, velocity, and Mach Number for the gas specific heat, $\gamma=1.3$ for $H_2$. Now for space travel it is essential to maximize the exit area ratio over the sonic throat area in order the exhaust to near zero pressure on the nozzle walls. Any pressure left after the gas exit is lost. As stated above at Mach, 6 the nozzle exit area is 120 times the sonic Mach 1 throat area. In that case, the exit pressure is the stagnation pressure divided by 3115, so at 100 atm. (1470 psi) stagnation results at the exit 0.47 psia. The result is that $F_w$ at the Mach No. 6 exit is 1.468 times its value at Mach 1. This is another issue that is apparently not discussed in the NERVA 1960s reports.

There is one other point. The previous method used had one-half the thrust from the MHD accelerator and the other half from gas dynamic thrust on the rocket exit nozzle. However, after considerable reflection it was concluded that the entire gas dynamic thrust should be applied to the gas dynamic thrust, and the MHD accelerator thrust should be added to the gas dynamic thrust because the latter occurs throughout expansion from stagnation to exit. Also, the drag caused by converting the thermal energy of the gas to MHD power must be subtracted from the total thrust, which is done. However, the energy dissipated internally by producing MHD power remains to heat up the gas and increase the thrust because the energy extracted in the MHD generator is returned to the accelerator minus some irreversible low temperature heat losses, for which a loss of 20% is assumed. This loss was generally validated in small MHD accelerator tests where about 30% losses were measured. So until proven by tests, these losses were neglected in the first order analyses presented here.

One more point must be raised. It may be possible to reverse the magnetic field vector, B, by 180° in the accelerator. In that case, the J×B from the Faraday induced voltage would augment the applied voltage and also accelerate the gas. But as noted due to the complexity of the electromagnetic force, such as the role of striations, and also the mechanics of arranging the reverse current direction, this option is best left to experiment, something that could be readily implemented in a shock tunnel such as the one used by the GE MHD Group in the 1970s. The shock tunnel, MHD generator, and MHD pulsed magnet was powered by a mega joule capacitor bank. The fate of this equipment is not known, except to note that it was constructed with US Office of Navy Research funds.

Case 3A: MHD/Gas Dynamic Propulsion with Nuclear and Beryllium and Water.

Case 3A is the most novel and unique aspect of this invention, i.e., a rocket ship that could carry a dozen astronauts in one month to Mars propelled by the pebble bed nuclear reactor, the metal fuel beryllium that reacts with the oxygen in water that releases and heats all its hydrogen plus liquid hydrogen to double the peak gas temperature from the 3000° K nuclear heat to 6000° K. The water enables the reduction of the volume of the rocket ship to as little as 7% of a nuclear NERVA case. This result is in sharp contrast to the two Cases discussed above. The total weight of the rocket from Earth-orbit takeoff is not the original 2 million lbs. NERVA rocket, nor the Case 1A and Case 2A 1 million lb. In Case 3A the calculated weight is about 500,000 lb. (227,000 kg), which is 25% of original NERVA takeoff weight. About one-third of that weight is for the consumables. The volume of this rocket is 10% of the equivalent NERVA rocket to Mars. Here again the mission profile is totally different from all the 50,000+ cases studied for the NERVA Mars missions. Also, as in the previous two cases, instead of a 300 million km, semi-elliptical path, the path is radial with an average length of 75 million km, (~47 million miles), ±25 million km, to be covered in nominally only 39 days. This requires an average velocity of 80,130 km/hr (49,790 mph). As in the previous two cases, the spaceship will be launched from Earth orbit with the orbit velocity of 17,500 mph in the direction of Mars as the initial thrust. This reduces the required added thrust velocity for the 39 days Mars transit from 49,790 mph to 32,790 mph, or from 73,020 ft/sec to 47,333 ft/sec.

The major change from Case 2A is the use of water plus some liquid $H_2$, instead of all liquid $H_2$ and liquid $O_2$. This drastically reduces the size of the rocket to a little as 7% of a regular NERVA Rocket Case 1.

As discussed at length above, the use of water is enabled by invoking the LeChatelier's principle that uses non-equilibrium to dissociate the water to $O_2$ and $H_2$, which is not possible under equilibrium conditions.

In addition, it sharply reduces the Mars payload from 206,749 lb. for NERVA Case 2 to an estimated 132,326 lb. which consists of 78,500 lb. for the Mars lander, the same as the NERVA Case 2. The solar radiation protection shield is reduced to 5000 lb. from 22,939 lb. because the trip time is only 90 days with 30 days on Mars, from 455 days. Therefore, the crew compartment could be cut in half to 30,000 from 68,734 lb. Also, the specified Life Support of 50 lbs/day is reduced to 100 days and 5000 lbs, from 455 days at 22,750 lb. The sum reduces the payload by one-third.

The following Mars rocket specifications were discussed above, and they are repeated as an introduction to the consumable calculations.

As stated above, the NERVA Case 1 was selected as one of the two typical comparison cases to the three cases disclosed herein. NERVA's consumable, $H_2$, was 61% of the total 1,930,000 lb. multi-stage rocket weight, and its first stage takeoff is 36% of the total. In the much more detailed NERVA Case 2, the numbers were 68% and 37% of the total 2,023,575 lb. total. These massive consumables were from a high temperature, 3000° K, nuclear reactor heat source. Higher temperatures are not possible with solid nuclear reactors with graphite cores, which provide the highest temperatures, because the hydrogen attacks the graphite core. As a result, their Specific Impulse is limited to 825 seconds, while a higher temperature available with BeO as disclosed in this Invention, would double SI to 1620 seconds. But that alone is not adequate due to the low density of liquid $H_2$ and liquid $O_2$, which require massive rocket structures (see FIG. 5). As stated above, the above high percentages show that these Mars rockets are titanic liquid and gas bottles. It is would seem impractical to lug a small 100 ton payload in a 400 feet high, million pound behemoth for 6 months to Mars. It is extremely unlikely that manned missions to Mars will be implemented this way.

However, Case 1A with MHD power can shorten the trip time to about one month, and depending of the maximum non-equilibrium MHD acceleration achievable, a nuclear rocket heating hydrogen is quite possible.

Case 2A with added metal heat to 6000° K with BeO will substantially reduce the rocket size by about one-half, but that is still huge.

The answer in Case 3A is to use water, which not only massively reduces the consumable volume but also enables much greater power output per unit volume.

The first calculation was based on a model as discussed above and then dismissed in which a scaled down MHD J×B thrust, $\tau$, to 2,682,573 Newtons (603,094 lbf) plus the gas dynamic thrust of 2,668,933 Newtons (600,028 lbf) of $H_2$ expansion from the exit of the MHD accelerator into space was calculated to yield the same $\tau=5,351,506$ Newtons (1,203,125 lbf), total thrust as the original NERVA 1960s analysis. As noted, this was dismissed because it failed to account for the gas dynamic thrust over the entire firing time from stagnation conditions. Also, there was no reason for not taking advantage of the high power MHD propulsion. Also, too much $H_2$ gas was consumed. Finally, after considerable analysis of the NERVA 6 month elliptical flight path, it became clear that the NERVA rocket was underpowered for a short direct radial path to Mars.

However, since the structural weights for all 6 steps in the Mars round trip mission are specified in Case 2, they have been used in the present Case 3A. The structures have been reduced by 90% to account for the 10 times greater liquid densities. The result is a 29,383 lb. structure instead of 293,826 lb. The nuclear reactor system weight was reduced by 50% because they are much smaller as they process far less $H_2$ gas, which leaves 76,424 lb. for the reactor system, instead of 152,847 lb. However, this weight is very conservative since a single reactor should be adequate because the plan does not include any jettison of stages. Finally, as detailed above, the payload for the entire trip, namely the crew compartment, the Mars lander, life support, reentry capsule, and radiation shield, is 132,626 lb. instead of 206,749 lbs. This results in a total structure of 238,193 lb. (108,112 kg) instead of 653,422 lb.

The message from these calculations is that the entire history of rocket propulsion can be summarized as use of "carbonated soda bottles". Just because the entire energy content of the rocket, be it nuclear power, which of course is forbidden on Earth, or chemical rocket power, the entire propulsion system must be designed to hold the propellants for their final use state. The problem with this method is that the lightest propellant, $H_2$, has a very low specific volume and it must use the oxygen as a liquid, which also has a low specific volume. Now nuclear is a major improvement, if not for the risk of breakup in the Earth's atmosphere. However, in outer space nuclear still suffers from a deficiency, a 3000° K peak temperature. This is the reason for proposing metal fuels to double the temperature and impulse, and further, to use water to increase the oxidizer and propellant density by over 10 times, which despite the greater weight than nuclear, but not chemical, still is very advantageous due to the massive reduction in rocket size. Now since more hydrogen is needed for propulsion than is contained in water, this somewhat reduces the attractiveness of water. However, it may be possible to offset this by completely replacing the nuclear reactor with beryllium and water. Also, only one ratio is discussed, but there is no reason why other ratios may not yield better results.

There is one much more important aspect of this invention, namely, the huge benefit of non-equilibrium ionization. This enable the transfer of high temperature high power density MHD power generation directly to the downstream, very low pressure and low temperature hydrogen or other gases to heat the electrons to yield very high conductivity which directly sharply increases the propulsive thrust of the rocket by the J×B force while minimizing the dissipation of ohmic loses and overcoming the limitations of gas dynamic thrust.

The ion engine propulsion advocates must realize this but they did not solve the limitation of tiny thrust due to the minuscule concentration of ions. The MHD solution disclosed herein does not suffer from this major deficiency because the electrons drag the ions that in turn drag the inert atoms and molecules, Furthermore, the direct transfer of thermal energy from micron size liquid metal oxide droplets to the propellant, $H_2$, assures thermally and kinetically efficient energy transfer to the specific impulses and thrust.

As above, in these calculations it was assumed that firing was only at the start of each leg, with minor mid-course corrections, as was done for the NERVA rocket. However, in practice the firing may be segmental for multi-midcourse corrections.

As in the other two cases, the modified Newton Law of Motion was used to calculate the firing time, namely: $\tau * t = M * V$.

Since in this case no major jettison was considered, the total weight for the structure for the entire round trip of 108,112 kg plus the $1^{st}$ stage consumables for Earth orbit takeoff was about 25% of the NERVA rocket, namely, M=229,419 kg, of which 121,307 kg is consumable with Be=21,994 kg, Water=43,982 kg (consisting of $H_2$=4,887 kg, $O_2$=39,099) and liquid $H_2$=32,792 Kg. (The Be+$O_2$ weight was proportioned from the energy needed to heat the $H_2$ in the Case 2A.) To increase the rocket velocity, V, to 22,258 msec to reach Mars in a radial course in 39 days, requires adding 14,658 msec to the rocket velocity in Earth orbit at the start.

In the current calculation the same J×B thrust as for Case 2A at 6000° K is used because there is no reason to change the plasma properties.

So the term M*V=229,307×14,658=3.361×10$^9$ kg-m/sec. namely the total rocket mass times gives the incremental rocket velocity to Mars. Now this is only double the M*V for Case 2A because it was already one-half of the NERVA Case 1. So dividing by the same J×B used for Case 2A with 0.1% Cs and 1% Cs, namely, 6.4×10$^7$ and 1.09×10$^8$ Newtons, respectively, one obtains firing times of 53 seconds and 33 seconds, which is about one-half of Case 2A with liquid $H_2$ and $O_2$. Only now one must supply energy to dissociate the water. Using the two Cs seeded $H_2$ flow rate from Case 2A of 3,125 lb/sec for 0.1% Cs, and 5,688 lb/sec for 1% Cs, one obtains 165,625 lb. and 187,704 lb. of $H_2$.

However, as explained for Case 2A, non-equilibrium ionization can increase the electron temperature in theory to 14,163° K, resulting in σ of 6,000 Mhos/m and a thrust to bring that rocket to the required speed in only one second. Therefore, a compromise of firing time of 13 seconds for 1% Cs, and 31 seconds for 0.1% Cs as in Case 2A could be used.

However, a more realistic option is to take advantage of the high temperature attainable by the metal fuel that would be combined with non-equilibrium ionization to freeze the electron temperature at the stagnation temperature of 5600° K to 6000° K, where with 0.1% Cs, σ=400 Mhos/m and with 1% Cs it is 1,000 Mhos/m. The first value of σ increases the net J×B by a factor of 10 from 4.5×10$^7$ to 4.5×10$^8$ Newtons, and adding the gas dynamic term of 1.9×10$^7$, yields 4.69×10$^8$ Newtons. For the 1000 Mhos/m case, the final thrust is 6.62×10$^8$ Newtons. This reduces the firing time for the 0.1% Cs case to 7 seconds, and for the 1% Cs case to 5 second. This results in $H_2$ gas flow for the 0.1% Cs case of 3128 lb/sec×7 sec=21,896 lb. and for 1% Cs of 5688 lb/sec×5 sec=28,440 lb. Due to the high price of cesium, 1% is not worth it.

Before proceeding, several points are made on the methodology.

1) As stated above, this calculation does not use the total NERVA thrust of 5.35 million Newtons, about one half from the J×B in the MHD accelerator and the other half from the MHD accelerator exit to Space of 2,668.923 Newton. Instead the entire gas dynamic thrust from stagnation is counted as in the previous two cases.

2) Using the entire gas dynamic thrust from the stagnation pressure instead of counting only from the MHD accelerator exit is not counting twice because the thrust exists with or without MHD acceleration over the entire channel length.

3) A serious question is whether scaling by thrust, which was used in the previous method, is the proper method of arriving at the correct energy balance of consumables. It would seem to be correct because the J×B force depends on the magnitude of J and B and should be scalable. However, an energy balance must be done to assure energy is not being created.

4) Another issue in the present mode of operation is where only the hydrogen is ejected while the BeO is retained for future recycling, the total hydrogen in one example is 83,391 lb. (37,860 kg) which is only 16% of the total Earth orbit takeoff compared to 61% of the total weight in the NERVA takeoff. Therefore, not counting the loss of thrust from the ejected hydrogen means that the thrust is only slightly underestimated compared to a NERVA rocket.

Therefore, after very considerable reflection on his matter it was concluded to use the momentum version of Newton's Law of Motion.

The Energy Balance for Case 3A, Nuclear, Beryllium, Water, and Hydrogen.

The $H_2$ from Earth to Mars of 21,896 lb. is doubled to 43,792 lbs. for the entire trip. The nuclear reactor heats the hydrogen to 3000° K. From there to 6000° K, BeO droplets heat it. This requires about 29,000 Btu per lb. of $H_2$ for a total 1,270 MMBtu. This is supplied by BeO whose heat formation of 29,000 Btu per lb. of Be requires 43,800 lb. of Be. The oxygen to react with the Be is supplied by water pressurized to 100 atm, and dissociated by the non-equilibrium LeChatelier's principle by heating in the nuclear reactor to 3000° K and transferred to a pre-Beryllium combustion chamber with added Be injected into the pre-combustion chamber where Be is also injected to dissociate the water and heat the $H_2$ released is this chamber from the $H_2O$ and further heat this $H_2$ to 6000° K with procedures discussed earlier in this document. Please note that FIG. 1 shows the liquid hydrogen, as opposed to the $H_2$ from the water, is injected into both the $1^{St}$ and the $2^{nd}$ combustion chamber only where it enters at 3000° K from the nuclear reactor. This additional $H_2$ is needed because the $H_2$ from the water is inadequate to provide the needed thrust for power the rocket. The $H_2$ passing through the $1^{st}$ chamber pick up some Be heat. The incremental energy required for the $H_2O$ above 3000° K is the heat of formation at 6000° K (−6,944 Btu/lb. of $H_2O$ gas) minus the enthalpy of $H_2O$ heated in the nuclear reactor (+3800 Btu/lb), which leaves a net heat input from Be of 3,144 Btu/lb. Now 43,800 lb. of Be require 78,867 lb. of oxygen, which in turn requires 87,600 lb. of $H_2O$, which in turn requires 275 MMBtu heat into the water. Now to provide this heat over and above the nuclear heat requires 275×10$^6$/29,000=9,797 lb. of Be, an increase of 9797/43,800=22.4%. This in turn requires 19,662 lb. of water for a total of 107,222 lb=48,678 kg. Of this amount, 11,914 lb. is $H_2$, so the net $H_2$ that must be added to obtain the desired rocket thrust for the round trip, each of which is 39 days for the Mars round-trip, equal to 43,792−11914=31,878 lb. This of course reduces the required oxygen and beryllium, and to find the correct answer iterations are required.

Figure 2:
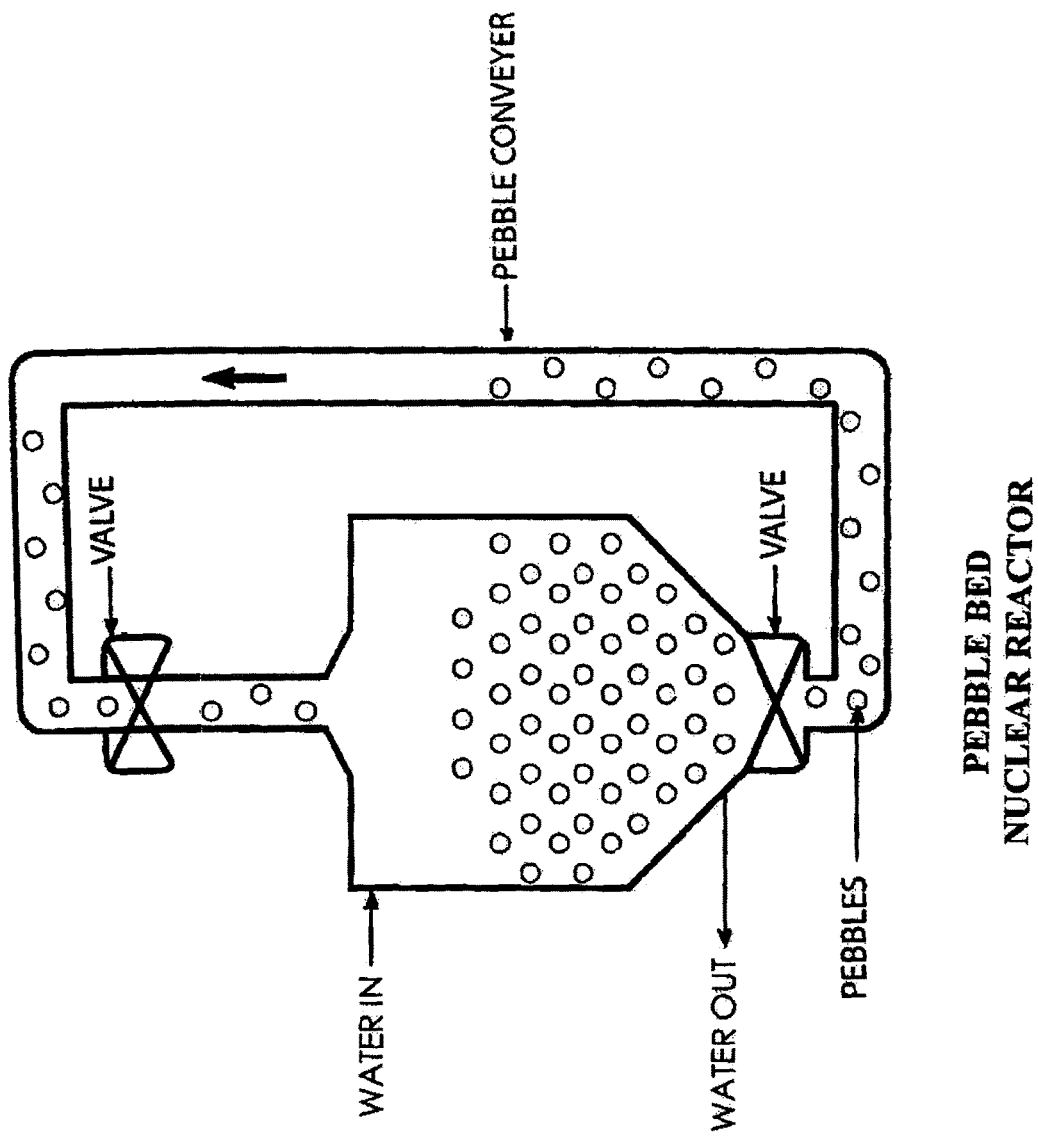
FIG. 2 is a schematic drawing of a space based pebble bed nuclear reactor in a rocket into which water and on-board liquid hydrogen are injected to be heated up to 3000° K and partially dissociated into $H_2$ and $O_2$ before said water and gas flows into the pre-combustor in FIG. 1.

Also please note a point in FIG. 2 that can be easily overlooked, namely, the water dissociation chamber does not show a semicircle arrow that denoted gas swirl, while the two combustor chambers show counter swirl. The reason for this is that there is not enough oxygen in the water chamber to react with all the Be because the $O_2$ is removed as fast as possible in order to satisfy LeChatelier's principle to keep water dissociation going. If this chamber had swirl, the Be particles would impact the slag layer and be lost. A $2^{nd}$ Be injector into the 1$^{st}$ combustor may be necessary. All variations cannot be listed and they will become apparent in testing.

The point of this disclosure is to teach how a Mars and further interplanetary voyages can be undertaken. It is not intended or needed to go into details, as anyone with the requisite engineering experience can implement accurate calculation.

The primary advantage of this invention is to teach the enormous power and propulsion available for interplanetary travel by using MHD generation and acceleration, and combining this with a "topping" propulsion system above a NERVA type gas cooled nuclear reactor. This will enable manned size rocket travel to Mars in 39 day, or faster, compared to the current art of 6 months or longer. The two radically new features are the use of a metal fuel combined with water and part hydrogen to reduce the rocket ship size by a factor of ten.

The MHD generator-accelerator is also revolutionary in that the generator output can be almost totally directed to produce non-equilibrium electric conductivity in the MHD accelerator, which yields extremely high acceleration in compact rockets, as opposed to the current state of the art gas dynamic thrust that requires massive propellant and rocket volume.

Another important benefit of using metal fuel is that the gas dynamic thrust from equation (4) is doubled to SI=1,620 seconds, which is double the 825 seconds of a NERVA nuclear rocket. The J×B force increases that number substantially.

Another huge benefit of this rocket technology is that the technology risk and the cost is much lower than a NERVA type nuclear rocket because among other reasons, the entire technology and process can be implemented on Earth without a nuclear reactor in ships, and on the ground. This would be followed by unmanned space missions, and followed by manned missions. All this effort could start immediately, and each application can lead directly into the next one to culminate and manned missions to Mars.

Another novel concept that is disclosed now is to apply the metal fuel for launching rocket ships from Earth. In this case, the oxidizer and jet thrust would be air and the fuel aluminum or magnesium. Since metal would be the only consumable in the rocket, its greater density than liquid oxygen and liquid hydrogen would require a much smaller rocket ship frame due to the smaller volume of the metal and the metal oxide. The metal oxide would be recovered by having this first stage be a hypersonic aircraft. Its smaller volume would result in much lesser drag than in a liquid fired rocket.

One final important point needs to be made. This invention discloses a number of very novel concepts for high-speed interplanetary space transportation. In support of the claims listed herein quite a number of mathematical examples were given. The examples given used the fundamental chemical and physical relationships, such as the laws of conservation of mass, energy, momentum, and chemical reactions.

What this invention sought to avoid is a repeat of the massive "cast of thousand" ERDA/DOE "Energy Conversion Alternative Study" of the 1970s, which was used to destroy energy technologies that were in the advanced research phase with very promising test results, primarily closed cycle, non-equilibrium MHD lest its continued success would prevent the commitment of massive billions to open cycle MHD that was massive in cost but poor in performance. The other example was the NASA-Manned Mars studies, all of which were limited to the hydrogen nuclear reactor, which despite 50,000 cases came up with the same conclusion, a nominal 6 months to one-year trip with negligible, if any, change for success. Both these exercises had one common element, extremely high cost, irrespective of the chance for profitable success.

The most incredible result of this invention is that non-equilibrium MHD offers a realistic chance for success in all the disclosed application herein, and in a plan for stepwise implementation at modest cost.

FIG. 1 ELEMENTS (1) Water from nuclear reactor
(2) Beryllium
(3) Beryllium oxide slag
(4) Hydrogen
(5) Cesium
(6) Water slag quench
(7) Oxygen
(A) 1$^{st}$ combustor stage
(B) 2$^{nd}$ combustor stage
(C) MHD generator
(D) MHD accelerator
(E) Exit nozzle
(F) Water dissociation chamber The present invention has been described with respect to specific embodiments. It may be embodied in other specific forms without departing from its spirit or essential attributes. Accordingly, reference should be made to the appended claims, rather than the foregoing specifications and accompanying drawings for an indication of the scope of the invention.

I claim:

1. A method of earth orbit to a planetary landing, round trip mission with astronauts taking off in about 500,000 pound weight rocket ship that travels a direct about 75 million kilometer path in about 39 days, comprising:
    thrusting a rocket from hydrogen produced via dissociated on-board pressurized water first heated in a 3000° K pebble bed nuclear reactor;
    partially dissociating the water by the heat of nuclear reaction, wherein the partially dissociated water after heating by the 3000° K pebble bed nuclear reactor flows into a pre-combustion chamber for completely dissociating the water;
    reacting the oxygen from the complete dissociation of the water with beryllium powder thereby forming beryllium oxide liquid droplets that are directed into a slagging combustor;
    injecting supplemental hydrogen into combustion stages of the slagging combustor;
    heating dissociated hydrogen from the water to 6000° K;
    expanding the combined supplemental and dissociated hydrogen to a gas in a gas dynamic nozzle that is seeded with an alkali metal from 0.1% to 1% to render the gas electrically conducting;
    flowing the electrically conducting combined hydrogen gas through an MHD generator-accelerator that comprises a linear Faraday magnetohydrodynamic (MHD) generator channel that is co-axially attached to a MHD linear accelerator that is co-axially attached to an expanding co-axial channel; and
    exhausting the gas into Space from the expanding co-axial channel.

2. The method in accordance with claim 1, wherein the mission is implemented initially in a pebble bed, nuclear reactor at about 100 atmosphere pressure that heats the on-board pressurized water to about 3000° K, wherein formation of the steam and the dissociation into H2 and O2 takes place, and where the pebbles comprise a multitude of ceramic, nominal 2 inch diameter spheres in which are embedded a multitude of chips of U238, U235, or U233, and thorium that emit nuclear reaction heat for the on-board pressurized water and the gas, and where the pebble bed, nuclear reactor contains a pebble conveyor that periodically at a beginning or end of a mission removes pebbles from a bottom of a reactor bed for inspection and re-injection of new pebbles through openings at a top, and with the ceramics selected from ZrO2, MgO, ZrB2 that are solid to around 3000° K in order to operate at metal oxide vapor pressure below 100 parts per million to limit their vapor carryover into downstream components, and inhibit non-equilibrium ionization in the MHD generator-accelerator.

3. The method in accordance with claim 2, wherein the pebbles are periodically removed from a bottom of a reactor core and reprocessed to remove spent radioactive materials and replaced with new pebbles comprising uranium and thorium that are reinserted at a top of the reactor core, and spent non-renewable pebbles are delivered to off site dry waste storage.

4. The method in accordance with claim 2, wherein the dissociated water with dissociated oxygen and the dissociated hydrogen flow into the pre-combustion chamber where remaining water and the steam is dissociated into H2 and O2 and reacts with the beryllium powder to form liquid BeO droplets that continuously exhaust into a first stage of a two stage cyclone combustor of the slagging combustor; and wherein entrained un-reacted beryllium powder mixes with the supplemental injected hydrogen to heat all the hydrogen to approximately 6000° K by further beryllium-oxygen reaction, the BeO liquid droplets collect in the pre-combustion chamber and a first stage combustor chamber wall from which they are drained and quenched into slag in a water filled tank, and are stored for future use.

5. The method in accordance with claim 4, wherein the dissociated hydrogen flows axially into a second stage combustor chamber of the two stage cyclone combustor and mixes with the additional injected supplemental hydrogen, and the combined supplemental and dissociated hydrogen exits the two stage cyclone combustor and enters the gas dynamic nozzle wherein the alkali metal that consists of cesium in concentrations from 0.1% to 1%, is injected and whose exit is connected to the linear Faraday Magnetohydrodynamic (MHD) generator channel operating at a nominal Mach number of 0.9, that is placed inside a 6 Tesla, saddle coil magnet, wherein the linear Faraday MHD generator channel of the MHD generator-accelerator operates under equilibrium conductivity with the cesium seeded combined hydrogen gas, and whose electrode power output wires of the MHD generator channel are connected, in a diagonal mode, to anodes and cathodes of a coaxial supersonic, non-equilibrium conductivity MHD linear accelerator that operates at Mach numbers between 1.5 and to 2.5, thereby providing Faraday orthogonal electromagnetic thrust that augments inherent gas dynamic thrust from a stagnation pressure at an entrance to an entire nozzle geometry of the expanding co-axial channel that is from twice to several hundred times greater than an inherent gas dynamic thrust from the channel's stagnation pressure to Mach No. 5 to 6 at an expansion channel of the expanding co-axial channel whose inlet is connected coaxially to the MHD accelerator, and expand the hydrogen to exit into outer Space.

6. The method in accordance with claim 5, wherein one of:
if the magnetic field vector in the MHD accelerator is in a same direction as a MHD generator vector, thereby inducing a Faraday voltage U×B in an opposite direction as an applied voltage from the MHD generator, then an applied accelerator voltage and current delivered by the MHD generator exceeds the accelerator Faraday induced voltage, and the MHD segmented generator electrodes are diagonally connected so as to stack the MHD net generator voltage that is connected to the accelerator, or,
if there is magnet space between generator and accelerator magnets, reversing a magnetic field vector in the accelerator by 180* from the generator vector, such that a K=−1 applied voltage to the MHD accelerator combines with the induced voltage thereby doubling K.

7. The method in accordance with claim 5, wherein the implementation of the mission provides a specific impulse to the rocket that is at least 1620 seconds.

8. The method for generating electric power in outer space in a range from 10 MW to 1000 MW from the MHD generator wherein cesium is seeded into the combined hydrogen gas after exiting the gas cooled nuclear reactor in accordance with claim 2, the combined hydrogen gas enters the MHD generator from which it exits, enters a spray condenser to mix and react with liquid lithium at a temperature above 1270° F., exits a radiator to enter the spray condenser to form liquid lithium hydride that enters a collection chamber from which it exits to be compressed in an electromagnetic pump to the original hydrogen stagnation pressure after which the lithium and cesium boil off in a boiler and enter a separator from which the lithium and cesium enter a radiator to reject the cycle heat to outer Space, while the hydrogen gas enters the pebble bed nuclear reactor which is gas cooled for reheating to original stagnation temperature.

9. The method in accordance with claim 8 wherein in addition to power generation for thrust, MHD power is increased for periods of seconds and minutes in order to provide pulsed power for applications that require greater than one mega joule of energy fired in seconds or minutes.

10. The method in accordance with claim 8, wherein output from the MHD generator is converted to microwave frequency to deliver power to space stations in remote locations.

* * * * *